United States Patent [19]

Pandya et al.

[11] 4,386,410

[45] May 31, 1983

[54] DISPLAY CONTROLLER FOR MULTIPLE SCROLLING REGIONS

[75] Inventors: Yogendra C. Pandya; Paul B. Wood, both of Houston, Tex.

[73] Assignee: Texas Instruments Incorporated, Dallas, Tex.

[21] Appl. No.: 237,318

[22] Filed: Feb. 23, 1981

[51] Int. Cl.[3] .................................................. G06F 3/14

[52] U.S. Cl. .................................... 364/518; 340/716; 340/726; 364/521

[58] Field of Search ............... 364/200, 518, 521, 900; 340/716, 724, 726

[56] References Cited

U.S. PATENT DOCUMENTS

| | | | |
|---|---|---|---|
| 3,643,252 | 2/1972 | Roberts, Jr. | 340/726 X |
| 3,792,462 | 2/1974 | Casey et al. | 340/726 X |
| 4,075,620 | 2/1978 | Passavant et al. | 364/521 |
| 4,126,814 | 11/1978 | Marlowe | 315/307 |
| 4,197,590 | 4/1980 | Sukonick et al. | 364/900 |
| 4,200,869 | 4/1980 | Murayama et al. | 340/726 X |
| 4,284,988 | 8/1981 | Seitz et al. | 340/726 |

FOREIGN PATENT DOCUMENTS 4554 10/1979 European Pat. Off. .

OTHER PUBLICATIONS

H. E. Bush, et al., "Data-Display Terminal Buffer Addressing for Scrolling Operations", *IBM Tech. Disc. Bull.*, vol. 23, No. 6, Nov. 1980, pp. 2507-2508.

D. A Stockwell, "Display with Partitioned Slow Scroll", *IBM Tech. Disc. Bull.*, vol. 23, No. 4, Sep. 1980, pp. 1512-1513.

K. R. Demke, et al., "Line Attribute Control", *IBM Tech. Disc. Bull.*, vol. 22, No. 11, Apr. 1980, pp. 4809-4810.

*Primary Examiner*—Jerry Smith

*Attorney, Agent, or Firm*—Douglas A. Lashmit; N. Rhys Merrett; Mel Sharp

[57] ABSTRACT

A display control system which operates asynchronously with a microprocessor includes a display controller, display memory, character memory means, and a visual character attribute generator. By linking one or more row attribute bytes, or pointers, to each row of characters stored in the display memory the display controller performs character and row manipulation on a display device without transferring whole blocks of data in the display memory. Multi-region display segmentation into horizontal and vertical split regions, smooth or discrete scrolling of individual regions, and various editing functions are achieved by modifying the associated display memory pointers. In one embodiment the display controller is a single integrated circuit device.

3 Claims, 15 Drawing Figures

DISPLAY CONTROLLER FOR MULTIPLE SCROLLING REGIONS

BACKGROUND OF THE INVENTION

This invention relates generally to data display and control systems and more particularly to a system having a display device segmented into multiple scrolling regions.

Traditional region separation has been performed using large scale computers. In such cases, data to be placed into a desired region was computed by software resident within the main computer. The data was then transmitted to a display device as a new display frame. Heretofore, data in display systems were not organized for display in terms of regions or windows into a data block. Further, the segmentation of the display into vertical and horizontal regions was performed by the large computer in software, and not at the local display device. Prior systems could not provide smooth or pixel scrolling of a vertical split region because of the immense software and processing time requirements.

SUMMARY OF THE INVENTION

A display device such as a CRT is controlled by a display control system formed of a CRT controller, a visual attribute generator, a display memory, and a character ROM. Alternate character sets are provided by a character RAM which is accessed by the display controller through the attribute generator. The display controller accesses the display memory asynchronously with a display system microprocessor, thus decreasing the processing time and increasing the microprocessor throughput. Segmentation of the display into multiple horizontal and vertical split regions which are independently scrollable either discretely or smoothly, is provided by the linking of one or more row attribute bytes or "pointers" to each character and character attribute row stored in the display memory. In this manner, data can be manipulated on the display screen without changing the absolute address of the data in display memory. That is, only the pointers associated with each block of data (corresponding to a displayed row) needs to be modified by the display controller. Processing time is greatly reduced because whole blocks of data need not be transferred in the display memory, only the display memory addresses associated with the pointers are affected. Discrete control of the display device contrast is achieved by a contrast register in conjunction with the attribute generator.

It is an object of this invention to provide a display control system which permits the smooth or discrete scrolling of a plurality of horizontal and vertical split display regions.

Another object is to provide a system for controlling a display memory which minimizes the processing load on a system CPU.

Still another object is to provide a system for mapping the contents of a display memory without requiring the transfer of blocks of data therein during various editing and scroll functions.

Yet another object is to provide a display control system which may be formatted either locally or from a remote host computer.

BRIEF DESCRIPTION OF THE DRAWINGS

Other objects and many of the attendant advantages of the present invention will be readily apparent as the invention becomes better understood by reference to the following detailed description with the appended claims, when considered in conjunction with the accompanying drawings, wherein:

DETAILED DESCRIPTION OF INVENTION

SYSTEM ARCHITECTURE

Figure 1A:
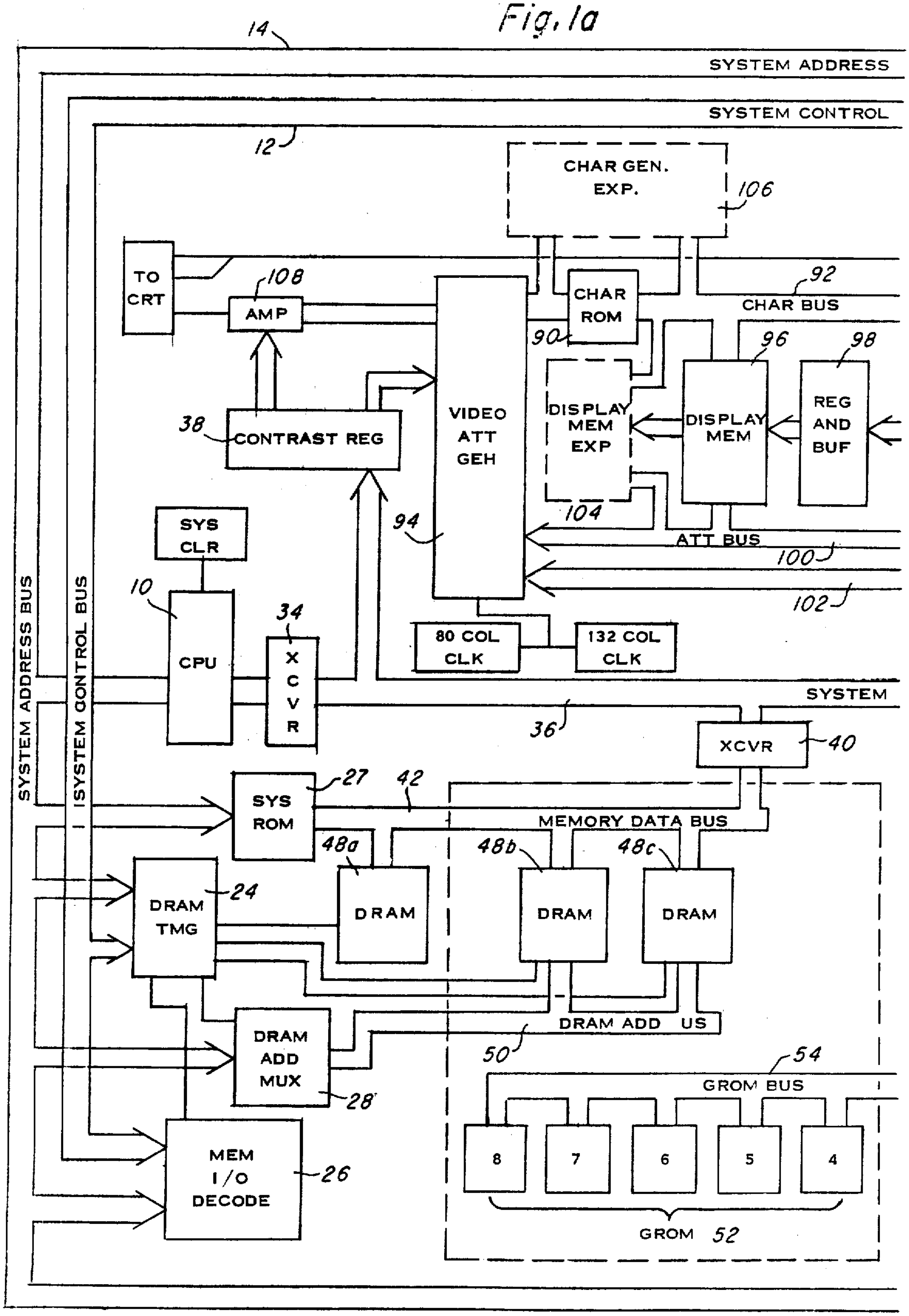
FIGS. 1*a*–1*c* form a block diagram of an electronic terminal including a display controller system according to the present invention.
Figure 1B:
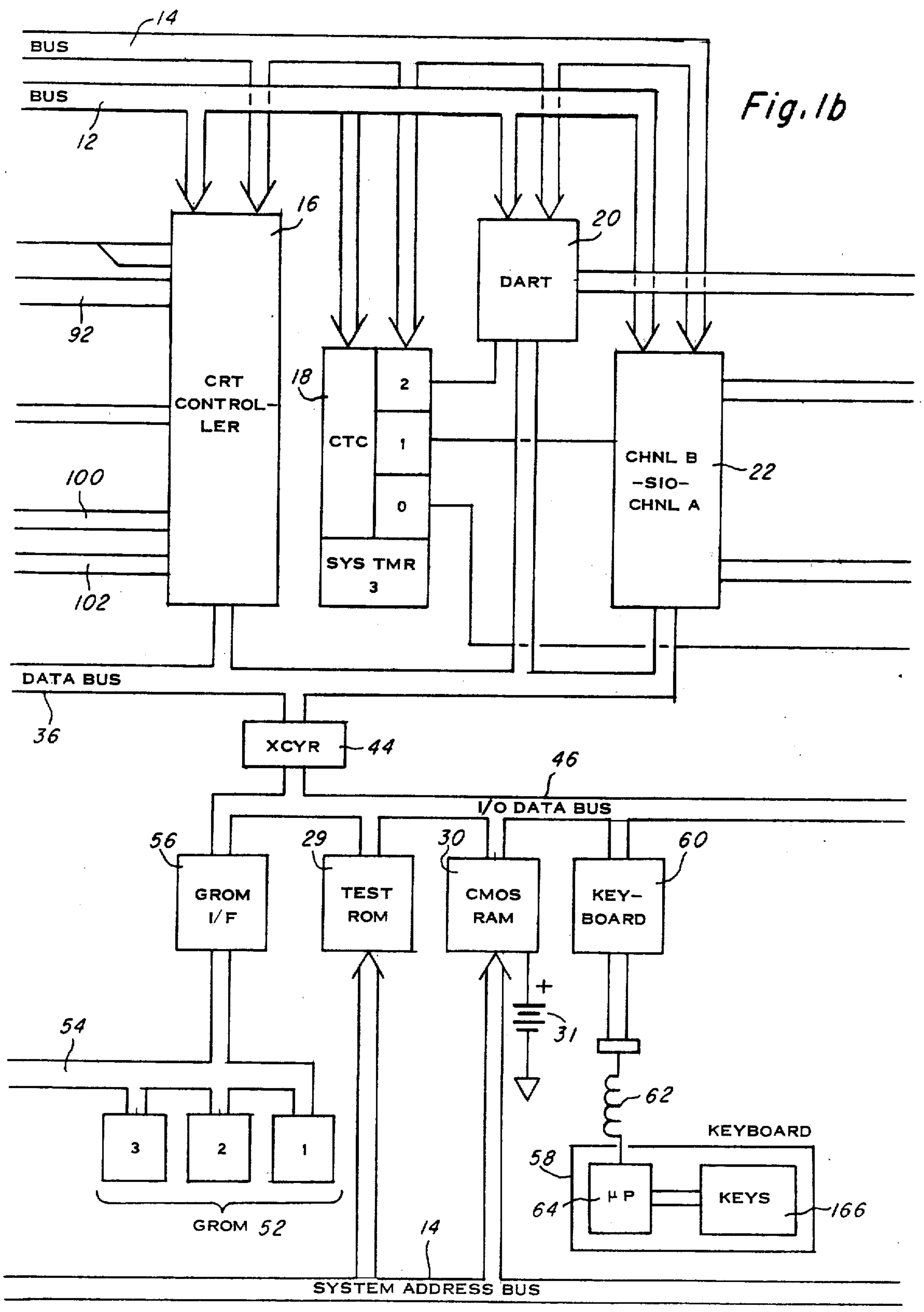
Figure 1C:
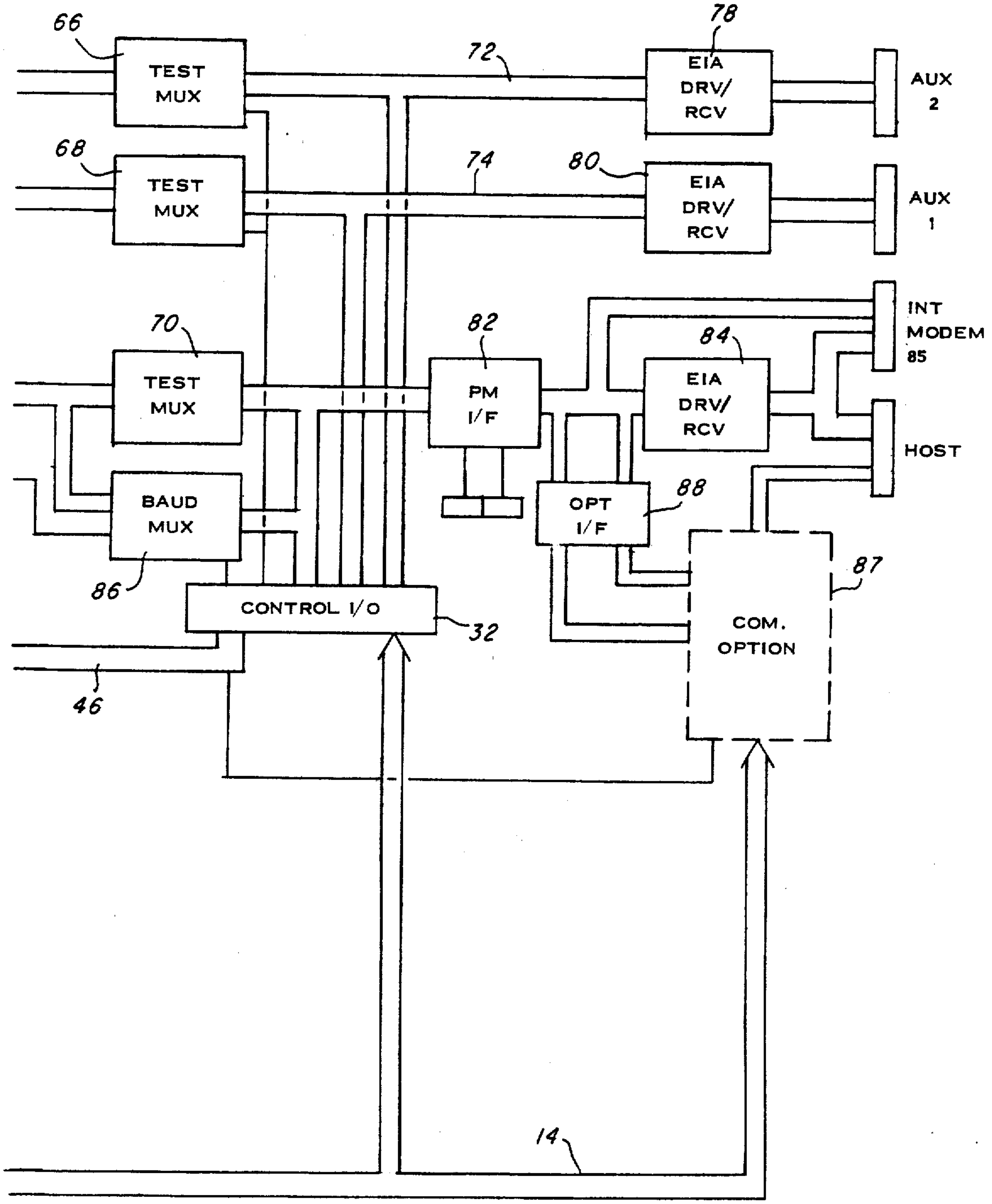

Referring now to FIGS. 1*a*–1*c* there is shown a block diagram ofan electronic input/output terminal according to the present invention. A system microprocessor CPU 10 is coupled to a system control bus 12 and a system address bus 14. Control bus 12 and address bus 14 both extend to a CRT controller CRTC 16, a counter-timer circuit CTC 18, a dual asynchronous transmitter/receiver DART 20, a serial input/output device SIO 22, a dynamic random-access memory (DRAM) timer 24, and a memory I/O decoder 26. System address 14 also extends to a system read-only memory (ROM) 27, a DRAM address multiplexer 28, a test ROM 29, a CMOS RAM 30, and a control I/O device 32. A battery 31 is coupled to CMOS RAM 30 to provide backup during power off conditions. CPU 10 is connected through a two-way buffer for transceiver (XCVR) 34 to a system data bus 36. Data bus 36 extends to a contrast register 38, and to CRTC 16, CTC 18, DART 20, and SIO 22. Data bus 36 is connected through a transceiver 40 to a memory data bus 42 which in turn extends to system ROM 27 and a series of DRAMs 48*a*–48*c*. Each DRAM is also connected to DRAM timer 24 and to a DRAM address bus 50 which is connected to a DRAM multiplexer 28. Data bus 36 is also connected through a XCVR 44 to an I/O data bus 46 which in turn extends to test ROM 29, CMOS RAM 30, and control I/O 32.

Program storage is provided by large scale mass read-only memory in the form of GROMs 52-1 to 52-8. The GROMs are connected to a common GROM bus 54 which is in turn connected to I/O data bus 46 through a GROM I/F 56.

An operator interfaces with the present system by means of a keyboard 58 which is connected to a keyboard I/F 60 through a telephone type multiconductor cable 62. Keyboard 58 contains its own microcomputer 64 which permits keyboard 58 to process instructions with a minimum computing load on CPU 10.

A series of test multiplexers 66, 68, and 70, are connected respectively to DART 20, and channels B and A of SIO 22, to provide loop back testing of the terminal in a local operating mode. A set of communication buses 72, 74, and 76, are connected to control I/O 32 and, respectively, to test multiplexers 66, 68, and 70. Communication to peripheral devices such as printers is provided from communication buses 72 and 74 through EIA driver-receivers 78 and 80, which are connected respectively to auxiliary ports AUX 2 and AUX 1. Communication with a host computer is provided by communication bus 76 which is connected through a PM interface 82 and an EIA driver-receiver 84 to an input/output port labeled HOST in the drawing. Longer distance communication is provided by means of an internal modulator-demodulator (MODEM) 85 which is also connected to communication bus 76. PM I/F 82 may be connected to a "personality module" (not shown) which permits the terminal communications to be compatible with various host computers. A baud rate multiplexer 86 is connected to communication bus 76 and to control I/O 32 to provide synchronization and a selection of baud rates with the host computer. The timing of baud multiplexer 86 is provided by timer 18-0 of CTC 18. Baud rate timing for the AUX 2 and AUX 1 ports is provided by timers 18-2 and 18-1 of CTC 18. Timer 18-3 functions as a system timer.

A communications option unit 87, shown by dashed lines in FIG. 1c, is connected to the HOST port, the system address bus 14 and through an option I/F 88 to communication bus 76. Unit 87 is used to provide local and current-loop communications by methods known in the art, and need not be described in detail here.

The present terminal communicates with an operator by video display means such as a CRT (not shown) which is driven by a controller CRTC 16. The generation of characters with various character attributes will be described in more detail below. Briefly, however, a set of characters is stored in a character ROM 90 connected to CRTC 16 by a character bus 92. The character, along with selected visual "attributes" generated by a video attribute generator VAG 94 are stored in RAM display memory 96, which is connected to CRTC 16 through a register/buffer 98. In the present terminal an "attribute" is defined to mean any of the following in relation to individual characters:

high/normal intensity or background highlight, blinking, underline, reverse video, double high characters, non-display double wide characters, and double high/wide characters. VAG 94 is connected to CRTC 16 and to display memory 96 by an attribute bus 100, and to CRTC 16 only through a control bus 102. The display memory 96 is expandable by additional RAMS 104 connected as shown in FIG. 1a. Additional characters may be generated by including a character generator RAM 106 connected to character bus 92 and to VAG 94 through a dot bus 107. The CRT intensity is controlled by programmable contrast register 38 through a video amplifier 108, which is also connected to VAG 94.

SYSTEM MEMORY MAP AND ARCHITECTURE

Figure 2:
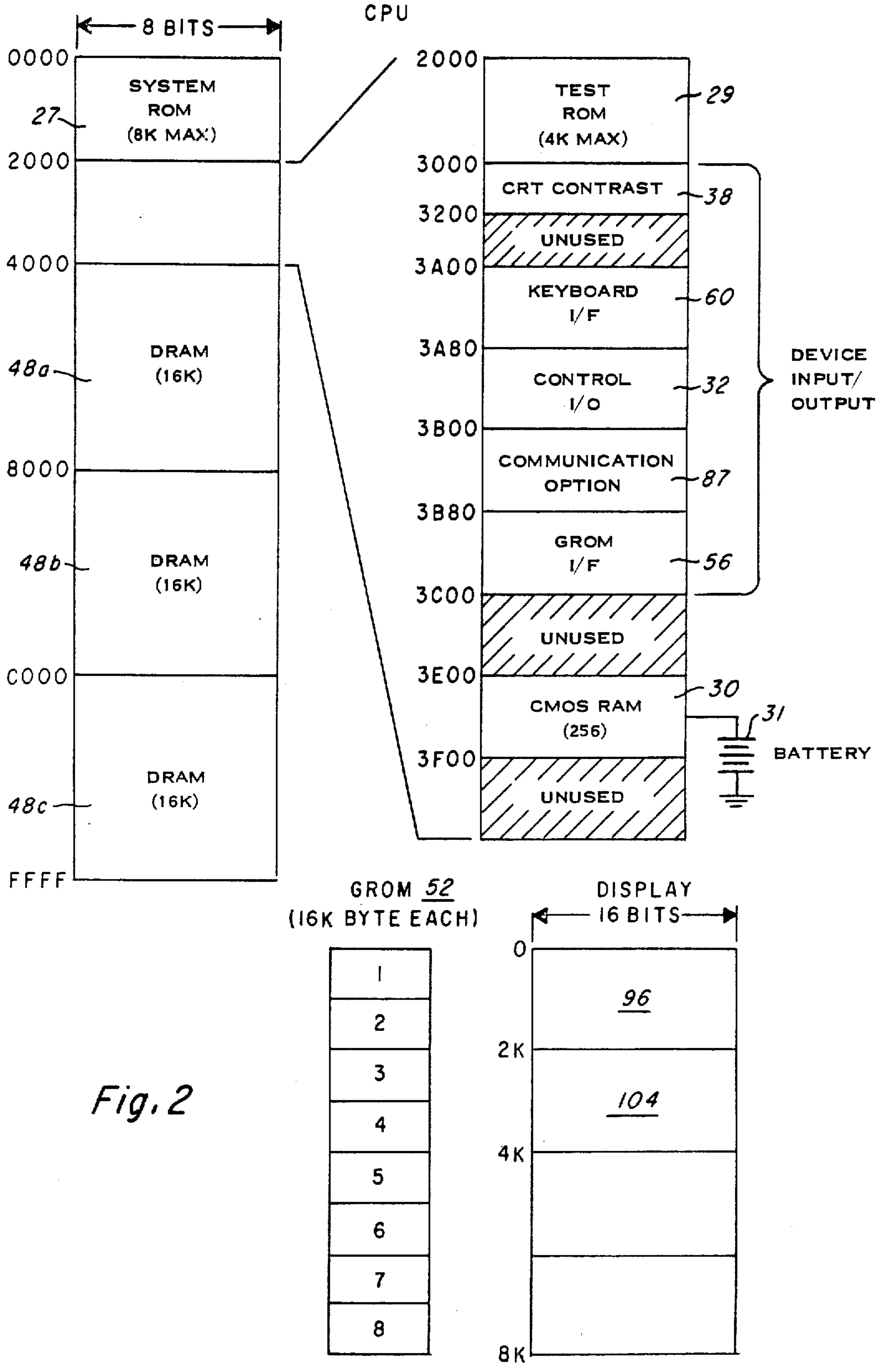
FIG. 2 is a system memory map.

Referring now to FIG. 2, there is shown a memory map of the present system illustrating the assigned memory locations of the various memory devices in hexadecimal form. In the basic configuration the CPU operating system memory is formed of 32K 8-bit bytes in memory locations 0000–7FFF, and is expandable to 64K bytes in memory locations 8000–FFFF by the addition of DRAMs 48*b* and 48*c*.

Memory locations 0000–1FFF are assigned to system ROM 27, which contains 2K bytes (expandable to 8K) of program instructions to control the system initialization and diagnostics on power up, as well as instructions for loading DRAM 48*a* from the program storage memory resident in the GROMs. DRAM 48*a* is used by CPU 10 for execution of instructions to control the terminal.

Locations 2000–3000 are assigned to test ROM 29 (4K byte maximum) which is used primarily during manufacture for test and diagnostic aids such as signature analysis.

Address 3000 is a write-only memory location that stores data in contrast register 38 to control the intensity level of the CRT as set by the operator. The attributes video on/off, background select, and highlight select are also controlled by register 38.

A read at memory location 3A00 inputs the data sent by keyboard 58 and resets its associated interrupt. A write to this location sends data to the keyboard for processing.

Read and write commands to memory locations 3A80–3A87 communicate the terminal configuration from control I/O 32 to CPU 10, that is, which of the basic and expandable devices are installed, as well as configuring the operational mode of the various communication devices as selected by the operator. Location 3B00 is reserved for communication option unit 87, which functions as described above.

Locations 3E00–3EFF are assigned to the 256 byte CMOS RAM 30, which is powered by a battery 31 to preserve its contents during power off conditions. CMOS RAM 30 stores terminal configuration information such as communications baud rates so that the terminal can readily communicate with the host computer when power is restored.

Display memory 96, which stores characters and associated attributes for display on the CRT screen, is accessed through CRT controller 16 as an I/O device. Display memory 96 contains 2K 16-bit bytes and is expandable to 8K in 2K increments.

The GROM storage memory is accessed by addressing the GROM I/F 56 at memory location 3B80. A read from this location inputs 4 bits of data from the selected GROM, and a write to this memory location outputs address and control information for accessing the GROM. In the basic terminal configuration three 16K byte GROMs, 52-1, 52-2, and 52-3, form a 48K byte program storage memory. This is expandable to a total of 128K bytes in 16K increments by the addition of GROMs 52-4 to 52-8. Dashed line 110 in FIG. 1 denotes the expanded portions of the operating and program storage memory. Basically, a GROM is a PMOS, metal gate read-only memory that provides low cost mass data storage. In the present terminal, program instructions are down-loaded from the GROM to the DRAM operating system memory as needed for execution by CPU 10. In this manner, a 16K DRAM can be used for execution of 48K of program instruction. A similar method of overlaying program instructions into the DRAM is described in a co-pending patent application Ser. No. 191,892 by Skelton, et al. entitled "Virtual Memory Microcomputer Architecture."

Figure 3:
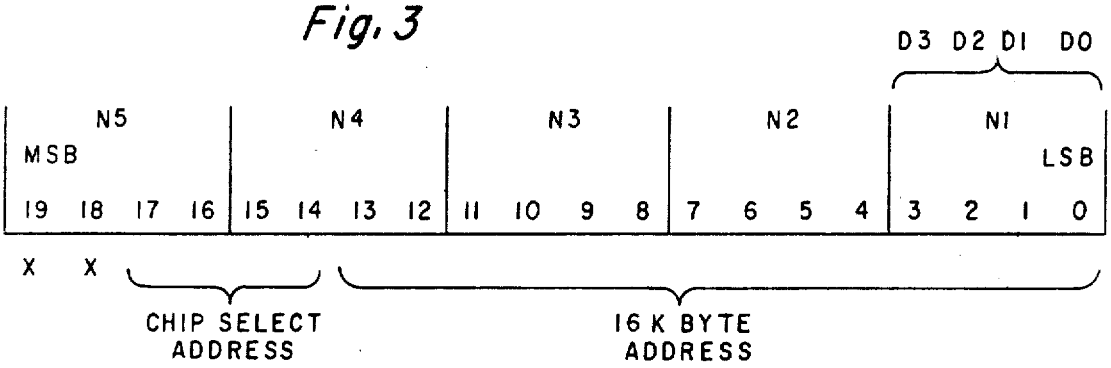
FIG. 3 is a diagram of the bit structure of an address byte used to access the system mass read-only program storage memory.
Figure 4:
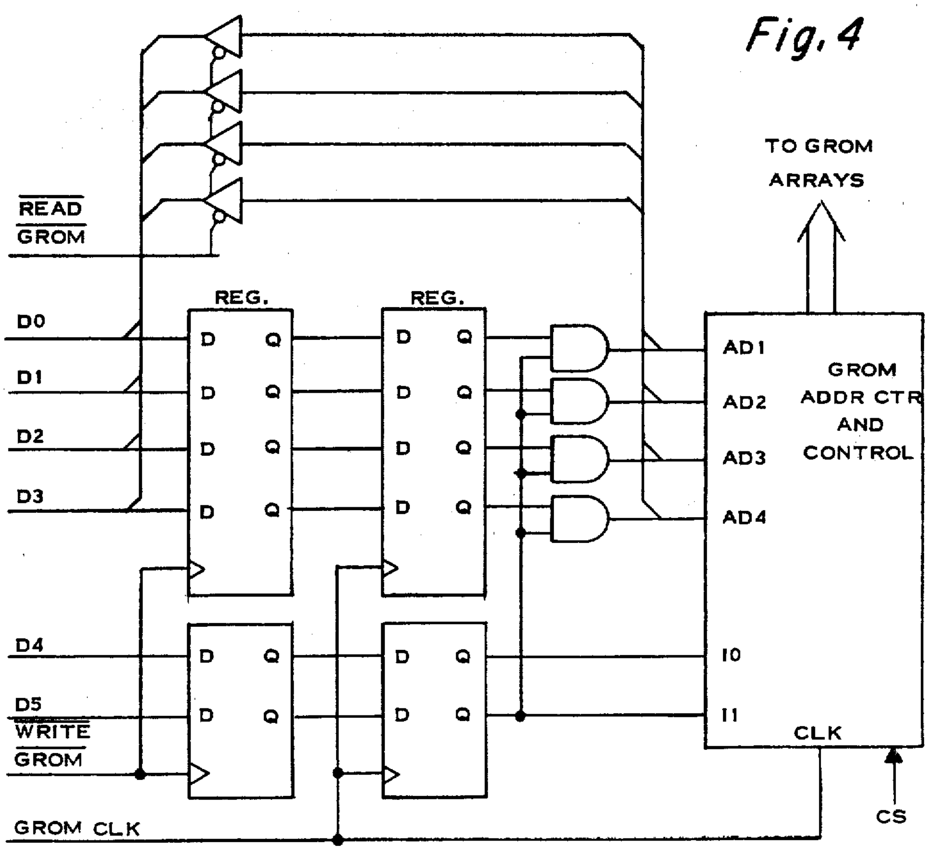
FIGS. 4 and 5 are block diagrams of the GROM interface unit.
Figure 5:
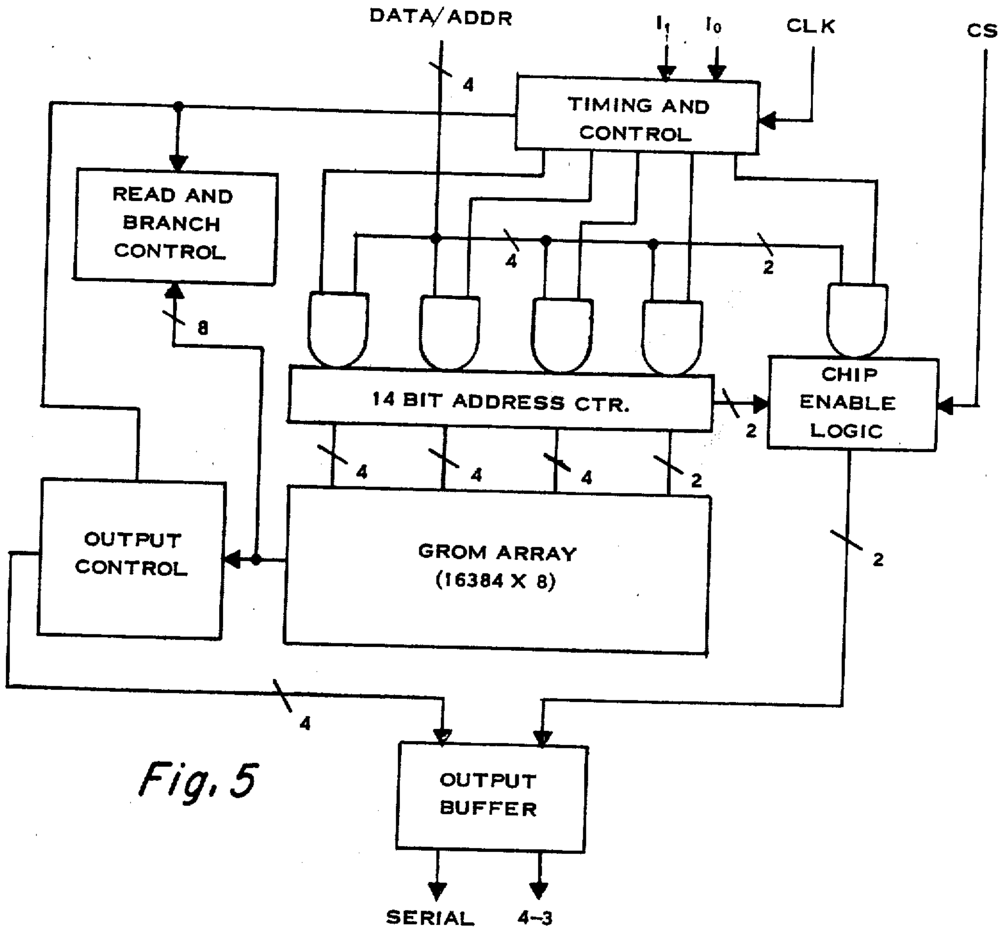

Referring now to FIGS. 3-5, the GROM accessing procedure is shown in greater detail. FIG. 3 shows the bit structure of a 20-bit byte used to access the GROM. The byte is loaded into GROM I/F 56 in 4-bit blocks or "nibbles" N1-N5. Bits 0-13 are used to select any one of 16K byte addresses in a particular GROM, while bits 14-17 are used to select one of up to eight GROMS. One embodiment of the GROM I/F is shown in FIGS. 4 and 5, illustrating circuitry for accessing a 16K byte GROM through a 4 bit data/address line D0-D3.

DISPLAY CONTROL SYSTEM

The display control system of the present terminal is formed of CRT controller 16, video attribute generator 94, display memory 96, character ROM 90, contrast register 38 and the associated circuitry and expandable memories 104 and 106. Briefly, CRTC 16 provides horizontal and vertical timing for the CRT, addresses display memory 96 for CRT refresh, provides the scan line addresses for character ROM 90 and character generator 106, controls the cursor on the CRT, controls data transfers between CPU 10 and display memory 96 or character generator 106, and controls video attribute generator VAG 94. VAG 94 converts parallel dot data into serial video data, modifies dot data according to attributes and control inputs, generates a character clock from a video dot clock, and provides a data path for character generator access. The CRT is configured to display information in a 25 row by 80 or 132 column format, with the line 25 reserved for terminal status messages. Each character cell defined by a row/column address is 9×11 dots or pixels, with a character size of 7×9 pixels.

The present terminal, as configured by either the operator or the host computer, allows for dividing the display memory into partitions. Each partition is called an editing boundary. The partition is defined in terms of rows of display, each row having 80 or 132 columns of display information. Additionally, the editing boundary may be defined to be a form containing formatted or unformatted regions. An unformatted display contains no fields, but may contain display attributes on a character-by-character basis. The formatted display contains at least one field and may contain display attributes on a character-by-character basis.

If more than one editing boundary is resident in the terminal, the length of each editing boundary must be equal to or greater than 24 rows of display information. That is, if 12 rows of double high/wide characters are used, then the 12 rows of double high/wide characters are 24 rows of display information.

A formatted editing boundary consists of "regions." A region is defined as a consecutive number of display rows viewed by the operation. The maximum number of consecutive rows possible for a region is 24 and the minimum is 1. However, the region data may exceed the display rows allocated for the defined region. This is called a scrolled region. Additionally, a region is defined as a full partition, left partition, or right partition. A full partition region is a region displayed to the operator using all columns possible in the CRT display. A left partition region is a region displayed to the operator using all columns to the left of the vertical split defined by the form. A right partition is a region displayed to the operator using all columns from and including the vertical split to the right defined by the FORM. If a region is defined as display only, with no operator access to the region, an entire region may be defined as a "protected region." A protected region is always guarded for transmission. A vertical split may exist in any column, however, only one vertical split is used in the disclosed embodiment for any one form. A vertical split is a selected column 1-80 or 1-132 which defines the starting column of any right partition region.

Each region is a "window." A window which shows all the data in the display at once is called a fixed region or a non-scrollable region. A window that shows only a part or a segment of the data assigned to the window is called a scrolled region. Every editing boundary contains at least one window. The window may consist of all of the editing boundary which in turn may consist of all terminal memory, but the window still exists. Each region can be individually scrolled either discreetly or smoothly. Thus, in effect, each region can function as an independent display.

These and other features are obtained by means of a "data-linking" procedure whereby two "line attributes" are generated and stored in display memory 96 for each row of characters and character attributes on the CRT screen. A line attribute is a byte of data which functions as a pointer, telling CRT controller 16 at which display memory location the first character in the next row of characters appears. In the case of a vertical split region, wherein a full partition region is followed by a left and a right partition region on the display, the last character of the last row of the full partition region will be followed in display memory by a right attribute (RA) and a left attribute (LA). The LA points to the display memory location of the first character in the first row in the left partition, and the RA points to the memory location of the first character in the first row of the right partition. In this manner, various display functions such as inserting/deleting lines and scrolling are achieved by merely modifying the pointers RA and LA to indicate the memory location of the next desired row of characters. This greatly increases the processing throughput of CPU 10 because only the affected pointers need to be modified, without rearranging character and character attribute data in the display memory.

By way of example, and to aid in the understanding of the form and region concept described above, reference is made to FIG. 6 wherein the display screen as seen by an operator is partitioned into four regions. It is assumed for this example that the terminal has been configured by the host computer to define two editing boundaries or forms. The form descriptors as well as region data tables (RDT) are loaded into the terminal memory or DRAM. Form descriptor 2 contains the information for configuring the display screen as shown in the drawing, that is, there is a vertical split at column 40 of the display screen and the form starts at display memory location 10 and ends at display memory location 50. As shown in the display memory map each of the four regions is a scrollable region, that is, the number of rows in each region exceeds the available "window" for display. Since the terminal in this example is configured to have a two page display memory, there are 48 lines of information available for the region definitions, although only 24 lines may be displayed at one time. Form 2 has four associated region data tables (RDT), one for each region on the display screen. Each RDT contains 8 bytes of information. Byte 0 is a predetermined region number, for example, to indicate whether a left or a right partition region will be displayed on the screen. Byte 1 indicates the starting row on the display screen for the associated region. Byte 2 is the current memory display starting row, that is, the display memory address of the currently displayed row. Byte 3 indicates the memory starting row number in the region, and byte 4 is the display ending row. Byte 5 is the current memory display ending row, byte 6 is the region memory ending row number in display memory, and byte 7 is the maximum relative column number for the region on the display screen. For example, referring to the RDT for region 1 in FIG. 6, region 1 character and character attribute data are stored in display memory locations 10-24. The currently displayed information from region 1 on the display screen, however, is formed of 8 lines that are stored in display memory locations 12-19, and appear on the display screen rows 0-7. That is, memory locations 12-19 comprise the "window" of region 1 that is currently displayed. Since region 2 is a right partition split region occupying the same display screen rows as region 1, the display window for region 2 is the same size as the window for region 1. It should be noted that 48 rows of display memory have been used for form 2, although only 24 rows of information appear on the display screen at a time. Regions 3 and 4 are similarly defined by their associated RDTs.

Figure 6:
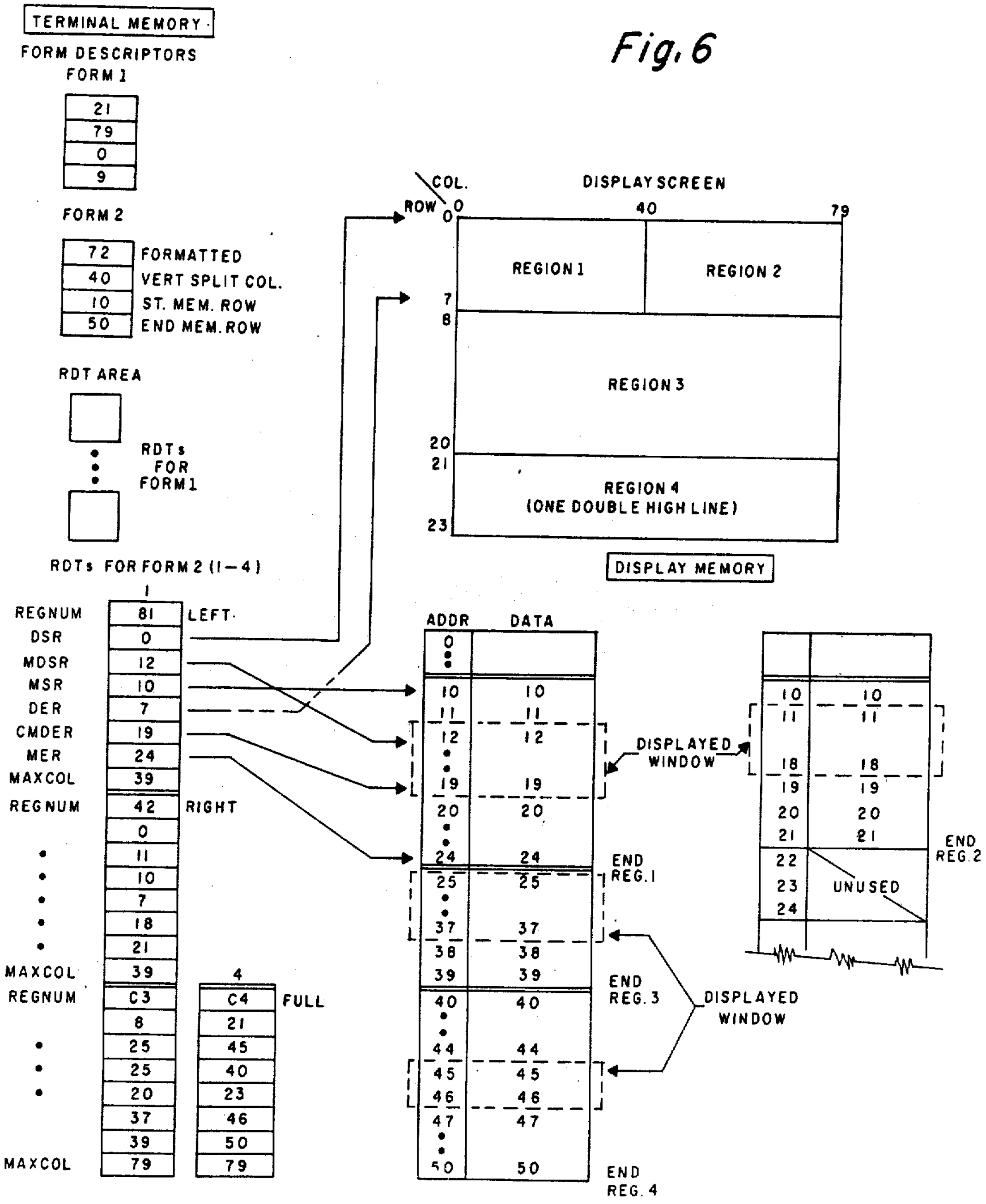
FIG. 6 is a pictorial representation showing the use of form descriptors and region data tables in establishing a display screen format.

Although in FIG. 6 the rows of information in display memory corresponding to the rows on the display screen are shown in sequential order, they may in fact be located at any display memory location. The RA and LA pointers associated with each row of screen information, as described above, will map the location of the next characters in display memory to be displayed on the screen.

Figure 7:
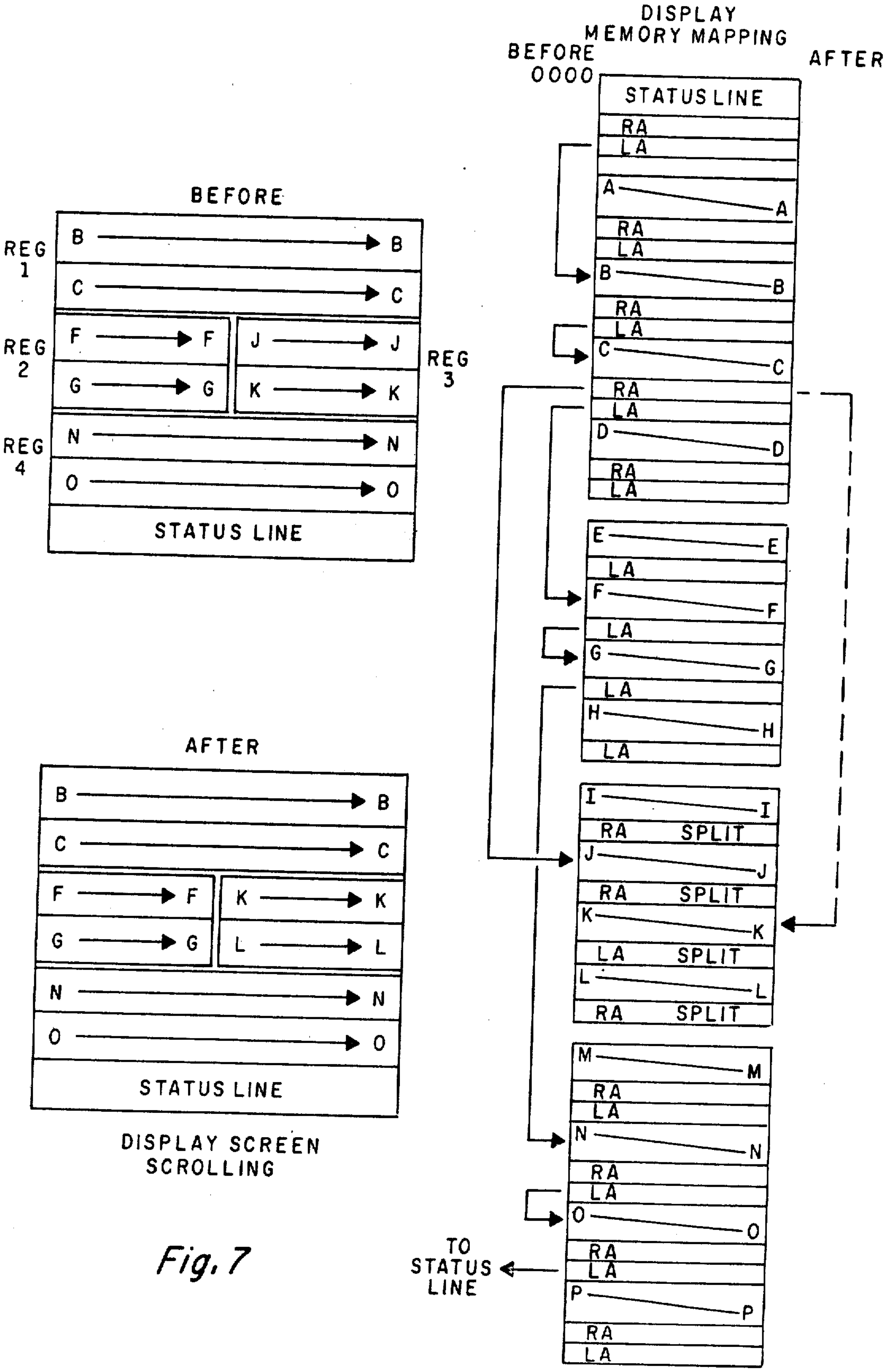
FIG. 7 shows the use of display memory mapping to scroll a selected region on a display screen segmented into a plurality of regions.

Referring now to FIG. 7, the use of these pointers in scrolling an individual region on the display screen will now be described by way of example. The display screen is shown divided into four regions, with the letters in each region indicating the first and last rows of characters in that particular region, for example, line B in region 1 is the first row of characters and line C represents the last row of characters in region 1. Similarly, line J represents the first row of characters in region 3 while line K represents the last row of characters. The "after" view of the display screen show region 3 scrolled up one row of characters, that is, row K is now the first displayed row of characters and row L is the last displayed row. Also shown in FIG. 7 is a map of the RA and LA pointers showing the action of the pointers both before and after the scroll function has been completed. Before scrolling is initiated pointer LA of the status line points to row B in region 1 and pointer LA of row B points to row C. Since region 2 is a left partition split region, pointer LA of row C points to row F in region 2, while pointer RA of row C points to row J in right partition region 3. Pointer LA of row G in region 2 points to row N in region 4. Because region 3 is a right partition region, only the associated RA pointers are used to indicate the next successive row in that region. Region 3 is scrolled up by one row merely by changing pointer RA in row C of region 1 so that it points to row K in region 3 instead of row J. Thus, scrolling and other editing functions are achieved by changing the pointers only, rather than rearranging whole blocks of data in display memory as was done in prior art systems. Further, the use of controller 16 and its associated circuitry to assign and modify the various pointers greatly reduces the processing time required to perform these functions and, since CRTC 16 operates asynchronously with CPU 10, the processing load on CPU 10 is reduced.

Smooth scrolling, i.e., the scrolling of a line one pixel or scan line at a time, may be performed independently in any of the vertical or horizontal split regions under the control of CRTC 16, which will now be described in greater detail.

DISPLAY CONTROLLER

In one embodiment, display controller CRTC 16 is a single integrated circuit device, which generates timing signals for a standard or a nonstandard raster-scan CRT monitor incorporating a non-interlaced format. CRTC 16 controls the horizontal and vertical display formatting, the independent display refresh memory 96, and the cursor address. Internal character and attribute data registers synchronize attribute and character data allowing controlled transfers between CPU 10 and display memory 96 or video attribute generator 94. As described above, controller 16 and its associated circuitry provide smooth scrolling and split screen capabilities as well as determining the number of characters per row, the number of scan lines per row, and the number of rows per display frame. In conjunction with VAG 94, the various character attribute features are also provided.

Figure 8A:
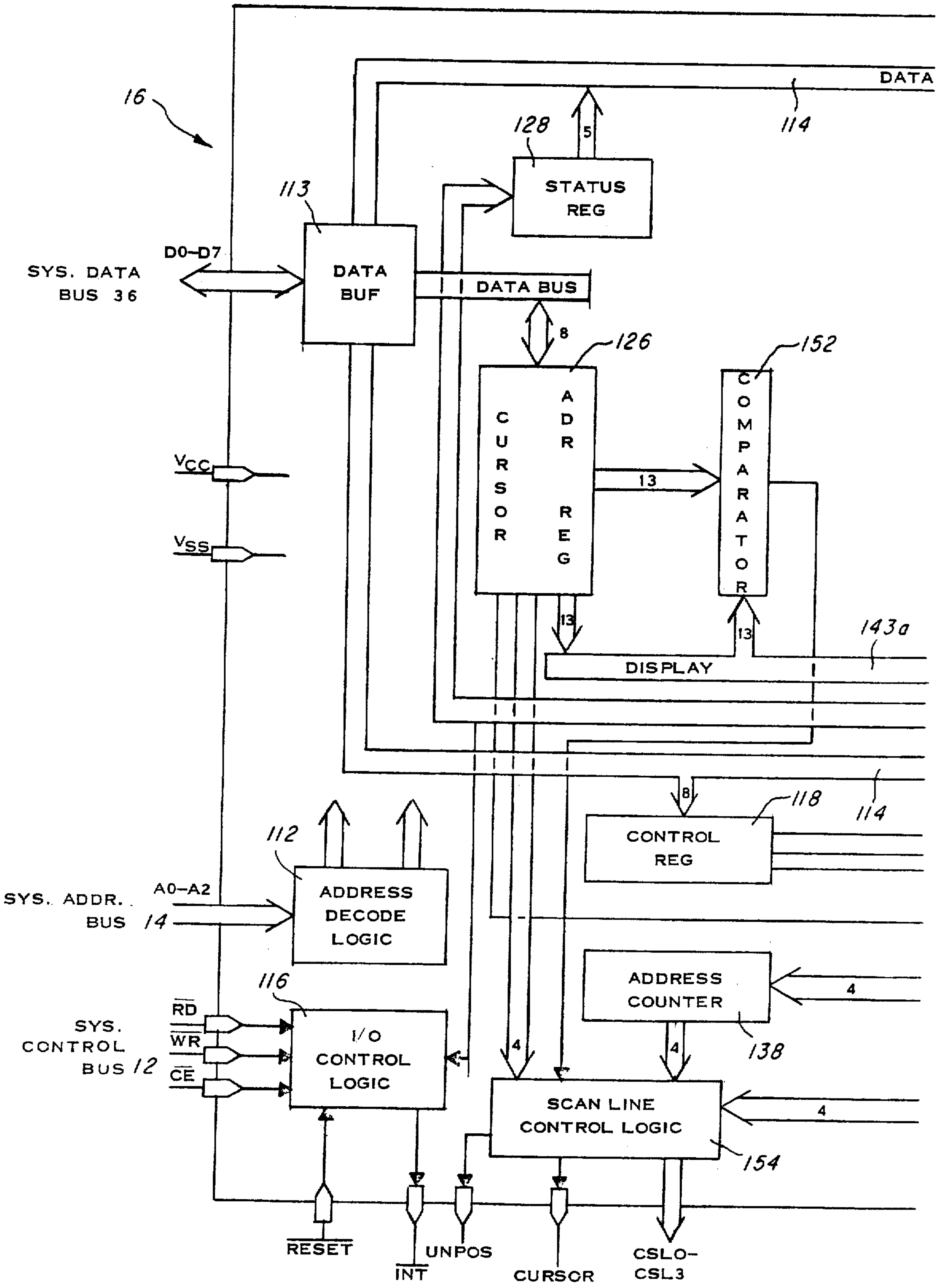
FIGS. 8*a*–8*c* form a block diagram of the display controller.
Figure 8B:
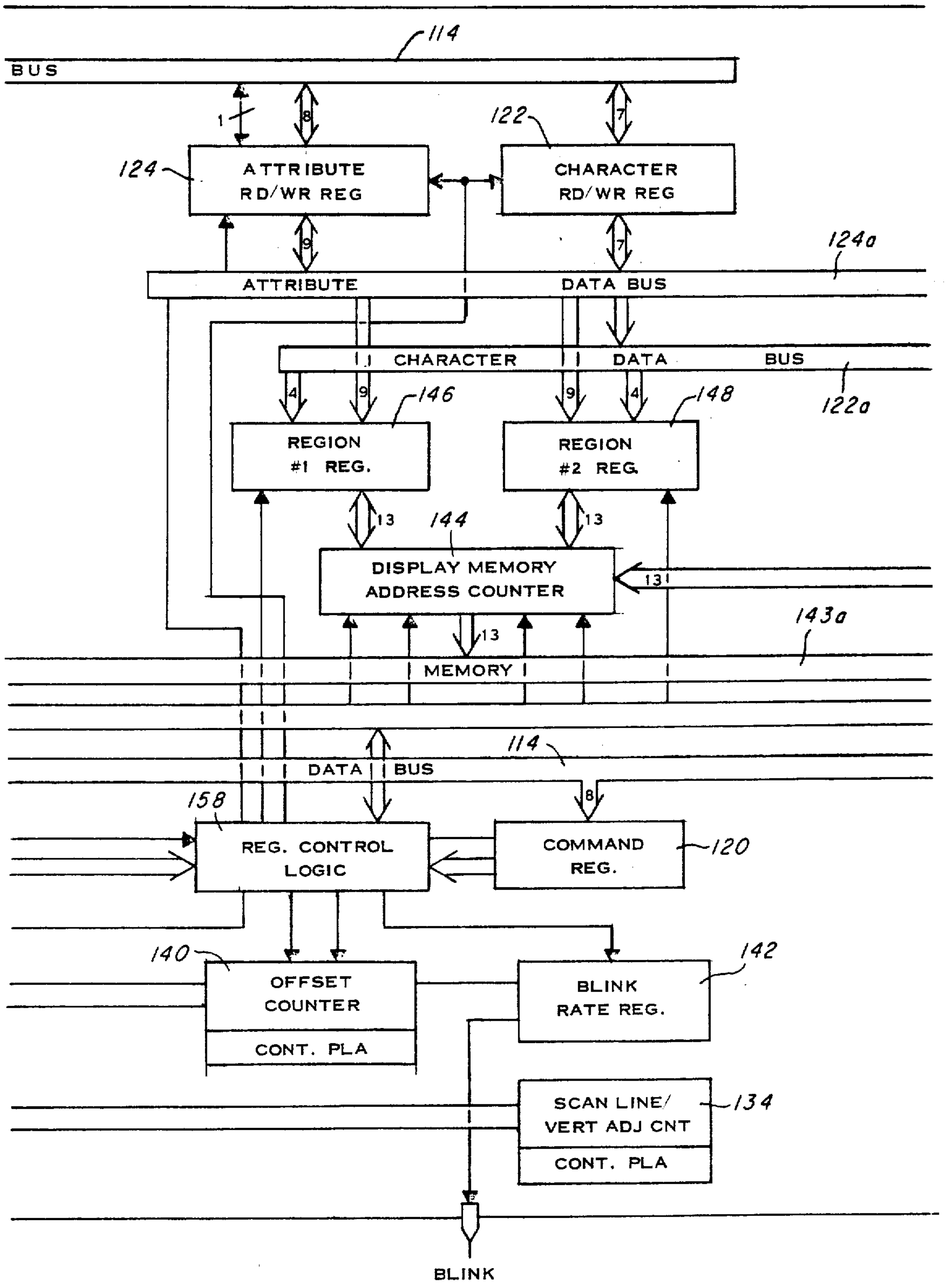
Figure 8C:
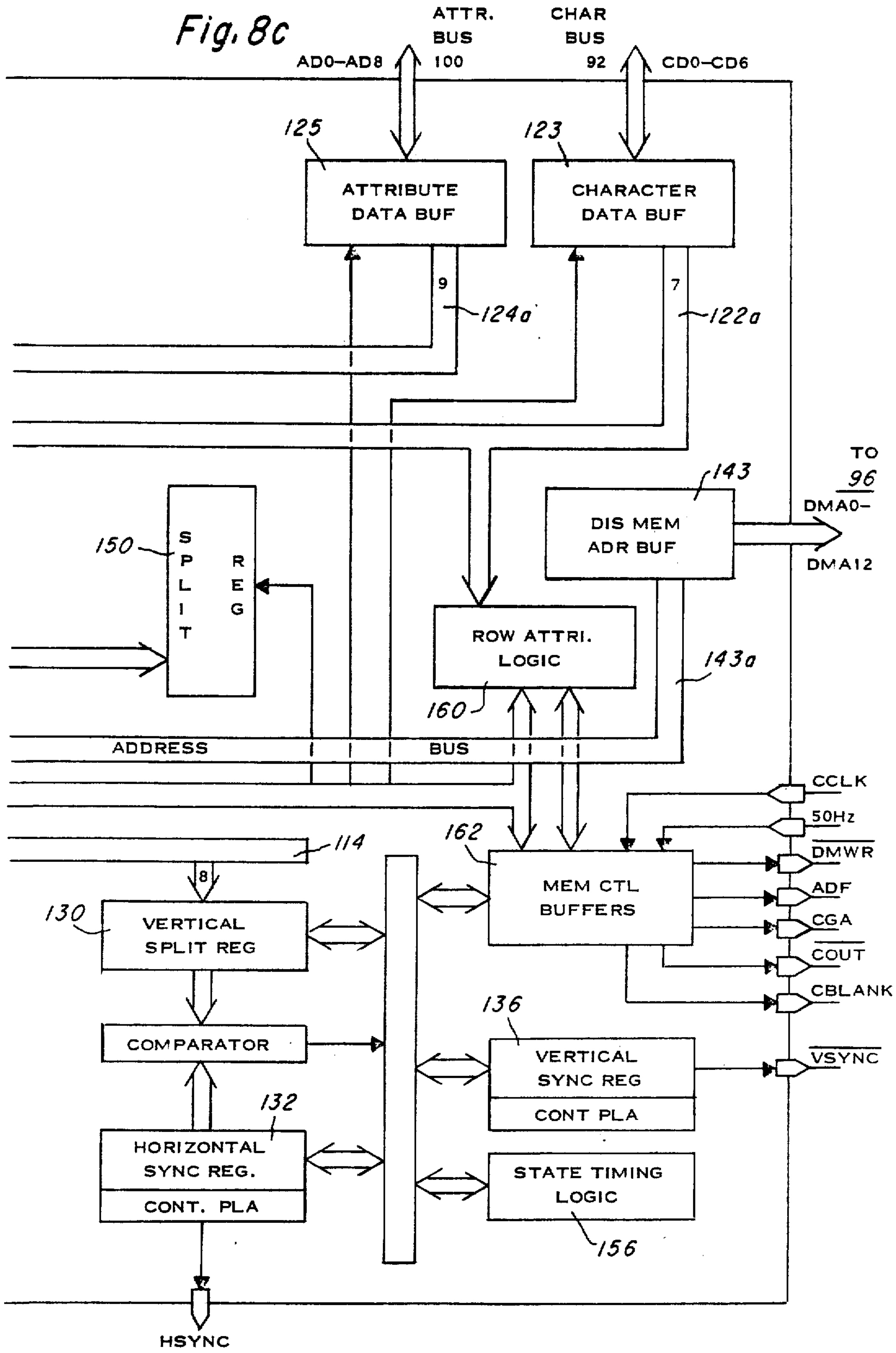

Referring now to FIGS. 8a-8c, CRTC 16 is shown in block diagram form. Controller 16 interfaces with CPU 10 through system address bus 14 (select lines A0-A2), system data bus 36 (data lines D0-D7), and system control bus 12 (RD/, WR/, and CE/). Lines A0-A2 are connected to an address decode logic circuit 112. Lines D0-D7 are connected to a data buffer 113 which is in turn connected to an internal data bus 114. The signal lines from control bus 12 are connected to an I/O control logic circuit 116. Address decoder 112 controls the various internal registers connected to data bus 114 by decoding the three address inputs together with the I/O control logic 116 outputs. Tables 1 and 2 below list the write and read assignments for the three select lines, A0-A2. I/O control 116 gates the control signals from CPU 10 and controls data buffer 113 and the bus precharge.

TABLE 1

SELECT LINE (A0-A2) WRITE ASSIGNMENTS

| $\overline{CE}$ | $\overline{WR}$ | A2 | A1 | A0 | REGISTER |
|---|---|---|---|---|---|
| 1 | X | X | X | X | Address decoding inhibited |
| 0 | 0 | 0 | 0 | 0 | Control Reg. |
| 0 | 0 | 0 | 0 | 1 | Command Reg. |
| 0 | 0 | 0 | 1 | 0 | Character Data Reg. |
| 0 | 0 | 0 | 1 | 1 | Attribute Data Reg. |
| 0 | 0 | 1 | 0 | 0 | Cursor Address Reg. (Upper 6 bits) |
| 0 | 0 | 1 | 0 | 1 | Cursor Address Reg. (Lower 8 bits) |
| 0 | 0 | 1 | 1 | 0 | Vertical Split Reg. |
| 0 | 0 | 1 | 1 | 1 | Not used |

TABLE 2

SELECT LINES (A0-A2) READ ASSIGNMENTS

| $\overline{CE}$ | $\overline{RD}$ | A2 | A1 | A0 | REGISTER READ |
|---|---|---|---|---|---|
| 1 | X | X | X | X | Address decoding inhibited |
| 0 | 0 | 0 | 0 | 0 | Status Reg. |
| 0 | 0 | 0 | 0 | 1 | Not used |
| 0 | 0 | 0 | 1 | 0 | Character Data Reg. |
| 0 | 0 | 0 | 1 | 1 | Attribute Data Reg. |
| 0 | 0 | 1 | 0 | 0 | Cursor Address Reg. (Upper 5 bits) |
| 0 | 0 | 1 | 0 | 1 | Cursor Address Reg. (Lower 8 bits) |
| 0 | 0 | 1 | 1 | 0 | Not used |

TABLE 2-continued

| SELECT LINES (A0-A2) READ ASSIGNMENTS | | | | | |
|---|---|---|---|---|---|
| $\overline{CE}$ | $\overline{RD}$ | A2 | A1 | A0 | REGISTER READ |
| 0 | 0 | 1 | 1 | 1 | Not used |

TABLE 3

| CONTROL REGISTER BIT ASSIGNMENTS | | |
|---|---|---|
| CONTROL BIT | NAME | DESCRIPTION |
| 7 | | Not used |
| 6 | | Not used |
| 5 | TSTMD | Test mode |
| 4 | COUT | Control out |
| 3 | ENLA | Enable row attributes |
| 2 | CBLINK | Blink cursor |
| 1 | CURON | Enable cursor |
| 0 | DFMS | Select alternate display format |

A control register 118 connected to data bus 114 is a write-only register that contains the control bits listed in Table 3. Bit 0 (DFMS) selects either a standard or an alternate display format. The logical value of bit 0 is output as the ADF signal shown in FIG. 8c. Bit 1 (CURON) enables the cursor output. Setting control bit 1 to zero inhibits the cursor output unconditionally. Bit 2 (CBLINK) selects either a blinking or nonblinking cursor. Bit 3 (ENLA) sets the mode of operation for controller 16. Enabling the line attributes allows for a display memory format with row attributes following each row. When disabled, the display format is assumed to be conventional, that is, each row is sequentially followed by the next display row with no row attributes present. The logical value of control bit 4 (COUT) appears as signal (COUT/) during a read or write to display memory 96. During active display this signal is inactive (high) and during retrace the signal is active (low). Setting control bit 5 (TSTMD) reduces the display format to 16 characters per row and 2 scan lines per character row. Resetting this bit enables normal device operation. This is primarily used for testing and inspection purposes.

A command register 120 connected to data bus 114 is an eight-bit write-only register which allows CPU 10 to issue display memory read or write commands, scroll commands, or interrupt commands. The register bit assignment is shown in Table 5 wherein an "x" indicates a "don't care" value.

A character register 122 connected to data bus 114 is an eight-bit read/write register used by CPU 10 for transferring data to and from display memory 96. The lower seven bits from register 122 appear on an inernal data bus 122a.

TABLE 4

| STATUS REGISTER BIT ASSIGNMENTS | | |
|---|---|---|
| STATUS BIT | NAME | DESCRIPTION |
| 7 | | Not used |
| 6 | | Not used |
| 5 | SCRBSY | Scroll busy |
| 4 | RWBSY | Read/write busy |
| 3 | INTP | Interrupt pending |
| 2 | SCROM | Scroll complete |
| 1 | RWCOM | Read/write complete |
| 0 | SVBLK | Vertical blank |

TABLE 5

| COMMAND REGISTER BIT ASSIGNMENT | | | | | | | | |
|---|---|---|---|---|---|---|---|---|
| COMMAND REG. BIT | | | | | | | | |
| 7 | 6 | 5 | 4 | 3 | 2 | 1 | 0 | DESCRIPTION |
| | | | | | | | | READ/WRITE COMMAND |
| 0 | 0 | X | 0 | 0 | X | 0 | X | No operation |
| | | | | | | 1 | 0 | Read at cursor address |
| | | | | | | 1 | 1 | Write at cursor address |
| 0 | 0 | X | 0 | 1 | 0 | 1 | 0 | Read and post-decrement at cursor address |
| | | | | 1 | 1 | 1 | 0 | Read and post-increment at cursor address |
| | | | | 1 | 0 | 1 | 1 | Write and post-decrement at cursor address |
| | | | | 1 | 1 | 1 | 1 | Write and post-increment at cursor address |
| 0 | 0 | X | 0 | 1 | 0 | 0 | X | Enable post-decrement at cursor address |
| | | | | 1 | 1 | 0 | X | Enable post-increment at cursor address |
| 0 | 0 | X | 1 | 0 | X | 0 | X | Post increment/decrement at cursor address |
| | | | | | | | | SCROLL COMMAND |
| 0 | 1 | X | X | X | | | 0 | Scroll up |
| | | | | | | | 1 | Scroll down |
| | | | | | | 0 | | Offset counter internal clock mode |
| | | | | | | 1 | | Offset counter external clock mode |
| | | | | | 0 | | | No operation |
| | | | | | 1 | | | Offset counter external increment clock |
| | | | | | | | | INTERRUPT CONTROL COMMAND |
| 1 | 0 | X | | | | | 0 | Disable vertical blank interrupt mask |
| | | | | | | | 1 | Enable vertical blank interrupt mask |
| | | | | | | 0 | | Disable read/write interrupt mask |
| | | | | | | 1 | | Enable read/write interrupt mask |
| | | | | | 0 | | | Disable scroll interrupt mask |
| | | | | | 1 | | | Enable scroll interrupt mask |
| | | | | 0 | | | | No operation |
| | | | | 1 | | | | Reset interrupts |
| | | | 0 | | | | | Disable interrupts |
| | | | 1 | | | | | Enable interrupts |
| 1 | 1 | X | X | X | X | X | X | No operation |

Bus 122a is connected to a character data buffer 123 which is in turn connected to character data bus 92. An attribute register 124 is a eight-bit read/write register similar to character register 122. Register 124 is connected to an internal attribute data bus 124a which is in turn connected to an attribute data buffer 125. The eight attribute bits and the most significant character bit are connected to external attribute bus 100 as shown in FIGS. 1a and 1b. A cursor address register 126 connected to data bus 114 is a thirteen-bit read/write register containing the absolute display memory address of the displayable cursor. The contents of this register are also the address used for display memory transfers.

A status register 128 connected to data bus 114 is a 6-bit read-only register with a bit assignment as shown in Table 4. Bit 0 (SVBLK) indicates the start of the vertical blanking interval, i.e., the beginning of the status row. Bit 1 (RWCOM) indicates that a read or write operation to display memory 96 has been completed. Bit 2 (SCRCOM) indicates that a smooth scroll operation has been completed. This will occur at the beginning of the status row on the last frame of the scroll. Bit 3 (INTP) indicates that an interrupt condition has occurred. This bit is reset or enabled by means of the command register 120. Bit 4 (RWBSY) is set following a read or a write command from CPU 10, indicating that the desired operations has not been completed. Upon completion of the read/write, this bit is reset. Bit 5 (SCRBSY) is set following a smooth scroll command from CPU 10 and is reset upon receipt of a scroll complete signal.

A vertical split register 130, connected to data bus 114, is an 8-bit write-only register containing the column position of a vertical split and is zero based. That is, if register 130 is loaded with zero, on a split region the left partition would contain one character ad the right partition would contain the remaining number of characters that are displayable.

The overall display format is controlled by a series of cascaded free-running counters. Two independent formats are mask programmable, each having two mask programmable formats for providing separate refresh rates. A horizontal sync register 132 is an 8-bit counter that controls horizontal display timing and is incremented at the character rate by a CCLK signal from video attribute generator 94. A programmable logic array (PLA) decodes the current register value and outputs signals corresponding to the total number of displayed characters, the start of horizontal sync, the end of horizontal sync and the end of horizontal retrace which clears the register. The operation of PLA's are known in the art and need not be described in detail. A scan line/vertical adjust counter 134 is a 4-bit counter that is incremented at the end of horizontal retrace, thus counting the number of scan lines per character row. Its count is decoded by means of a PLA and when the total number of scan lines is reached it is cleared and the counter in a vertical sync register 136 is incremented. When the register 136 counter reaches its total number of character rows count, register 134 enters a vertical adjust mode which permits a resolution of the refresh rate to within one scan line. Upon completion of vertical adjust, register 134 is cleared and begins counting scan lines in the upper-most character row.

Vertical sync register 136 as described above counts character rows and is clocked by register 134. Register 136 is a 7-bit counter which is PLA decoded for total displayed character rows, status row position, total character rows (including vertical retrace), and vertical sync position. The vertical sync pulse is set at vertical sync position and reset on the total character rows count.

An address counter 138 is a 4-bit counter that counts character scan lines as does register 136. Register 136 is used for normal characters while address counter 138 is used for double high and smooth scroll characters. Counter 138 tracks register 136 until one of these special character regions are detected. For double high characters counter 138 toggles between increment and inhibit increment states. For the scrolling function, counter 138 is preset with an offset signal from an offset counter 140 and then is incremented as before. Offset counter 140 is a four-bit counter which is incremented every time the status row position is reached, or once every frame. This increases the smooth scrolled offset one pixel (or scan line per region) per display frame. Offset counter 140 is initialized when a smooth scroll command is received from CPU 10 by means of command register 120. This either presets or clears counter 140 based upon the direction of the scroll. A blink rate register 142 is a three stage ripple counter that is clocked by the carry output of the most significant stage of offset counter 140. It is used to establish the cursor blink rate and the blink rate output.

The display memory 96 is addressed by the thirteen bit display memory address (DMA) outputs (DMA-0–DMA12), from a buffer 143 connected to an internal DMA bus 143a. Associated control signals include write control (DMWR/), select memory or character generator (CGA), and bank select control (COUT). A display memory address counter 144 generates the DMA for active, or visible, display. Counter 144 is connected to bus 143a and contains three registers: a region 1 register 146, a region 2 register 148, and a split register 150. Register 146 contains the starting address of a character row and is loaded into the memory address counter 144 at the beginning of every scan line of that particular row. After the last scan line of a row has been displayed, register 146 is updated with the starting address of the next row. This may be done either by: loading memory address counter 144 contents plus 1 into register 146 when scan line attributes are disabled; loading the address following the row attribute in register 146 when the link address is not valid and row attributes are enabled; or, loading the thirteen bit address stored in memory 96 at the row attribute location into register 146, when the link address is valid and row attributes are enabled.

Region 2 register 48 is the equivalent of register 146 for a split region. That is, register 146 contains the starting address for the left region, while register 148 contains the starting address for the right region. Register 148 is loaded from either the memory address counter 144 or from display memory 96 through the internal attribute and character data buses 124a and 122a.

Split register 150 is loaded from memory address counter 144, for a row falling into two regions, with the display memory address of the row attribute of the left region. During the retrace state times, the address in register 150 is loaded into the display address counter 144 to fetch data at that location. When not on the last scan line of a split row, register 150 contains a refresh address that is loaded into memory address counter 144 following the state time throughout horizontal retrace for the purpose of refreshing dynamic memory devices. When a read or a write to display memory command is given to the controller 16, it is synchronized in command register 120 and decoded. During the actual read or write operation, which occurs during the state time of retrace, the contents of cursor address register 126 are placed onto display memory address bus 143a. If the cursor is enabled, the cursor output will be active since a cursor address register comparator 152 always compares the contents of register 126 with what is on the DMA bus 123a. In this case it is comparing the register 126 contents with itself.

The character scan line outputs CSL0–3 from a scan line control logic circuit 154 may also be considered to be a part of the display memory address. These outputs indicate which scan line of the character the display memory address corresponds to. The four bits may be either from counter 138, counter 134 or the four least significant bits of the cursor address register 126. The selection between these counters depends upon the type of row being displayed, i.e., normal, smooth scrolled, or double high. The four cursor bits are always selected during the state times and are used in accessing the external character generator RAM 106. A PLA follows a multiplexer in circuit 154 for the purpose of decoding the underline position based on the selection of a standard or an alternate display format.

A state timing logic circuit 156 is a seven bit shift register with recirculation capability. At the beginning of horizontal retrace, a one is shifted into this register and serially propagates through all stages. The outputs of the stages represent state times which are used to control a register control logic circuit 158. All row attribute fetches and display memory reads and writes occur during the state times with the row attribute fetch having priority over the command-oriented memory accesses. The register control logic embodies control of the character 122 and attribute 124 registers with respect to the character 92 and attribute 100 external data buses. Also controlled by logic circuit 158 are the register transfer of memory address counter 144, the command register 120 synchronization and control logic, the precharging of character bus 122a and attribute bus 124a, and the control of buffers 123 and 125. Following the last displayed character row until the beginning of vertical adjust, the state timer recirculates shifting the "one" from the last stage back to the first, thereby increasing the bandwidth of the processor (CPU 10) access to display memory 96.

A row attribute logic circuit 160 provides an input to the register control logic 158 based upon the row currently being displayed and the row to be displayed next. The outputs of the row attribute logic 160 provide for the following: controlling counter 138 by presetting it with the offset counter 140, by clearing it, or by enabling it to count double high; signalling the register control logic 158 when a left and/or a right row attribute fetch should occur; and determining when register 146 or register 148 should be loaded from the character and attribute buses 122a, 124a. A set of memory control buffers 162 is connected to row attribute logic 160 and to register control logic 158 in order to buffer the inputs and outputs to display memory 96 and VAG 94.

Table 6 below summarizes the various signals and I/O ports on controller 16. The registers, PLA's and counters described above are known in the art and the electronics circuitry of each need not be described in detail.

TABLE 6

| SIGNATURE | I/O | DESCRIPTION |
|---|---|---|
| D7 (MSB) | I/O | - D7 through D0 constitutes the data bus. The data bus serves as an input for register contents to the controller and output for buffer/cursor address read data and attribute/character data. |
| D6 | I/O | |
| D5 | I/O | |
| D4 | I/O | |
| D3 | I/O | |
| D2 | I/O | |
| D1 | I/O | |
| D0 (LSB) | I/O | |
| A2 (MSB) | I | - A2 through A0 are select lines, used to select the internal registers of the controller. |
| A1 | I | |
| A0 (LSB) | I | |
| $\overline{RD}$ | I | - Read - a negative true signal indicates that the controller should gate data onto the data bus. |
| $\overline{WR}$ | I | - Write - a negative true signal indicates that the controller should gate data bus into internal register. |
| $\overline{CE}$ | I | - Chip Enable - a negative true signal indicates that the controller is being addressed. |
| $\overline{RESET}$ | I | - Reset - a negative true signal initializes the controller, and is active for 1 μs minimum. |

TABLE 6-continued

| SIGNATURE | I/O | DESCRIPTION |
|---|---|---|
| $\overline{INT}$ | O | - Interrupt - a negative true signal indicates that at lease one of the interrupt conditions has occured. $\overline{INT}$ is an open drain output. |
| 50HZ | I | - 50/60 Hz Control Input - this input indicates to the controller to switch to second set of vertical timing parameters in the current display format. |
| HSYNC | O | - Horizontal Sync - a positive true signal is used to drive the horizontal deflection circuits of a CRT. |
| $\overline{VSYNC}$ | O | - Vertical Sync - a negative true signal is used to drive the vertical deflection circuits of a CRT. |
| CBLANK | O | - Composite Blanking - a positive true signal is used to blank the video input of a CRT during Horizontal and Vertical Retrace. |
| DMA12 (MSB) | O | - DMA12 through DMA0 constitutes the Display Memory Address. The controller outputs the address of the Display Memory location which it is currently accessing. |
| DMA11 | O | |
| DMA10 | O | |
| DMA9 | O | |
| DMA8 | O | |
| DMA7 | O | |
| DMA6 | O | |
| DMA5 | O | |
| DMA4 | O | |
| DMA3 | O | |
| DMA2 | O | |
| DMA1 | O | |
| DMA0 (LSB) | O | |
| VCC 1 | I | - Supply Voltage (+5V NOM.) |
| VCC 2 | I | - Supply Voltage (+5V NOM). |
| VSS | I | - Ground Reference Voltage. |
| CD6 (MSB) | I/O | - CD6 through CD0 constitutes the character data bus. This data bus defines the character the controller stores or reads from the Display Memory. |
| CD5 | I/O | |
| CD4 | I/O | |
| CD3 | I/O | |
| CD2 | I/O | |
| CD1 | I/O | |
| CD0 (LSB) | I/O | |
| AD8 (MSB) | I/O | - AD8 through AD0 constitutes the Attribute Data Bus. This data bus defines the Visual Attributes the controller stores or reads from the Display/Memory. |
| AD7 | I/O | |
| AD6 | I/O | |
| AD5 | I/O | |
| AD4 | I/O | |
| AD3 | I/O | |
| AD2 | I/O | |
| AD1 | I/O | |
| AD0 (LSB) | I/O | |
| CCLK | I | - Character Clock - this establishes the basic character clock rate and is used to synchronize the controller internal timing. |
| CSL3 (MSB) | O | - Character Scan Line - CSL3 through CSL0 indicate the binary number of the scan line for the character to be displayed. |
| CSL2 | O | |
| CSL1 | O | |
| CSL0 (LSB) | O | |
| CURSOR | O | - Cursor - a positive true signal indicating the location in the Display Memory defined to have the cursor. |
| UNPOS | O | - Underline Positive - a positive true signal indicates that the underline attribute should be displayed if applicable. |
| BLINK | O | - Blink rate - this signal determines the rate at which characters should be blinked when applicable. |
| $\overline{DMWR}$ | O | - Write Display Memory - A negative true signal indicates that the data gated onto the character and attribute data bus will be stored in the Display Memory at the address provided by the Display Memory Address Bus. |
| CGA | O | - Character Generator Access - a positive true signal indicates that the con- |

TABLE 6-continued

| SIGNATURE | I/O | DESCRIPTION |
|---|---|---|
| | | troller is accessing the Character Generator Circuitry instead of the Display Memory. |
| ADF | O | - Alternate Display Format - a positive true signal indicates that the controller has been configured to operate in the Alternate Display Format instead of the standard format. |
| $\overline{\text{COUT}}$ | O | - Control Output - this output signal is the inverse of Bit 6 of the Control Register of the controller. |

KEYBOARD AND KEYBOARD INTERFACE UNIT

Keyboard unit 58 is self-contained, with its own microcomputer 64, for scanning and decoding the keys, assigning various function thereto and transmitting and receiving data and instructions serially via I/F 60 to CPU 10. Various character formats are selectable, e.g., for different countries as stored in character RAM 106. The advantages of a separate keyboard unit include a reduced processing load on CPU 10 and thus a faster throughput.

Figure 9:
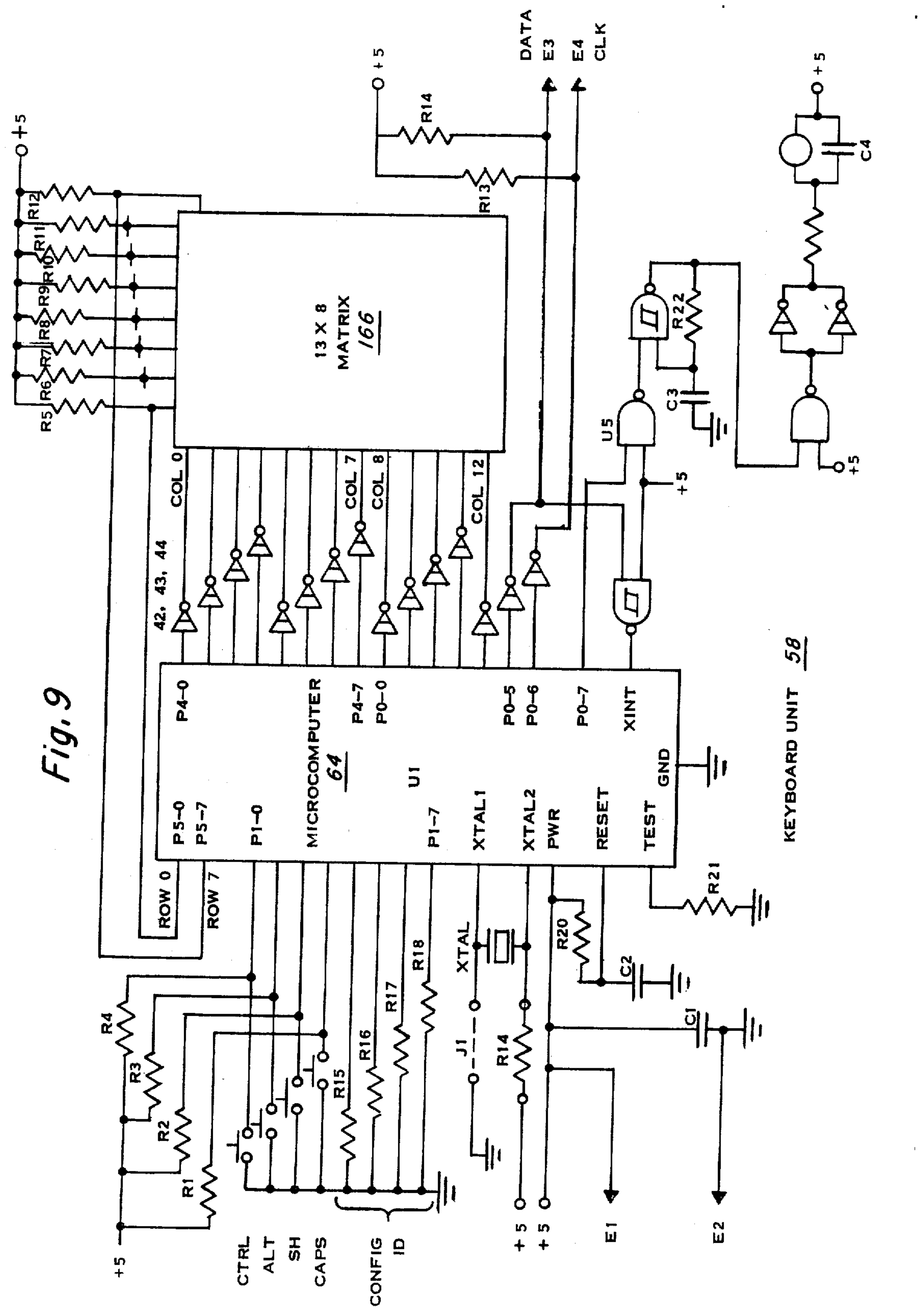
FIG. 9 is a schematic diagram of the self-contained keyboard unit.

Referring now to FIG. 9, keyboard unit 58 includes an array or matrix 166 of momentarily-closed single action switches arranged in rows and columns. Microcomputer 64, for example, a model 3870 available from MOSTEK Corporation and from Motorola, Inc., includes internal ROM and RAM. Input/output ports, P0 and P4 are connected to a series of open collector buffers U2–U4, used for strobing matrix 166. A feedback return is produced via a row path into port P5 of U1. Four control keys, shown in the left hand portion of FIG. 9, are connected to U1 through input port P1. Bits 5 and 6 of port P0 are connected to a bidirectional data line E3 and a clock line E4 which are connected in turn to keyboard I/F 60 for serial transmission of signals thereto and therefrom. Lines E1 and E2 provide power and ground connections for keyboard unit 58. The four logic gates denoted as U5 in FIG. 9 form a bell or tone circuit that is controlled by microcomputer 64 upon commands from CPU 10 and from internal error codes.

Figure 10:
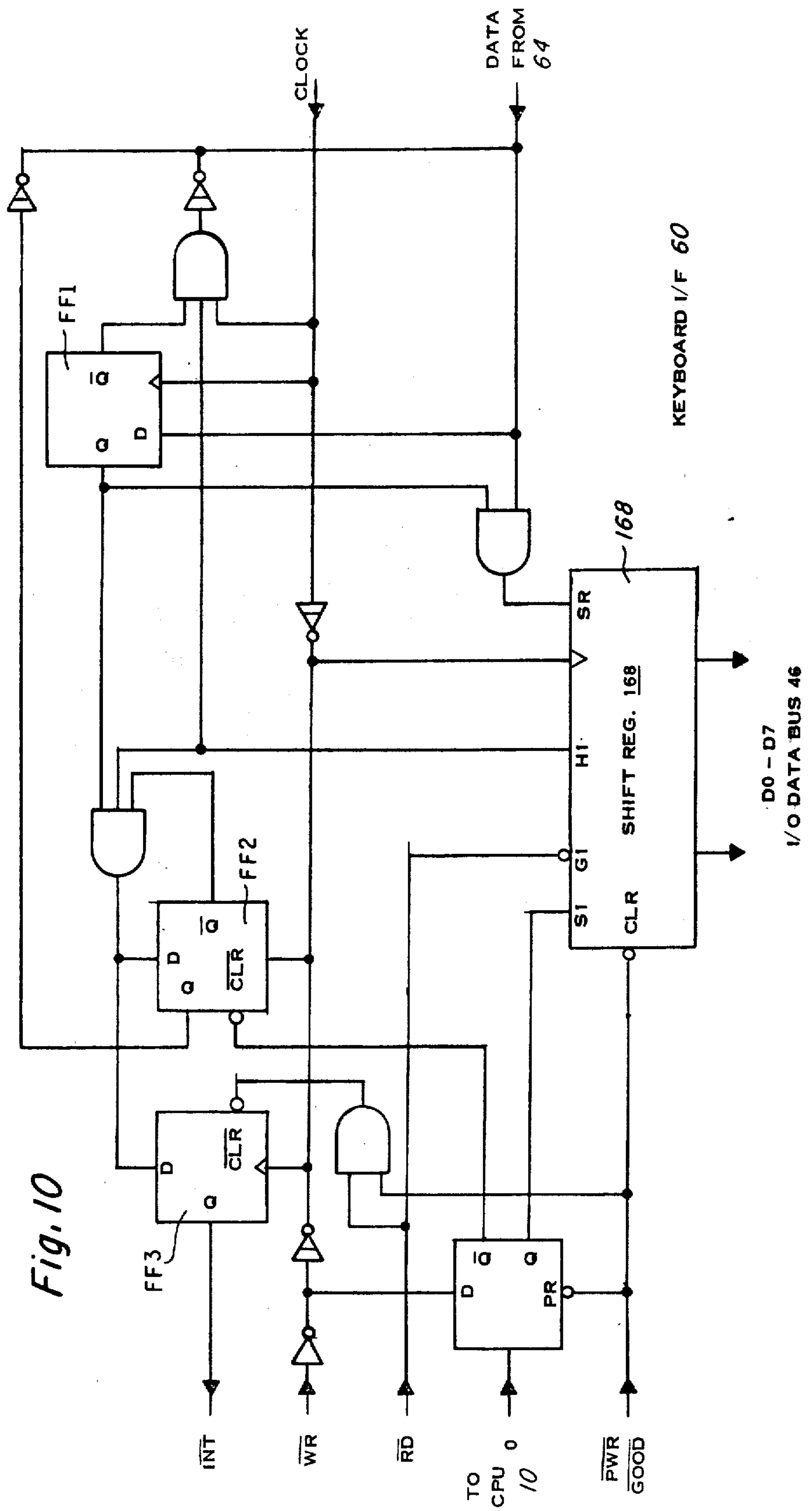
FIG. 10 is a schematic diagram of the keyboard interface unit.
Figure 10A:
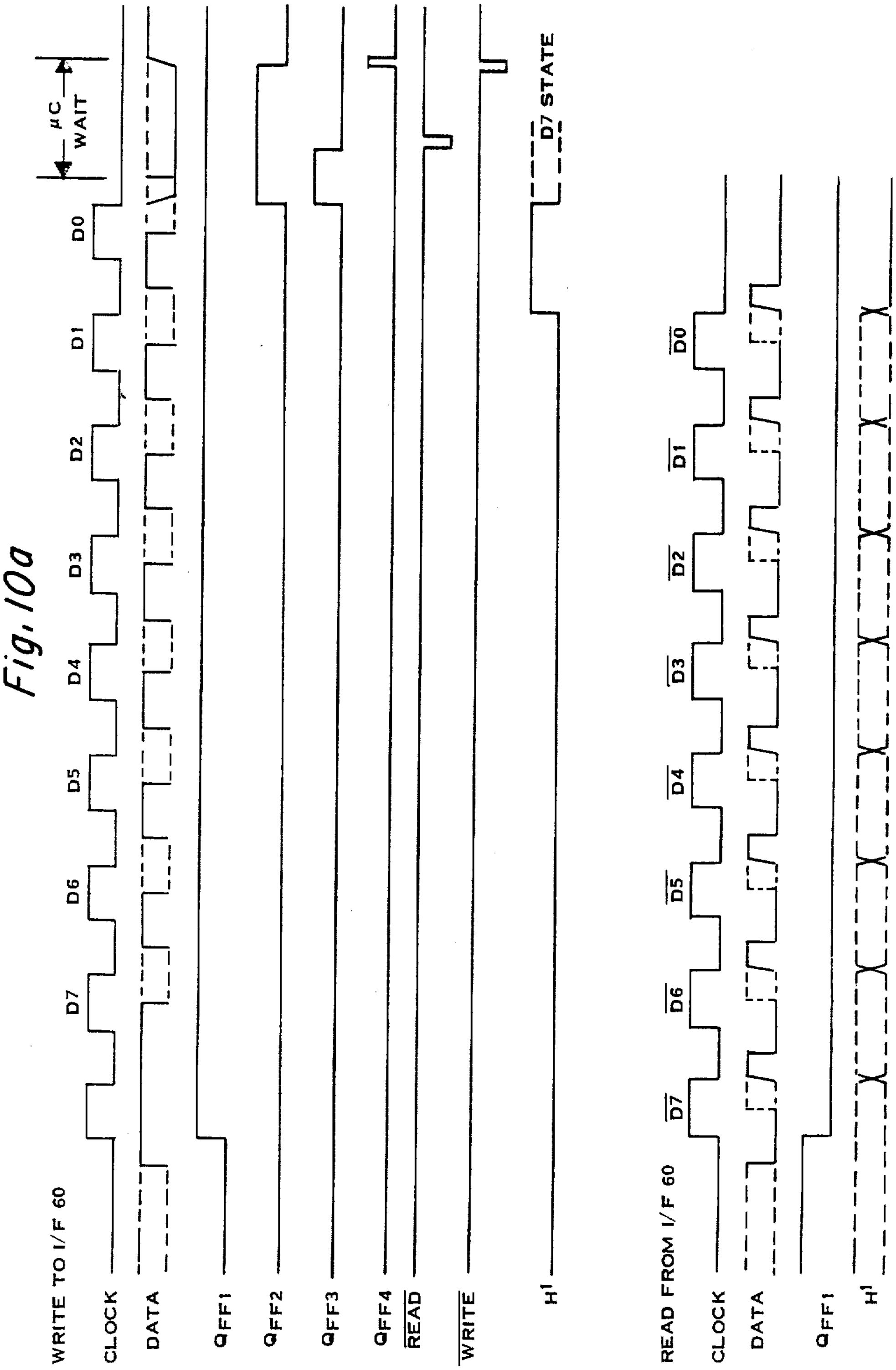
FIG. 10*a* is a timing diagram showing the relationship of the signals in the keyboard interface unit.

Referring now to FIG. 10, I/F 60 converts serialized data from keyboard data 58 to a parallel form in a tristate output shift register 168 for output onto I/O data bus 46. Flip-flop circuits FF1–FF4 control the data transfer to shift register 168. FF1 determines whether I/F 60 is in a read or a write mode and controls the data path. FF2 signals microcomputer 64 that CPU 10 is still processing data and is not ready to read. FF3 sends an interrupt signal to CPU 10 to indicate that the data in register 168 is available for reading, and FF4 establishes a time-delay to stabilize the data transfer into register 168 from the I/O data bus 46. The signals that appear on the left hand portion of FIG. 10 are from CPU 10. This arrangement reduces the processing load on CPU 10 while expanding the versatility of keyboard unit 58.

FIG. **10*a* is a timing diagram showing the relationship of various signals in I/F 60** to the clock and data signals.

The clock signal is generated by microcomputer 64, and the serial data in the read and the write modes is bidirectional.

PREFERRED MODE OF OPERATION

Appendix A forms a map, in hexadecimal code, of the contents of the GROM program storage memory 52. These data are instructions that cause the present system to operate in a prescribed way. The instructions include device service systems, application programs, protocols, command processors and the like. Such instruction lists are known for causing perpherial devices to operate in a desired manner. These instructions are sent to the DRAM memory 48 via system microprocessor CPU 10 shown in FIGS. **1*a* and 1*b*. Similarly, Appendix B forms a map of the contents of CMOS RAM 30 which, when connected to battery 31, provides nonvolatile terminal configuration information which is used by the system after a power off condition. Appendix C forms a map of the contents of system ROM 27**, which contains the system initialization instructions.

The program instructions stored in memories 27, 30, and 52 were written specifically for a Zilog Corporation Model Z-80 microprocessor (CPU 10). However, similar microprocessors will work equally as well in the disclosed system. CTC 18, DART 20 and SIO 22 are also available from the Zilog Corporation and are compatible with the present system. Upon power up, CPU 10 first initiates self-tests on each of the ROM memories. Then the operating system DRAM 48 is loaded in a predetermined sequence from the GROM 52. The system is then ready to either accept a message from the host computer or to perform a task under local operator control.

Thus, there is provided by the present invention an electronic data system including means for segmenting a display screen into a plurality of independently controllable vertically and horizontally split regions. Smooth or discrete scrolling operations may be performed in any selected horizontal or vertical split region. The display controller system, which operates asychronously with the system microprocessor provides access to the display memory character ROM and character RAM as input/output devices rather than as directly connected memory. The display controller accesses and modifies data in display memory by means of line attributes or pointers associated with each row of characters therein. This system permits data to be rearranged in display memory and on the display screen on an individual region basis without the transfer of whole blocks of data, which is required in systems using software for display control.

Other embodiments and modifications of the present invention will readily come to those of ordinary skill in the art having the benefit of the teachings presented in the foregoing description and drawings. It is therefore to be understood that this invention is not to be limited thereto and that said modification and embodiments are intended to be included within the scope of the appended claims.

GROM

```
:10410000073860A4632D81DE66DE66DE669E650686
:104110008970681000000000000000000000008F
:10412000000000000000000000000000000000008F
:10413000000000000000000000000000000000007F
:10414000000000000000000299018101910199012 5
:1041500089028102890291 2D891F8187650D81075E
```

APPENDIX A

GROM

:1041600081078932810E8112602560138128812 8A0
:104170009928A119817964CE64FE63A4630C81003F
:1041800000178138652889289118812981 3F612588
:104190008126812381248145610000000000000008
:1041A000002C811C811C890A81158916811581 16B4
:1041B000890000000000D65A464279127991D811DC9
:1041C000892781278900000000000000000012811E5D
:1041D000811E8929892991128 92D992D8927B12E2E
:1041E000890000 2E8103810000058115610589 1E6B
:1041F0006100000981000006801481228121811163
:10420000812E912289208120892 7A122911081105D
:1042100089109 10F811E9907901EA930812F810767
:10422000A01E911EB11EB92DA113802DA913883295
:10423000893981118011883489088919892D91085B
:10424000811991318931810B813B89348135893 2E2
:10425000912A892B891EC11EA11189368 10A8022C8
:1042600099388122A138893A913A813A8933813348
:1042700089339107800788079807A807B003800350
:104280008804800580 3A9927A92DB114890000007F
:10429000002A8108800980098809902B81378100D4
:1042A0000000888089008983B813C813C8910803E3A
:1042B000813E893F813F8935810F803D8115801482
:1042C0008040814181 07B88048104890491049904E4
:1042D000A1319126891A811B81258912800B8021A9
:1042E0008932991D911D9900000000000000000016
:0542F00000000000000C9
:0542F700000001774901
:0242FE000000BE
:06430800604B6E4B7C4B84
:01432F000786
:0543F6000000B24B00C5
:1044A100F3FDE5E5F521A54B34FBD5DDE57EFE0108
:1044B1002007ED73A34B31544EFD360100FD7E0004
:1044C10021C944CDC400EBE94850DB440051DB4431
:1044D100DB44A04FDB44EC4E544FFD3601FFCD458C
:1044E1005021A54B7EFE012004ED7BA34BF335DD6E
:0F44F100E1D1F1E1FDE1FBC9F3AF32A54BFBC90E
:10496F007149205000800000000017001740171CED
:10497F007D1C7D0000FFFF00000017001740171C73
:08498F007D1C7D4F00FFFF00BD
:1049B50000000000000001B5900001B58000000000B
:0749C50000001B001B340081
:0449D0001C7D00004A
:014A8B00002A
:104B6000FA743275CD75C5761779C979347A000033
:0D4B7000000000000000000000000000000038
:104B9B0000009B4B00000000000000000000000024
:104BAB00040000000924C0000C24BD44BE64BF8C3
:104BBB004B0A4C1C4CC44B0000D64B2E4D00000333
:104BCB00011000000000C9760000E84B124D00F8
:104BDB0000030200000000000000000000FA4B4A36
:104BEB004D00000303100000000002F7800000CA4
:104BFB004C6E4D000003041000000000BE7B0053
:104C0B00001E4C804D000003050000000000000005A
:104C3B004C3E4C4C4C0001010000000000464C0[illegible]
:104C4B00005A4C00020200000000000544C000068A7
:104C5B004C000303000000000006 24C0000764C0087
:104C6B00004040000000000070 4C0000844C0005059B
:104C7B0000000000007E4C000000000000606000053

```
:104C8B000000008C4C00009B4C01001757010001E9
:104C9B00A44C0200C256000000AD4C0300625C0045
:104CAB000000B64C0D00835C000000BF4C1E00F7EB
:104CBB005B000000C84C53009C5B000000D14CE52E
:104CCB00009C5B000000DA4C53079C5B000000E388
:104CDB004C0100685D010001EC4C0200835F000099
:104CEB0000F54C9F249D6000000000000005007651EC
:074CFB00000000000000000B2
:104EB000F33A9F4B47AF329F4B78FBB7282D11C079
:104EC0004BB728ECEB47CDD30078D5DDE1DD2BDD0A
:104ED0002BDDCB0A5E28EADD4609FD21FE4CFD7084
:104EE00002CDA144DDCB0A9E3D18D6C9FD7E02212C
:104EF0002E4CCDC400D5DDE1DDCB0276201AEB11BE
:104F00000A0019FD5605FD5E04CDF100CD8000D5E7
:104F1000DDE1DD7702C3E244DDCB02B6FD5605FDDF
:104F20005E04DD660DDD6E0CFD7E02DDE5E5DDE196
:104F3000DD7702DD7304DD7205CD8000D5FDE1DD96
:104F4000E1FD7702DD7E04CDDA00AFDDE5D1CDF005
:104F500050C3E244FD7E02212E4CCDC400CD800022
:104F6000D5DDE1EB11080019CDAE00280FDD7E0381
:104F7000FD7702FD7205FD7304C3E244FD7E03B7B5
:104F80002817DDCB02F6FDE5E1DD740DDD750CCDF6
:104F90008000DD360804C3A850FD360102C3E24498
:104FA000CD8000DDE5D1AFCDF050C3A850ED73AC9E
:104FB0004B31A84EE5F521AE4B34FB21AB4B3520F0
:104FC00053604CDCC4F2AAC4BC32150C5D5DDE509
:104FD000FDE521B04BCDD300283FEBE5DDE1DDCB96
:104FE00084628F1DD5E06DD56071BDD7306DD721F
:104FF00077BB220E0E5DD6E04DD6605CD2050E1E3
:1050000E5DDE1300EDD7E02DD7706DD7E03DD7756
:10501000718C2DDCB088618BCFDE1DDE1D1C1C9AE
:1050200E9E5F321AE4B35E122A14BF1E1ED7BA1A6
:105030004BFBED4D313A4ECDB04E219B4BCDAE00EA
:1050400C28A0018EF7618FDFD7E02CDDA00DD7E03
:10505000008215C50CDC400EBE9CD455059506950 52
:10506000695098507150C3E244DD7E08FD77011805
:10507000F5CD7750C39850DDE5213C4CCDD300EB06
:10508000E5DDE1FD7E02DDBE0420F1DDCB02762808
:10509000EBDDCB02B6DDE1C9DDE5D1CDF05018C6C0
:1050A000DDE1DD22A94B1808DD210000DD22A94B3E
:1050B000ED7BA34BDDE1D1F1E1FDE1FDE3DDE5F5C4
:1050C000E5C5D5DD2AF64321000022F64339DD751A
:1050D00004DD740531544EFDE5E1DD7407DD750630
:1050E000AF2AA94B7CB52007213450E521F944E9CA
:1050F000D5DDE3DD360802219D4BCDF100DDE1C9B0
:10510000CD8000DD360803FD22A74BCDA050213411
:1051100050E521F944E5FD2AA74BFD6607FD6E0623
:10512000E5DDE1FD6605FD6E04E9DDE5E5CDDA00CE
:10513000DD7E08216C51CDC400EBE9DD7E0837E14E
:10514000DDE1C9ED5FF5F3DDCB0A5EDDCB0ADE20E4
:1051500014F1E25651FBD1DD7207DD7306219F4B3E
:1051600034AFDDE1C9F1E23B51FB18CF59503B515F
:105170003B51435143513AF742B720333A2C43FE57
:1051800002282C3A313ECB5F28253AF94221F842D9
:10519000BE2055B7204C212E43CB46772811CD0099
:1051A00052CD4700E13E01CD3C603AF642D378371C
:1051B000C9CD7460210000DD215144FD2101441E50
:1051C00032CD4D003A2043B720DA322D431E1ECD8E
:1051D0004D003AF542FE8420CB5F16001DCD1F52D4
```

:1051E00018C23A2D43B728C7CD00523AF642CB8FAA
:1051F000D3783AF94232F842B720B6CD470018A426
:10520000DB7D6FDB7C67E3E9F547DD4E0BDDE5D148
:10521000CD5300C1E50E00CD5300D1CD1F52C93E84
:1052200000ED4BFE42CD3C60C93AF942EE0132F945
:1052300042C932385 2CD3A5200C9C33B00FD210D5E
:1052400053FFFD5E04FD5605D5DDE1AFDD7704DDDF
:1052500077 05DD7E02FE022806DD213A531804DDC3
:10526000212F53DD7301DD720218D2DD224953D79D
:10527000DD2A4953CDD9523005CD015318F6FD66CC
:1052800003FD6E0478FE01FA9252280CFD360708E1
:1052900018 1FFD3607041804FD36070871FD340495
:1052A0001640FD7E02FE0228021687FD7E04BA200B
:1052B00005CDBD52180578FE0128F6CFC9FDE5D110
:1052C000FD212953FD7304FD7205DD7E00FD77028B
:1052D000FFAFDD7701DD7702C9E5DD6E01DD660236
:1052E0007DB4E3FDE1C037C9DDE5F5DD213A53CDFD
:1052F000D9523808CDD152F1DDE1B7C9F1DDE1373E
:10530000C9FDE5FD214553FFFDE1C9080005FF008A
:1053100000000000004500000401000000460000 04F9
:105320000200000048000000000070002003 25302A3
:105330003253000000490000050103 3D5300000006
:105340004A000005010501000000000DD21975CFD19
:1053500021 0154FFFD6E04FD6605E5FDE1FDCB076F
:1053600046204C3E01DDBE20C2DF53FDCB074E2060
:1053700009FDCB07662058C3DF53F3CDE553FD216C
:1053800001 54FD5E04FD5605DD731DDD721ED5FD65
:10539000E1FD5E04FD5603DD731BDD721CFBDDCBFE
:1053A0001266283B3EFFCD3655DDCB12A61830DD08
:1053B000362001FDE5E1DD751DDD741EFD6E04FD89
:1053C0006603DD751BDD741CDDCB11E6C34B53DDBD
:1053D000362000DDCB11A6EBCDE553CDF553EBCD5B
:1053E000F553C34B53DD6E1DDD661EDD7E1BE5FDF3
:1053F000E1FD7704C9FD210754FD7504FD7405FF27
:10540000C9080001FF00000700040000 00DD21972B
:105410005CDD361A01FD217F54FFFD6605FD6E043B
:10542000E5FDE1DD7418DD7517DDCB1256201EFD9C
:105430007E04B72818DDCB11D6DD7714FD5603FDA9
:1054400005E05DD7216DD7315FD218B54FFDD361A06
:1054500003E5FDE1DDCB234620113A443ED6202072
:105460000AFDCB075E2804DDCB1196FD7E06FD21EB
:105470008554FD7405FD7504FD7702FFC30D5408C6
:10548000 0002FF000007000000000000020 00000DE34
:1054900055975CED73DC5531EE49E5F521AE4B34A3
:1054A000FBDDE5D5C5DD21975C21C955DD4E013E0B
:1054B00001ED79ED781E30ED59C86728073A0F3EA4
:1054C000CB6F202DDD4E00ED581E1A3A3C3ECB6FBF
:1054D000203A3C323C3E1834ED73DC5531EE49E560
:1054E000F521AE4B34FBDDE5D5C5DD21975C21C947
:1054F00055DD4E00ED78E67F5F010900EDB9200C27
:1055000021CA55CB21094E2346C5E1E9DD6E1BDDDD
:10551000661C733EFFBD280A2CDD751B3EC095CC72
:105520003655DDCB12AE214C1D22D74CC1D1DDE169
:105530002ADC55C32150DDCB23462844DDCB235E36
:10554000201DB7280B0611CD9E56D0DDCB12C6C943
:10555000DDCB12E60613CD9E56D0DDCB12CEC9B7F9
:105560002808DDCB23662012180ADDCB12E6DDCB3E
:1055700023662806 3E0132033BC93E0032033BC985

```
:10558000DDCB2356C8B726EC18F01896DDCB12EE09
:105590001894DDCB12DEC32255DDCB129EC32255FB
:1055A000DDCB12FEDDCB11D6C30C55DDCB244E284E
:1055B00006CDA45BC32255DDCB126EC4A45BC3220F
:1055C00055000000000000000000AB55A055A0559C
:1055D000A055A05599559255BC558A550000DD214E
:1055E0009775CDD361A02CD2156C9ED73D156316074
:1055F0004BE5F521AE4B34FBDDE5C5DD21975C3E87
:105600002DDBE1AC49656200FDD7E14A7CC855647
:10561000CC96562803CD2156C1DDE12AD156C321AF
:1056200050DD4E00DD7E12A72814CB4728060611 58
:10563000CD9E56C9CB4F28060613CD9E56C9CD4DDB
:1056400057DDCB125E2804CDAF56C9DDCB125628EC
:1056500007CD8556CD9656C9DD6E15DD66167EE6FC
:105660007FDDB62147DD3415DD3514ED41214C1DBC
:1056700022D74C7801040021C255EDB1C0DDCB1119
:1056800096CD4D57C9F5DD361A03214D543E02D54E
:10569000CD2A51D1F1C9DD4E013E28ED79C9DD4E4B
:1056A0001ED78CB572806DD4E00ED41C937C9DD45
:1056B0004E013E28ED79DDE5DD219B4CCD8360DD9B
:1056C000E1C9DD21975CDDCB125E37C0CD2156AF3D
:1056D000C90000ED73E85C31304BE5F521AE4B3489
:1056E000FBDDE5DD21975CDDCB1346201ADDCB1316
:1056F000C6C5D5CD5357CD7357CD8D57CDC75AD1CC
:10570000C1DDCB13861804DDCB13CE3E10D3F6DDFE
:10571000E12AE85CC32150DD21975CDDCB134637DD
:10572000C0DDCB13C6CD7357CD8D57DDCB1276DDE3
:10573000CB12B6C4C75AF3DDCB134EDDCB138EFBB1
:10574000F5C45357F120DEDDCB138637C9D7CD170B
:1057500057CFC9DD4E01ED78CB3FCB3FCB3F47F66E
:10576000FE4F78CB3FF6FDA14FDD7E11F603A1DDA4
:105770007711C93A003B2FF69F4FDD7E11F660A1ED
:10578000DD77113AE75CB7C8DDCB11EEC9DD7E11DC
:1057900047DDAE104FC8DDCB12F6CB61203CCB69A4
:1057A000205EDDCB1066C8DDCB106EC8DD7E10E656
:1057B00007CB275F160021CC57E521BC5CDDCB234E
:1057C00046200321CC5C195E2356EBE9DD7E10DD1B
:1057D0004611A8C84FE6FBC818D2CB602814DDCB11
:1057E0000BFECD245ADDCB10E6DDCB106EC4165B6C
:1057F000189BDDCB10A6DDCB13AECDB55BC38D57AB
:10580000CB68280EDDCB10EEDDCB1066C4165BC373
:105810008D57DDCB10AECDA45BC38D57CDFE59C9DE
:10582000CB41C2AC59CB49C48759C4125AC0CB71C1
:10583000C2435AC3375ACB41C2BD59CB49C4875919
:10584000C2125ACB71C2435AC3375ACB49C4A75963
:10585000C21C5ACB41C2AC59CB71C2435AC3375A4E
:10586000CB49C4A759C21C5ACB41C2BD59CB71C246
:10587000435AC3375ACB412819CDAC59DDCB1396C7
:10588000DDCB13A6DDCB12D6DDCB2356C8AF32035A
:105890003BC9CB71280ECB702005DDCB10B6C9DD1E
:1058A000CB10F6C9CB51CA375A3EFF32033B3A44BC
:1058B0003ED620CAC858DDCB127E2807DDCB12BEEB
:1058C000C2C858DDCB1356C8DDCB2446CAFE59DD0D
:1058D000E5DD21BF4CCD8360DDE1C3FE59C9CB417D
:1058E0002812CDBD59DDCB1296DDCB2356C83EFF25
:1058F00032033BC9CB71CA375ACB702805DDCB10B8
:10590000F6C9DDCB10B6C9CB49CA375ACDA759DD88
:10591000CB2356C83E0032033BC9CB492816DDCB0A
```

:10592000139 6CD8759DDCB23562805DDCB1076C8DD
:10593000CD125AC9CB512804CD085AC9CB71CA37E8
:105940005ACB702005DDCB10B6C9DDCB10F6C9CB24
:1059500051280 9CDAF5ACD085AC31C5ACB49C41C93
:105960005A2044DDCB2356CA375ACB71CA375ACB9B
:10597000702808CD125ADDCB10F6C9DDCB10B6CD9C
:105980001C5ADDCB1196C9F5AF32C74CDDCB13667F
:10599000280FDDE5DD21AD4CCD8360DDE1DDCB13EE
:1059A000A6DDCB10CEF1C9DDCB108EC9DDCB10C684
:1059B000AF32C74C32D04CDDCB09C6182EF5DDCB4B
:1059C0001086DDCB2446281EDDCB2346200DDDCB03
:1059D000127E20123A443ED620280BDDE5DD21BFA1
:1059E0004CCD8360DDE1F1DDCB0986F5C5DD7E09B7
:1059F000603DD4E01F3ED41ED79FBC1F1C9DDCBCD
:105A000010D6DDCB0BCE181CDDCB1096DDCB0B8E6C
:105A10001812DDCB0BDEDDCB129E1808DDCB0B9E02
:105A2000DDCB12DEF5C5DD7E0B0605DD4E01F3EDA7
:105A300041ED79FBC1F1C9DD7E11E604DDB610DD73
:105A40007711C9F5C5DD7E23CB4F2012CB5F202C0B
:105A5000DDCB10F6CB702054DDCB10B6184ECB70DA
:105A600020083E20DDCB10B618063E08DDCB10F630
:105A7000DD4E02DD460EED41ED791830CB70200C85
:105A8000DDCB10B6DDCB236628181 80ADDCB10F667
:105A9000DDCB2366200CDDCB235E2810DDCB12DEB0
:105AA000180ADDCB235E2804DDCB129EC1F1C9F3B9
:105AB000DD4E01ED78CB5728F73E0306FF10FE3D83
:105AC00020F9DDCB1196C9DD7E1047E630EE302897
:105AD0000C3E1FDDCB136E280F3E20180B21DC5C23
:105AE00078E6074F0600097E21E45CBEC4E66C77C9
:105AF0003E18DDCB104620023E1721E55CBEC4E611
:105B00006C773E1ADDCB106E20023E1921E65CBE9A
:105B1000C8CDE66C77C9DDCB13D6DDCB12DEDDCB8D
:105B20001296DD7E23CB472804DDCB11D6CB472848
:105B300018CB4F200ACB5F2810CB6720101 80ADD46
:105B40007E22E60FFE04FA4D5B3EFF18023E003255
:105B5000033BDDCB245E280BDDE5DD21D14CCD837D
:105B600060DDE1DD7E24DDCB105E2806CB6F2006F4
:105B7000180CCB672808DDCB11D6DDCB13E6DDCBC7
:105B800024462817DDCB13662806DDCB2356280BC9
:105B9000DDE5DD21C84CCD8360DDE1C9DD21975C09
:105BA000DDCB13EEDD21975CDDCB11662807DD210F
:105BB000B64CCD8360DD21975CAFDD7711DD7710CA
:105BC000DDCB0BBEDDCB0B8ECD245ACDE759CD1CE2
:105BD0005ADDCB235E2805CD6A5518053EFF3203FA
:105BE0003BAFDD7712DDCB12D632C74C32D04C3210
:105BF000D94CCDC75AAFC9DD21975CDDCB116620EA
:105C00000ADDCB116E37C0DDCB11E6AFC9DDE5DDB6
:105C100021975CDDCB135E2036DDCB2346201BDDD8
:105C2000CB104E2015DDCB12FEDDCB11D6DDCB2304
:105C300056281 93EFF32033B1807DDCB0BE6CD2477
:105C40005ADDCB13DEDD21A44CCD8360DDE1C9DD5F
:105C500021A44CDD7E06FE06F25F5CDD360606DD25
:105C6000E1C9DD21975CDDCB0BA6CD245ADDCB232A
:105C700056280ADDCB104E2004AF32033BDDCB1398
:105C80009EAFC9DD21975CF3DD6E1BDD661C36051A
:105C90002CDD751BFBAFC9F4F6DC180000144713AC
:105CA000401520111717080000000000000000000038
:105CB00000000000000000000000000001C581C58FC

```
:105CC0001C581C58205836584B586058755BDE5888
:105CD000759375A1A59375A4F59375A211C211C1C
:105CE000211C1B1DFFFFFF000000ED73665E3100ED
:105CF0004BE5F521AE4B34FBDDE5C5D5DD21405E3E
:105D0000DD4E01ED78CB672821DDE5DD21975CDDF7
:105D1000CB11DEDDCB10DEDDCB10662007F53E2299
:105D2000CDE66CF1DDE1E624282A3A0B3EE60328B5
:105D300023DDCB134620199DDCB13C6CD5357CD9FA2
:105D40005DCDB85DCD0F5ECD2B5EDDCB1386180427
:105D5000DDCB13CED1C13E10D3F7DDE12A665EC3A1
:105D60002150D7CD685DCFC93A0B3EE603C8DD218F
:105D7000405EDDCB134637C0DDCB13C6CD9F5DCD76
:105D8000B85DF3DDCB134EDDCB138EFBF5C453575B
:105D9000F120E9CD2B5ECD0F5EDDCB138637C93AFE
:105DA000003B2FCB27CB27CB27CB27F69F4FDD7E82
:105DB00011F660A1DD7711C9DD7E1147DDAE104F10
:105DC000C8CB612011CB69201ADDCB1066C8DDCBB2
:105DD000106EC8C3AC57DDCB10E6DDCB0BFECD2477
:105DE0005A18D5CB682816DDCB10EEDD3620013AE7
:105DF0003D3ECBD7323D3EDDCB129618BBDDCB10FE
:105E0000AEDDCB12D6DD362000DD36101018A93EEF
:105E100026DDCB1256200A3E24DDCB125E28023E40
:105E20002521655EBEC877CDE66CC9DDCB125E3A32
:105E30003D3E2006CB87323D3EC9CBC7323D3EC9F1
:105E4000F5F7DD1812D01447134015201117170865
:105E50000000000C000000000000000000000000036
:105E6000000000000000260000DD21405EFD21C15E33
:105E7000FFFD6605FD6E04E5FDE1DD7418DD7517B7
:105E80003E01DDBE20280A3A3D3ECBCF323D3E18D2
:105E90019FD7E04DD7714FD5603FD5E05DD7216E7
:105EA000DD7315FD21CD5EFF1800E5FDE1FD7E06E9
:105EB000FD21C75EFD7405FD7504FD7702FFC36813
:105EC0005E080003FF00000700000000000002000061
:105ED00000D55E405EDD21405EDD361A02CD265FD4
:105EE000C9ED73925F31C04AE5F521AE4B34FBDD5D
:105EF000E5C5DD21405E3E02DDBE1A2019DD7E14BF
:105F0000A72805CD265F1815DD361A0321AA5E3EA7
:105F100003D5CD2A51D1DD4E013E28ED79C1DDE119
:105F20002A925FC32150DD4E00DD7E12A72814CBDC
:105F3000472806061 1CD9E56C9CB4F28060613CD1D
:105F40009E56C9CD625DDDCB125E280CDDE5DD21FC
:105F5000E34CCD8360DDE1C9DDCB1256280FCD08BF
:105F60005FCD165F3A3D3ECBCF323D3EC9DD6E156B
:105F7000DD66167EE67FDDB62147DD3415DD35149E
:105F8000ED41C9DD21405EDDCB125E37C0CD265F1D
:105F9000AFC90000ED73E45F31D04AE5F521AE4BA7
:105FA00034FBDDE5C5DD21405EDD4E00ED78E67FAA
:105FB0006FDD4E013E01ED79ED780630ED41E67082
:105FC0002019DDCB235E20137DFE112006DDCB12D0
:105FD0009E1808FE132004DDCB12DEC1DDE12AE4A9
:105FE0005FC3215000000000ED73E65F31004AE519
:105FF000F521AE4B34CD3B012AE65FC32150F5C5F8
:10600000E547E6F0FE60200332FA433E1EDFE1C1C1
:10601000F1C9F5E521403ECBC63E28CDFE5FCD3B24
:106020006D03E1F1C9F5E521403ECB863E20CDFE72
:106030005FE1F1C9CDB16CC03E24DFC9D7F5AF3205
:10604000FD4CF1FE01285EFE0D380AFE13DAFC60FD
:10605000C615DF1815F5DFF1FE082804FE09200A31
```

:10606000ED43CC49CFED4BCC49D7DD21F54CCD8369
:1060700060CFC9E93E25DFDDE5DD21EC4CCD836055
:10608000DDE1C9ED5FF5F3DDCB08C6DD7E02DD772E
:106090006DD7E03DD7707F1E29C60FBC9AFCBF73D
:1060A00032003037C9E53A34473C013030FE6438BD
:1060B000304D664FE0A38050CD60A18F7C630DD8C
:1060C00215C44DD7000DD7101DD77023A313ECBA9
:1060D0005F281F3AF742B7201F3A2C43FE022812CE
:1060E0003AF842B7280CFD210C44210B001E03CDC9
:1060F0004D00E13E01DF1801E1C36A60FD22024369
:106100003E88D379FD3601013E91D379FD7E01B7FA
:10611000CA6A6018F7213B3ECBCECD7460C9213BE3
:106120003ECB8ECD9D60C9E52A344722874A2A3668
:10613000472234447E1C9E52A874A2234447E1C92189
:106140003B3ECBC6C9213B3ECB86C9CD51633E0108
:10615000CD3C60C9BDBEBF000000000000000000D7FC
:10616000CD1763CD27613E01325761 3A023ECB47DE
:10617000CC0A631808D7CD1763AF325761CD51638E
:10618000225D61DD2AFA423A8A4AFEFF2807473A31
:10619000BD49B72803DD460B78325C61FD2A5961A1
:1061A000FD7E0032586 13AF543FE012850216049D6
:1061B000CB46280A3A5861B7282AFE202826CD2F38
:1061C00063FD7E03E603B7281B215461DD21113EE8
:1061D0003D4F0600097E32E0613A586157CD3A5290
:1061E00000C2D3622A5D613A023ECB4720123E08CC
:1061F000CD3C603A3F3EE607CDF76218452A5D6127
:10620000AFE5211947CB7E200623CB7E28213C3CDD
:10621000C1C5F5E5C5E13E08CD3C60E179E63F4FFB
:10622000F13D7ECBBF2803A11801B14FE11805E174
:10623000ED4B18473A3F3ECB3FCB3FCB3FE607CD38
:10624000F7623A586157CB78422804CBF81802CB52
:10625000B8CB69280EDD2AFA423A3447CD276320AD
:1062600002CBA93E02CD3C60CB69280A23E521344C
:106270004734E1CD3C60DD2AFA42225D613A576144
:10628000B7201B3AF543B7280D3A3447CD27632092
:106290002FCDFE63183ACDEE67CD20631835DD7E35
:1062A0002DD960157DD5E0B2A3447AFED52200820
:1062B000223447CD2063181B3A3447DDBE0B280D2E
:1062C00213447342A5D6123225D611806CDF963CC
:1062D000CD20632A5961232259613A5B613D325BCB
:1062E00061C29C613A5761B7280BED5B3447ED53AF
:1062F0003647CD3661CFC9CBB8CB4F2802CBF8CBD0
:10630000F1FE01C8FE02C8CBB1C9F53AF642CB8F07
:10631000D37832F642F1C9FD2259617932 5B61C905
:10632000CD5163225D61C9D5ED5B5C61BBD1C9CD47
:106330003663CD3E00C9C5FD21A149ED4B3447FD73
:106340007004FD7105ED4BFA42FD7100FD7001C155
:10635000C9ED5BFA42ED4B3447C35300F5060E809E
:10636000DFF1C91602B72802CB22C93A053EE60181
:10637000CD5C63C9E5D51EC6180BE5D51186001 89E
:106380004E5D51E46D6083803 2318F9ED443DCB65
:1063900027CB27CB27B3329A63CB46D1E1C936004E
:1063A0002310FBC9D7ED4B3447DD2AFA4279B728D1
:1063B000340D3A894AFEFF280CB9FAC56328063A1B
:1063C000BD49B72820ED433447CD51633E08CD3C4D
:1063D00060213447CB69280B35F2E363341806EDAE
:1063E000433447CFC9CD7964ED4B34473A8A4AFEEE
:1063F000FF2003DD7E0B4F18CCD73E011802D7AF2C

:10640000328665CD51633E08CD3C60C5D1ED4B343D
:1064100047CB6B28010C0CDD2AFA42DD7E0BB93824
:106420003B3A8A4AFEFF284A3A8665B72044CDB1F6
:106430006C201D3A313ECB7728163ABE493CB9282C
:1064400008CB6B280B3CB920073E10CDFE5F18220D
:106450003A8A4AB9301C3ABD49B72016CDCE64ED10
:106460004B34473A8665B720073A894AFEFF200138
:10647000AF4FAF328665C3DF63D7ED4B3447DD2ABC
:10648000FA42DD7E03B8280405C3DF63DDCB056E69
:10649000200D3A023ECB4F2806DD4604C3DF63CD14
:1064A000A464CFC9DD2AFA42DDCB0576281CDD7E47
:1064B00003B72011DDCB056E20103A5F49B72805E0
:1064C000CD3A52F3C9CD3A52D4C9CD3460C9D7EDD3
:1064D0004B3447DD2AFA42DD7E04B8280404C3DFCA
:1064E000633A8665B7280EDD7E02DD9601B820EDA1
:1064F000600C3DF63DDCB056E200D3A023ECB4FB5
:106500002806DD4603C3DF63CD0D651895DD2AFA45
:1065100042DDCB057628B3DD7E02DD9601DDBE04CB
:106520002011DDCB056E20A23A5F49B72805CD3A90
:1065300052F0C9CD3A52CFC9D7DD2AFA42DD46031F
:10654000AF4FED43344732BD49DDCB057E2030DD12
:10655000CB056E282ACD2F63FD7E03E603FE0320C4
:1065600005CD500038119DD7E04FDBE063811FD7ED4
:1065700006DDBE033809FD4606FD4E07C3DF63EDA9
:106580004B3447C369640021184 77EE6C0F5FD7EA1
:1065900000E63FC1B07723AF772377C90000D5AFBE
:1065A00032BD493A043E2A6F49DD2AFA42DDCB0565
:1065B0006ECA8566CD2F63FD4606FD4E07CB47C2EA
:1065C0004866FD360500CD3E00CD54672006323406
:1065D00047C3A666C5CD9D6CC12825CD3A529ADA2F
:1065E000A666AF323447CD2F63FD4603CB50CAA613
:1065F000662A3447E5CD3A52CBE1223447C3A6663A
:10660000CD41003012DD2AFA42DDCB0F46CAA66624
:10661000CD3A5264C3A666FD6606FD6E07E5AFED92
:1066200042E12006ED433447187CCD9D6C200CCB15
:106630006028CDFD4606FD4E0718E9E5CD3A529A91
:10664000E138632234471 89ECD5E67200BCD6E671C
:106650002054CD3460C3C265FD3404FD360500CD41
:106660003E00CD54672008323447CDCE641837CD74
:106670003A529A3831AF323447CDCE64CD2F63CD04
:106680003A529C1821CB47C4E266ED4B3447ED5B90
:10669000FA423A894AFEFF28093ABD49B73A894A7F
:1066A0002801AF323447D13A2753CB67282FCD4941
:1066B00067282A1601219C653A043ECB4728063EEE
:1066C0000A77CD2E6C3A0F3ECB5FC83A443ED620B7
:1066D00028083A453E77CD2E6CC9CD4F6CC93E0196
:1066E0001801AFF5D52A6F49DD2AFA42DDCB056ED8
:1066F000283ACD2F63FD4606FD4E07CD5E67200A82
:10670000CD6E672041CD346018 3CFD3404CD3E0091
:10671000CD54672005CDCE64182CCD3A529A382638
:10672000CDCE64CD2F63CD3A529C181AED4B344731
:106730003A894AFEFF2808577 9BA4AFA3F674FED6F
:10674000433447CDCE64D1F1C9CDB16C2004CDB670
:1067500006CC0AFC9FD6606FD6E07AFED42C9DD2A0C
:10676000FA42DD7E02DD9601ED5B3447BAC9DDCB2E
:106770000F46C8F5CD3A5264F1C90E00D5E5FE20AA
:106780003018ED5B2653CB722825CB402008CB6216
:10679000201D0E0418080E841804CB4020F8E1D107

```
:1067A000C9573A0F3ECB5728263E45CBC918EF05AF
:1067B0002018FE1A28E00E82FE0520023E80FE0F01
:1067C0002804FE0E20D8CBE118D4FE1F28D3573A58
:1067D0002753CB677A2004CBC918C3573A0F3ECB57
:1067E000472006CBC9CB572002CBD97A18B079CD38
:1067F000BC6CFDCB00DEFDE5FD21A149FD460FFD92
:106800004E0EB7ED42FDE12024DD2AFA42DDCB0534
:106810006E281AFDCB006E280AFDCB00662009CD3C
:106820003A52F7FDCB0066C8CD3A5209C9CB6F2862
:1068300004213447 35CDFE63C9C5FDE5FD216B68F4
:106840000E01CDB76BFDE1C1C9C5FDE548CDB76B04
:10685000FDE1C1C9CB71C4396847CD4968C9C5CB11
:1068600071C439680E01CDB76BC1C91BE53A6149E6
:10687000C620328868 3A6449C620328A682187680F
:106880001604CD2E6CE1C91C001E00DD2AFA42CD93
:106890002F633AF543FE01C8DDCB057E37C0FD7E90
:1068A00003E603FE0337C8B7C90000D7CD2F63FD49
:1068B00022A968CD3B6D063A2753CB772806CD3BFE
:1068C0006D36182FFD2AA968CD9D6C2006CD3B6D35
:1068D00021820C5060990ED4432DF68CD3B6D00FB
:1068E000C1CB782806CD3B6D001808CB702804CDAD
:1068F0003B6D013A0F3ECB572812FDCB036E2806A5
:10690000CD3B6D14180ACD3B6D131804CD3B6D12B1
:10691000CFC9E521403EAFCB6E2802CBC721023E56
:10692000CB562802CBD7213B3ECB462802CBCFCB40
:10693000DFE1C9210C00CD81693A2753CBE732272B
:10694000533E16CDE66CCD0701DD21DD69DD360451
:1069500058DD36056EE9210D00CD81693A2753CB0C
:10696000A7322753AF328B4A3E15CDE66CCD0701D7
:10697000DD21DD69DD3604B9DD36056EDDCB018E46
:10698000E9FD2100473E0AF5E5FD7500FD74013E75
:1069900015DFE1A72807F13D20ED3E27DFF1FD6679
:1069A0003FD6E02C9D5FD5E04FD5605D5FDE1D19E
:1069B000C93A003BCB47280F3ADC69B7200E3C327E
:1069C000DC69CD126037C9AF32DC69C93AC940FE13
:1069D000FF20F23ACA40FE7328E818E90000200OC0
:1069E0000586E00000034505B5D7B7D7975335C30
:1069F0005E393E3F40585976784647010101010112
:106A0000010101020202033448343434 7C7C80806A
:106A100080000000000000700060021530700030 0E3
:106A200000000005000100070001002C6A00000000C2
:106A30000000004100700060 03A6A000000470000 4A
:106A40000004FD21F86BFFFD6E04FD6605E5DDE148
:106A500022FE6B2A3447221B472A3647221D47DD78
:106A60006603DD6E05DD7E0422006C32026CE5FDFE
:106A7000E1DD7E0732F543FE01C26C6BDDCB0656CD
:106A800020473A026C470E01FDE5FD7E00FE2038EE
:106A90000E1007FDE1CDB76B18560CFD2318EBFD6A
:106AA000E30DC4B76BFDE1FD7E00CDB36AFD23109D
:106AB000D5183DFDE5C50601CD7A67CB51C45E68AA
:106AC000CB49C43252C1FDE1C9DD7E04CDE273CBB6
:106AD00049C43460CB61C45468CB512813FD7E0097
:106AE000FD23F53A026C3D06004FF1CD32521800FD
:106AF000DD2AFE6BDDCB0696DDCB069EDD212F5316
:106B0000CDD9523809FD7E04FDB605C4BD52AF573C
:106B10002A3447ED4B1B47ED422801143A023ECB85
:106B2000047281DAF2A3647ED4B1D47ED4228082A5E
:106B30003647223447180915200 62A34472236479B
```

:106B40003AF742B720123A403ECB472003CDAB681C
:106B5000CD126932F642D378CD4B61CD7460CD1A37
:106B600001DD2AFE6BDDCB068EC3426A3AF742FE98
:106B700000202CDDCB0656202CDDCB065E202C7EA3
:106B8000FE20382D3A2753CB6728113A0F3ECB57BA
:106B9000200A1601CD2E6CCB4FCAF06AC3826ACD93
:106BA000AC6FC3F06ACD3A52D218F7CD3A52D3182F
:106BB000F1CD3A52D118EBF5E5FDE5FD56003AF579
:106BC00043FE00200C3A403ECB5F2011CD7561188A
:106BD000103A023ECB4720F4CD5F611804CD3A5203
:106BE00050FDE1E1F1C9FD2A006CFD23FD22006C9E
:106BF0003A026C3D32026CC9080006FF000000003A
:106C00000000001B6900DD21413EDDCB006EC8168F
:106C10000321036C3A554932056CCD2E6CC9D5E57C
:106C200032056C160321036CCD4A6CE1D1C9D71E25
:106C300000DD212F5306003E014EBA2004BB200187
:106C400004CD6B52231520F1CFC9D71E0118E2C520
:106C5000DDE5DD212F530602CD6B52DDE1C1C90117
:106C60001C001E001B281B2921606CE523ED5B6FB7
:106C7000491AE61FC620772323ED5BFA421AE61F66
:106C8000C62077E11604181121646C1602180A2137
:106C9000666C18F7215F6C1601CD2E6CC9FD7E0362
:106CA00047E603FE03C9FD4604FD4E05ED433447A8
:106CB000C93AF543B7C93A0F3EE603C9E5FD6E1080
:106CC000FD66112323E3FDE1C9FD7E06FD7704FD8A
:106CD0007E07FD7705C922DE6CED53E06CC9514497
:106CE000144E570B373D7CD1D6DCD3E6DCFC9CDD9
:106CF000176DE5D1FD6E00260047FD4E02B7280551
:106D00003E05CD3C600620FD7E01B7C8853D5F167F
:106D1000003E00CD3C60C9D1E17E23E5D50106000EF
:106D2000ED5BE26CCD816DCD6E6DED4BE26CE5FD02
:106D3006E04FD660509FD7E03C1C9CD176D3DFAE0
:106D400516DF5FD7E0212E680B602031323F118A1
:106D5000EDC5E1FD7E02FD460105FA646D362012A7
:106D6000231318F5CD6E6D3E01322D43B7C92ADECF
:106D70006CED5BE06CFD7E003DFA806D231318F82E
:106D8000C92100003DFA8B6D0918F919E5FDE1C92B
:106D9000CDA46DFD6E002600FD4602FD4E013E07AE
:106DA000CD3C60C9D1E17E23E5D5010300ED5BE474
:106DB0006CCD816DC9CDA46DCD6E6DFD4E02FD7E95
:096DC000010DFA676D121318F8B9
:06000001455A45584F531B
:106DC900DD21DD69FD21106AFD360008FD3602046A
:106DD900FFFD7E01B7280ACDED6FFD21226AFF185C
:106DE900DFCDA569FDCB0766C25669CDC76F281BE4
:106DF900FD21DD69FDCB0186CD3A6ECDED6FDDCB91
:106E0900014620 0AFD21226AFF18EDCDED6FFD2113
:106E1900106AFD360007FD360201FDE5CDA569FDC5
:106E2900360702FD360400FD360500FDE1FFC3C942
:106E39006D3A8B4ACB4F2009FD212153FDCB064EDC
:106E4900C0DD6E04DD6605E5FDE1CD9070FDE93A32
:106E59002753CB77201F3E1BBE2825EDB120010CFF
:106E6900DD7E0391C54FDD6E02110048EDB0C1CD45
:106E7900A870C3AD6F110048EDB0CDA870C3AD6F58
:106E89002C0DDD3402DD3503CD8D6F7EE5C521FA8C
:106E9900690115 00EDB928043E00182C21FB690988
:106EA9007E47E603202278CB7F203D3A053ECB473B
:106EB900200A78CB2FCB2FE6033C180C78CB2FCBAD

:106EC9002FCB2FCB2FE6073CC1E111004B3C32E51F
:106ED900693AE569EDA03D32E569B72805CD8D6FC1
:106EE90018EFCDA070C3AD6F110048C1E13E46BE99
:106EF9002821CD8D6F3EFFBBCAAD6F7EEDA0FE1B75
:106F090020F0CD8D6F3E29BE20E81B0D2CCDA07041
:106F1900C3AD6FCD8D6F3E1BEDB120F7CD8D6F3EAB
:106F290028BE20EF0D2C3A8B4ACB472805CDA06F00
:106F390018F4CBCF328B4ACDE8523005CDA06F186B
:106F4900F1CDE06FCD8D6F3E1BBEEDA028173E87BA
:106F5900BB20F1CDC170CDE8523005CDA06F18F638
:106F6900CDE06F18DFCD8D6F3E29BE20D70D2C3AAD
:106F79008B4ACB8F328B4A1B7BB7F5CCDB70F1C4C4
:106F8900C170182078B1C0ED53E369DDCB01C6E1CA
:106F9900DD7504DD7405C9ED53E369DD7103DD7544
:106FA9002E1181378B12808DD7103DD75021804B0
:106FB900DDCB01C621586EDD7504DD7405C9DD21FF
:106FC900DD69FD6603FD6E044D2DDD7103DD3602BD
:106FD90000DD740079B7C9FDE5D1ED53206A1E00C3
:106FE900FD5603C9FD213A6AFDCB064EC0CDB169F4
:106FF900D83ACA40FEFFC8473AC9404FCD0E01CD25
:107009006B703EFFB920123E7CB8200D3A2B3ECB67
:10701900672836FD21266AFFC93E80B82007CD0DB5
:107029005CCD0701C93A0F3ECB57201DDDE5DD21B7
:1070390097 5CDDCB2346200FDDCB12562809DDE115
:10704900CD0701CD3460C9DDE1CD5B70210047700A
:1070590018 1B3EFFB92805782FCB7FC0FDCB06DE74
:10706900AFC93EFFB9C83EAAB8C0061BC9FD213A3F
:107079006AFD360401FD360347FD360700FDCB06E0
:10708900CEFD21346AFFC9ED5BE369DD6E02DD6681
:10709900000DD4E030600C93A2753CBD7322753FDEB
:1070A9002121 53FDCB06CEFDCB0686FD360701FD1A
:1070B9007304FD21166AFFC9FD211C6ACDA569FD6E
:1070C9007304AFCBD7FD7707FD211C6AFD36020398
:0C70D900FFC9FD211C6AFD360205FFC93D
:06000001524F4E4C4E452B
:106DC900CDD36DFD21226AFF18F6FD212153FDCB9C
:106DD900064EC0CDB169D83ACA40FEFFC8CDA16FF1
:106DE900473AC9404FCD0E01CD656F3AF742A7200A
:106DF9003EFDCB0676283E3EFFB920053E7CB828ED
:106E09003ECD706FCA866F3E03B82012DDCB014EAE
:106E1900DDCB018ECA866FFDCB06B6C3866F3E10E9
:106E2900B8DDCB018EC2866FDDCB01CEC3866FCDB7
:106E3900706FC3866F3EFFB920333E7CB8202ECDDC
:106E4900A16FFD21106AFD360008FD360204FFFD21
:106E59007E01B720FEFDE5CDA569FD360701FDE1FF
:106E6900FD360007FD360201FFE1C33369CD706FBE
:106E79002007CD866FCD5B6FC93E02B8201ADDCBE6
:106E8900014EDDCB018E2810FDCB06F63E36CDE650
:106E99006CCD866FCD5B6FC9DDCB018E3E10B820FE
:106EA9008DDCB01CECD866FC9DD6E04DD6605E94F
:106EB9003E1BB82804CD866FC9CD556F78C521FA18
:106EC90069011500EDB928043E00182C21FB690958
:106ED9007E47E603202278CB7F20403A053ECB4708
:106EE900200A78CB2FCB2FE6033C180C78CB2FCB7D
:106EF9002FCB2FCB2FE6073CC121004B3C32E56957
:106F09003AE569703D32E569280C2322AA6FCD550F
:106F19006F2AAA6F18EACD806F183721004BC1AFD0
:106F290018033AE5693C282A32E569702322AA6FD9

:106F3900CD556F2AAA6F3E29B820E72B7E23FE1B69
:106F490020E03AE5693D5FCD806F1806CD0701E184
:106F590018032 1B96EDD7504DD7405C93EFFB9C892
:106F69003EAAB8C0061BC93EFFB92805782FCB7FBA
:106F7900C0FDCB06DEAFC9FDCB06D61806783200B8
:106F8900481E01FD212153FDCB06CEFD7304FD36BC
:106F99000700FD21166AFFC9FDCB0696FDCB069EAB
:106FA900C900003AF742FE01282DFE022845FE726B
:106FB90028183A313ECB7F2804CD3A52CD3E0232D1
:106FC900F742CD8E70CD3A52ADC93E0132F742CD6E
:106FD9008E70CD3A52ABC9DDCB065E28107EFE72AB
:106FE9002832FE2228CCFEA02825CD32707ECD3A4B
:106FF90052ACC9DDCB065E28107EFE72285AFE22ED
:107009002846FEA02809CD32707ECD3A52A2C9CDBC
:107019003A52E5C9AF32F742CD96703AF942EE01DC
:1070290032F8423E30325549C97EF5E5CD3A52B57E
:10703900E1CB492808FE303808FE493808CB7F20C3
:1070490004F177E1C977F1C93A313ECB7F2804CD04
:107059003A52CECD677018BCCD6770C3D36F3A0F63
:107069003ECB572011CB8FCB87CB672004CBC718DA
:1070790002CBCF320F3EF3CD3A52C5CD3A52C6CDEF
:107089003A524CFBC9CD1269CB8FD378C9CD12695D
:1070990OCBCFD378C921403ECB6E3E2C28023E315E
:1070A90032AF70CDEF6C00C9000000000000FF0096
:0570B900010100BC70A4
:06000001524F464C4E4533
:106DC900FD211153FD360701FD21FE6DFD3602013E
:106DD900FD360411FD360553FFFD211953FD360714
:106DE90002FD21FE6DFD360204FD360419FD36054E
:0B6DF90053FFC33369070001000000D6
:060000015253544152541 9
:1070E50000020203 8A01000102048D010001020968
:1070F50091010000130A9A01000113 09A40100007F
:10710500000AD01000A000000000000020AAD0108
:107115000002020 8B70100020208BF010F000203C6
:10712500C7010F000203CD010F000203D0010F00BC
:10713500020 3CA011301010 2D30123010206D5018D
:107145002A000206DB011303000000017000203FA
:10715500E1011700020 3E401170002 03E7011C0225
:10716500020 5EA011C030204EF01270002 01F301F5
:107175002700020 1F4012E000201F3012E00020195
:10718500F401360100 04F5013601000 4F90136 0069
:1071950000005FD013601000402023601000406 0265
:1071A500360100040A023601000 40E02360111 04FC
:1071B5001202360400000000040010000402024000F3
:1071C5000000516024001000 41B024A0100040202E8
:1071D5004A00000516024A01000041B020000003F98
:1071E5001F020000003C5E0200500000000000008D
:1071F50001D9A021700002B7020000000B90244
:1072050000000000B902008400000000000000003A
:10721500B90232000204B9023C000204BD02460074
:0A7225000204C102000102 09C502C3
:10726F0052455146494C4C50524F544543544456
:10727F004B4244204C4F434B45444B424420 4552D4
:10728F00524F52202020202020414C504841202 02096
:10729F0020204E554D2020202020412F4E50524966
:1072AF005343335343315343325E434443442820C3
:1072BF0029445352282029434852424C4B464C44B0

:1072CF004F46464C4E4F4E4C4E30313A534E443A49
:1072DF005243563A464450583A5244593A454F54FD
:1072EF003A4449533A434F4E3A524E473A42555316
:1072FF00593A4F464646312D435552534F52207FF0
:10730F002020202046322D48492D4C4947485420F3
:10731F00434841522F424B4752442020202020 46C1
:10732F00332D435552534F522057524150204F4EF9
:10733F002F4F464646312D52455455524E200D2F54
:10734F000D0A202046322D42454C4C204C4F4E47C3
:10735F002F53484F52542F4E4F4E45202046332D1A
:10736F005459504 14D41544943204F4E2F4F46469B
:10737F0050474D2046554E4354494F4E533A205394
:10738F00454C454354205020202020 4B45592F464310
:10739F004F4D4D4155583141555832 50474D20446E
:1073AF004542554700090505 09050A11011B01044E
:1073BF00200106390102 3C01030A01010C010218E8
:1073CF0001041D01052301043601023901030A01DD
:0173DF0001AC
:0600000 15052434E54432F
:1073E000EB73E5F50E80CDEC73F1E1C90600FDE528
:1073F000FD2AFA42FDCB056E2002060411 9774FDAA
:10740000 2195747EFDBE00381AFDBE01301BFD962D
:10741000 00FDE1E526006F195E78E6FF2824CB3BEE
:10742000 0518F6FE203002CBC1FDE1CD7F74300897
:10743000CBE1CB41C0CBE9C93A0F3ECB47C8CBD952
:10744000 18F3E1CD7F74300BCBE1CBE9C9CB79C028
:10745000CBC9C93A2753CB672007CB4328EFCBD101
:10746000C9CB79200FCB5B2804CBD9CBE9CB5328F0
:10747000 08CBD1C9CB4B20F9C9CB5928D0C9C93ABF
:10748000F543FE013A27532804CB672006CB772823
:10749000 0237C9B7C92A7F707070707030303078A
:1074A000 0333222222223333FFFF773333207777CF
:1074B000 7777702233777777777FF33777733773340
:1074C000 0000000000777777777333333330000777726
:1074D000 777777777777700000000557733333335528
:0C74E00077773330883077003333333354
:06000001434D44424C4B424C
:1073E000EB73E5F50E80CDEC73F1E1C906003A0FC1
:1073F0003ECB47200206 0411A574FDE5FD21A374D0
:10740000 7ECB79200DFE7320093A043ECB4F20023B
:10741000 36097EFDBE00381AFDBE01301BFD960008
:10742000FDE1E526006F195E78E6FF2824CB3B05D9
:10743000 18F6FE203002CBC1FDE1CD8D743008CBB3
:10744000E1CB41C0CBE9C93A0F3ECB47C8CBD918F5
:10745000F3E1CD8D74300BCBE1CBE9C9CB79C0CB57
:10746000C9C93A2753CB672007CB4328EFCBD1C9F3
:10747000CB79200FCB5B2804CBD9CBE9CB532808A1
:10748000CBD1C9CB4B20F9C9CB5928D0C93AF54348
:10749000FE013A27532804CB672006CB7728023712
:1074A000C9B7C92A7FFBFBFBFBFB333333FB00333C
:1074B000 2222222223333FFFB88333322FBFBFBFBE8
:1074C000 0002233FB888888FB3888888888833000053
:1074D000 00000FB33333333333333330000FBFBFBFB60
:1074E000FBFBFBFB88000000000777733330 0FBFBDE
:0A74F000333388 33FB003333333333AA
:06000001434D4443485248
:1074FA00FE741875DD7E00CB7F2809CB77280A2118
:10750A00F043180821F243180321F1437EC9C5014B

```
:10751A003043DDCB007E2003019043B7ED42DD4EC0
:08752A00010600ED427DC1C91C
:0600000147455442 4C4C3F
:1074FA00FC74210D7516005F197EF578E6F047F1E8
:0D750A00B047C9000708090405060102038 7
:06000001544 54C434F562C
:1074FA00FE740D75FD7E00E63FCBFF321947AF32B1
:10750A001A47C9FD7E00E63FCBFF321A47AF321950
:02751A0047C95F
:06000001415 4544F52412E
:1074FA000175FE74CD1260AF474FED436D49CD94CF
:08750A006CCD066CCD886CC944
:060000015244484541445}
:1074FA00FC74D721483E7EE67FD62028055723CD47
:04750A004A6CCFC92F
:06000001524142484 95340
:0B74FA00FC74ED4B3647ED433447C9EE
:06000001494E534355 5225
:1074FA00FC74CD946CCD066CCD686CCD886C16028C
:10750A0021BB49CD2E6CFD21B549ED4B3447FD70A9
:10751A0000FD7101CD6B63CD636321B749CD2E6C3C
:04752A00CD8F6CC9CC
:06000001524355 52504F1E
:1074FA00FC7421413EFD46007023FD7E017723FD89
:04750A007E0277C9BD
:060000015345544 3544C2A
:1074FA00FC74FD7E00E63FF5FD7E010F0FE6C0C17C
:02750A00B0C906
:060000014144 4A54574F30
:1074FA00007513751E753A303E67E61FFE1FC83EBB
:10750A00018432303ECD7460C93A303E67E61FC806
:10751A003EFF18ED0600CBE03A023EA832023E18C2
:01752A00E47C
:06000001425249474 85439
:1074FA00FE740D7521403ECBDE3E0E320B75CD3B40
:0C750A006D00C921403ECB9E3E1118EFE1
:06000001494E534D4F442F
:1074FA00FC7421 3200ED5BF54216001BCD1F523E93
:0E750A0001F3322D43322E43AF322C43FBC926
:06000001455253 4D534728
:1074FA00FE741C75AFF5FD7E01E61FCD3A52D038F9
:10750A0015E5DDE1F1B72005DDCB00FEC9DDCB00D5
:0B751A00BEC93E0118DFF1CD3460C98E
:060000014C4F4B46524D2E
:1074FA00FE742775AFF5FD7E00E61FCD3A52D038EF
:10750A0020FD7E01E61FCD3A52D83815E5DDE1F1BE
:10751A00B72005DDCB05FEC9DDCB05BEC93E011886
:06752A00D4F1CD3460C96C
:0600000150525452454725
:10753200367 54A75FD660FFD6E0EFD7E08FD7704F9
:10754200FD7E09FD7705180 3CDA3753E08CD3C608D
:10755200AFB828053E20B82037E5FD4606FD4E07A8
:10756200FD6604FD6E05AFED42E1C8FD7E05B72064
:1075720019FD3504FD6601FD6E00010B00097EFD5B
:1075820077 05CD3E00CDA37518C1FD35052B18BB7F
:10759200F5FD6604FD6E05CB6928012B226549F1D4
:0875A200C9FD660BFD6E0AC96C
:060000014E4F4E554C4C21
```

```
:1075320036757775DDE5E5DDE1FD2108473AF5426F
:10754200FD7702DD7E01B728033D18033AF542FDBF
:107552007703DD7E02FD7704DD7E03FD7705DD7EA8
:1075620004FD7706DD7E05FD77073E0EFD7700CD33
:107572003C60DDE1C92120473A1F47962E40FE407C
:0D7582003804D6402E4167CBF422373EC9B5
:06000001444953465240D34
:1075320036755E75D7CD3A52A6160D21373EAFCDC0
:107542002E6CB7200F3E40323C3E21403ECB8E2176
:107552003D3ECB8ECD8F6CCD4F6CCFC9D7CD3A523D
:0A756200A6162E21023E3E0118D5A8
:060000015254475244433 3
:107532003A7568756E758C75DD2AFA42DD7E00E655
:10754200C0FEC02008AF3D32323E32333EAF3DDD99
:10755200770DDD770E328A4A32894A3E0132BD49C1
:107562003E01322E43C93E0132BD49C93A3447DD9C
:107572002AFA4247DD7E00E6C0FEC078200332329E
:107582003EDD770D32894AAF18D33A3447F5D60833
:1075920032BE49DD2AFA42F147DD7E00E6C0FEC076
:0E75A200782003323333EDD770E328A4A18D944
:060000014D415247494E3B
:1075320036753975AF18023E01F53A053EE601F59A
:10754200CD636306004AFDE5E111B749EDB0F1C62E
:1075520002FD21B549CD5C63DD2AFA42DD4601DD3B
:107562007E0290FD4600903819FD4E01DD7E0B91A2
:1075720038 10F1B72006ED433647B7C9ED4334471B
:0A758200B7C9F121403ECBCE37C956
:060000015345544243 4147
:107532003A75667590755F75DD2AFA42DDCB057680
:10754200281EDD7E03B72818CD9375C5DD7E039016
:1075520005 2804CD3A52B6F1CD3A52B0C94718EBDC
:10756200CD3460C9DD2AFA42DDCB057628F2DD7E14
:1075720002DD9601DD960428E7CD9375C50528083E
:10758200DD7E043CCD3A52B6F1CD3A52AFC947182E
:10759200EB47DD7E05E61FED44DD86063CB8D047AD
:0175A200C91F
:06000001505256504147 29
:107532003475CD0A63CD51633E08CD3C60C5CD8B19
:1075420068C1386BED43B575CB692806CD5875CD4A
:107552002F63CD5875C9FD6E0AFD660BE5E5D12393
:10756200FD46120528053E0CCD3C60E1FD4E12069B
:1075720000092B3A6049CB4F20073A043ECB5728EB
:1075820024FDCB024E201EE5FD3404FD360500CD60
:107592003E00FD6E0AFD660B3E08CD3C60E13E03F7
:1075A200CD3C6018B1ED4BFE423E03CD3C60C9CDEF
:0375B2003460C979
:060000014445 4C43485247
:107532003A754275A175C97521CC753600C5181CFE
:10754200C5213043DDCB007E2003219043DD4E0276
:107552000600094F7E127921CC7536012130 43DDB8
:10756200CB007E200321904 3DD4E010600094F0926
:107572003ACC75B720027E12EBDD7E02DD960191D8
:107582004F0600281721CC75CB46280B6F26001911
:10759200E5D12BEDB81805D5E123EDB0F112C93EC6
:1075A20016F5DD4E0B0C59D5DDE5D1CD5300C1E505
:1075B200CD5300EBE10601DD7E00E6C0FEC02001F6
:0A75C20004F1B7C43C60C9AF18D74C
```

:0600000153484641555542E
:107532003A75437572756D75F53A3A3EE61F281F26
:10754200F1213A47B7C8D55F3A2C3EE61FBB38183F
:107552007B110600193D20FCCB6E280CD1B7C92A3D
:107562006F49F1B728F737C9D137C9C5D5F5180A18
:10757200C5D5F53A3A3EE61F282F7EE61F21404741
:107582002807471 1C0001910FD111000F1B7280C8F
:1075920047 3A2D3EE61FB8380C1910FDD1C17EE6E0
:1075A200C02804B7C9D1C137C9F1D1C1B720F82A5F
:0475B200FA42B7C919
:060000014C4F4346524D36
:1075320034753AB570DD215F7521637506030E302F
:1075420096FA49750C18F986DD7100DD232310EED9
:1075520021 4B00115E7506053E04DFC95B00000089
:047562005D640A0159
:060000015752544E434C1F
:0E7532003475D7FD213E753E15DFCFC9000030
:060000015253544 34D531D
:1075320053753675 2A3447E52A3647E5210000227D
:107542003447223647CD5375E1223647E12234478C
:10755200C9CD0A63DD2AFA422A3647E52A3447E5CD
:1075620 0CD8B683846DDCB05762840AFFDCB024691
:107572002803FD7E07323447324549CD2F63FDCBC8
:1075820002 4E20153A4549215F49B62006CD3A52AE
:10759200F5180ACD3A52F41804CD3A523DE1D13AE7
:1075A20045496F223447ED533647C9CD3460E1D1A6
:0275B20018F1CE
:06000001494E534C494E2C
:1075320053753675 2A3447E52A3647E5210000227D
:107542003447223647CD5375E1223647E12234478C
:10755200C9CD0A63DD2AFA422A3647E52A3447E5CD
:10756200CD8B683846DDCB05762840AFFDCB024691
:107572002803FD7E07323447324549CD2F63FDCBC8
:1075820024E200F3A4549215F49B6200CCD3A52AE
:10759200F2180ACD3A523D1804CD3A52F1E1D13AED
:1075A20045496F223447ED533647C9CD3460E1D1A6
:0275B20018F1CE
:0600000144454C4C494E41
:1075CD00D375EF750176DD7E00CD1176DD21143E8C
:1075DD00DD7E00CD1176F5F1CD38603E01B7C9F1F4
:1075ED00AFC9CD0376CD1176DD21143ECD0376CD19
:1075FD0011761 8E218E2DD7E00F5E61CCB3F47F16F
:10760D00E601B0C9CB4FC8CD4B76CB5F2018CB4729
:10761D007A280ACD647628BF1D1D20F7C94623B8E8
:10762D0028B51D20F8C9CB477A280ACD647628AF36
:10763D001D1D20F7C94623B828A51D20F8C92117FF
:10764D003EF5DD7E01E67FD62006004F09DD7E0288
:10765D00E67FD6205FF1C946234E23CD6C76C9D582
:10766D001E01B8FA7D765779BA7AFA7D761DD1C9A1
:03767D0010D10954
:06000001434852454443 50
:1075CD00E375DF752276B776FE757276A476CD34C7
:1075DD0060C91E0118021EFFFD2A6F49FDCB007EFA
:1075ED0020E0FD7E00E61F83FADB75CD3A52D038D4
:1075FD00DD226F49CD3A52832A6F49AFCD3A52D829
:10760D0022FA42E5DDE1DDCB057E2859CDB776D0F6
:10761D002AFA4218 5001F0FF1EFF2AFA427EE61F99
:10762D0083FAB27457 3A2D3EE61FBA387809E5FD52

```
:10763D00E1FD7E00E6C0286DFDCB057E20DFE53A3D
:10764D003847FEFF281EED4B3847ED5BFA42CD5310
:10765D00003E08CD3C603E1FB82009ED4BFE423E7A
:10766D0003CD3C60E122FA42E5DDE1DD7E0D32899C
:10767D004ADD7E0E328A4AFEFF2003DD7E0BD607E1
:10768D00328E49CD386521FFFF2238473E01322EEB
:10769D0043CD3A5272B7C92A6F49FD7E00E61FCD20
:1076AD003A52D83099CD346037C90110001E01C34C
:0276BD0027762E
:0600000150525646524D1C
:1075CD009C761576D7757676A976CD1576D7FD4E40
:1075DD0008FD4609FD6E06FD66073E02CD3C60FDC9
:1075ED005E01FD5602D5DDE1DD7E00E6C0FD5E04E7
:1075FD00FD5605D5DDE1DDA600FEC0200901000028
:10760D002B3E02CD3C60CFC9D7FD5E04FD5605D59E
:10761D00DDE1FD46030E00CD5300CBFCDDCB007E3E
:10762D002816E5FD7E03212147CDA976CD81633E48
:10763D0000E12808CBEC1804CBEC3E01FD7508FDEC
:10764D007409FD5E01FD5602D5DDE1FD4600DD4EFE
:10765D000BB720083CDDCB007628013C814FCD5384
:10766D0000FD7506FD7407CFC9DDE5D1FD219749F4
:10767D00FD7301FD7202FD7304FD7205FD77003C83
:10768D00FD7703CDD775FD3400FD34031OF5C9DD4D
:10769D007E02DD9601C847AFCD7676C9E5C52130AE
:1076AD0043DDCB007E20032190434F060009DD4EC4
:0676BD0001097EC1E1C9D4
:0600000143484149E2A6C
:1075CD00EB75F575FB75217683765876DF750E763E
:1075DD006C763A313E0600CBF0A832313EC9CD086B
:1075ED0076D821313ECBEEC921313ECBAEC9CD0887
:1075FD0076D83A313E0600CBE818DE3A1F47FE1921
:10760D00C93A313E0600CBC8A832313EE606F670C7
:10761D00CDFE5FC93A033EE62047FD6E00FD6601D3
:10762D0022023E7CE620B82814217A3EB72004368B
:10763D0080180236742306103620231OFBFD6E02CF
:10764D00FD660322043E3A313E18C1C5D1DD212F1E
:10765D00530600FD4E00CD6B52FD231D20F5C921B3
:10766D000000ED5BF54216001BCD1F52AF322C43CF
:10767D0021313ECB9EC921313ECBDEAF322C433A78
:08768D00F942EE0132F842C996
:060000014D4953434D443C
:1075CD00CF75FDE5CD3663ED4B3647FD7004FD718E
:1075DD0005FDE5DDE1FDE1CD3A5290CB772802CBFB
:1075ED00BFDD7703DDE5FDE1CDFD75D0CD3460C99F
:1075FD00D7FD7E03326049CD3E00FD6E10FD661154
:10760D00E5DDE1DD7E00FDBE042008DD7E01FDBE71
:10761D000528652ACE4911030019ED5BD249B7EB58
:10762D00ED52DAB976ED53CE49DDE5E1EBB7ED522A
:10763D00110300ED52ED52280FE5C12ACE492BE57D
:10764D00ED52D1EDB82318052ACE49ED52E5FD6E68
:10765D0000FD6601E5DDE1CDAA763A2D3EE61F4738
:10766D00DD7E00E61F90280E111000DD19CD9A76F3
:10767D00CDAA763C20F5DDE1FD7E04DD7700FD7EB3
:10768D0005DD77013A6049DD7702CFB7C9C506033D
:10769D00DD34072003DD34081OF6C1C9C9C5060362
:1076AD00DD34092003DD340A10F6C1C9FDCB02DE3D
:08776BD0021393ECBEECF37C9A5
```

```
:0600000153545246C442A
:1075CD00DE75D3757C76D72A3647E52A3447E5181C
:1075DD001DD72A3647E52A3447E5FDE5CD0A63CDAB
:1075ED003A52A6FDE1CD7C76FD4600FD4E01ED5BE8
:1075FD00FA422A3647AFED42380F280DCD8F6CE198
:10760D00223447E1223647CFC9D5FDE1FD6E0BFD92
:10761D007E02FD960167AFED4238E1FD21A149FDE6
:10762D007300FD7201FD7004FD7105CD3E00CD3A74
:10763D00529D200BCD440038C3CD3A529B18F32AEE
:10764D006549ED4B3647AFED422803FA0976FD70DB
:10765D0004FD7105CD3E00CD3A52AE2005CD410061
:10766D0018F5CD8F6CE1223447E1223647CFC9C5DD
:10767D003A053EE601CD6363C602FDE5FD212E47C9
:10768D00E1FDE546FD700223FD231520F6FDE1CD5C
:04769D005C63C1C9A0
:06000001524441445253 39
:1075CD00CF757932B37B2ACE4922CB7BFD7E00E687
:1075DD001F32AF7B4F3A3A3EE61FB9C2A2763A2C24
:1075ED003EE61FB9DA987679CD3A52D722B07BE5CF
:1075FD00DDE10606CD9E632AB07BAFCD3A52D9228E
:10760D00B67B22B87B06C0CD9E633AAF7BDD77009B
:10761D00FD6601FD6E02CD9B7B7D32B27B3A1F472D
:10762D00ED5B204793BD38637B32BA7B32BB7BFD6C
:10763D007E03E603FE032018FD6E05FD6604CD9B5B
:10764D007B3AF542BD384E7DB5284ADD75011804EB
:10765D00DD360184FDCB03562804DDCB00FEAFDD06
:10766D007702DD7703DD7704DD7705010600CD5761
:10767D007BB7201C21000022B47B22BC7B21BE7B6A
:10768D00060DCD9E63DD2AB67BB7C9AFCBCF1808EB
:0A769D00AFCBD71803AFCBE737C916
:0600000144454646524D45
:1075CD00D1756E76260011DE75EB19195E2356EB1B
:1075DD00E9F57519764C5441203D205B41424D2013
:1075ED003D205BCDEF6C2CC9AF32B870CDF075116D
:1075FD00E2750607CD67761145 3E3E0A32B6703A02
:10760D00443ED62032B470473E0318233E0132B8B3
:10761D0070CDF07511E9750607CD677611493E3EBF
:10762D002732B6703A483ED62032B470473E20908D
:10763D0032B5702107003EFF32B77078B7C46A7655
:10764D007D32B270065D3E03DFCD3A52DD3E07322C
:10765D00B17032B370CD3A52E1C92100003E04DF62
:10766D00C9217B3E1100003DC8F57ED62006004F96
:0B767D00E5D5E109E5D1E123F118ECAF
:060000014C5441424D4346
:1075CD00D1758A76260011DE75EB19195E2356EBFF
:1075DD00E9EA754F769B76A676F275F2753AB77035
:1075ED002F32B770C9CD8E703ABB70FE80F2977690
:1075FD003AB770B720173AB17021B270BECA9776FC
:10760D006F26003ABB70473E03DFC39B763AB570D9
:10761D00B728773AB27021B670BE286E21B2703499
:10762D0021B4703421B57035CD3A52DD3AB170F5D3
:10763D006F26003C5F16003AB270C190473E0BDFDB
:10764D0018B4CD8E703AB17021B270BE283CE55F92
:10765D001600473C6F26003AB27090473E0CDFE1B2
:10766D006E260006203E03DF21B2703521B5703441
:10767D00CD3A52DD21B47035180 3CD8E70CD3A520E
:10768D00DC3AB1706F26003E01DFCD9670C921B195
:10769D00703AB270BEC83418E121B1703AB370BE01
```

:0476AD00C83518D6EE
:060000014944434F4E4646
:1075CD00CF75C9FFA0462055204E204320542049?9
:1075DD00204F204E2053FF0B48204F20532054FFA7
:1075ED000B41205520582031FF1BFFA0535045451E
:1075FD00443AFF4A5041524954593AFF4944555073
:10760D004C45583AFF4953544F5020424954533A30
:10761D00FF46444556494345205459504453AFF9439
:10762D005243562011 2F133AFF48434852204D4FD5
:10763D0044453AFF47434F4D4D204F50543AFF4775
:10764D004C5441204F4E200D3AFF47444953204F93
:10765D004E3AFF49444953204 94E4143543AFF465F
:10766D004155544F2D545249473AFF464641494CD6
:10767D005341464 53AFF475243562050415249 54D3
:10768D00593AFF95434F4C3AFF4C45524153453AB9
:10769D00FF4A534B49503AFF4B43485220575241F2
:0676AD00503AFF47FFFF09
:06000001534D444154 4413F
:1075CD00D875D1752100003E0218052132003E010B
:1075DD0032927679329176E5ED5BF54216001BCD50
:1075ED001F52E13A9176B72847AF328F76329076B7
:1075FD00FD7E00FE072842FE0E2845FE0F284BFE9D
:10760D001B200FFD7E01FE342857FE79283FFE7AA0
:10761D002848ED4B8F76B0473E02CD3C6023CB69B9
:10762D002801237DED5BF542933005CD857620C095
:10763D003A9276F3322C43FBC9D73E24DFCF18E3C1
:10764D003A9076CBFF329076 18D9AF18F83A8F76FC
:10765D00CBF7328F76CD857618C93A8F76CBB718A2
:10766D00F1FD7E02E63FED4B8F76CB712802CBF715
:10767D00328F76CD857618DDFD233A91763D3291A8
:06768D0076C900000000B8
:06000001575254 4D534715
:1075CD00CF7526001 1DC75EB19195E2356EBE9E03A
:1075DD00754D76CD417611F7752100000 60AC5016E
:1075ED0002073E05DF23C110F5C946312D4C4F4F23
:1075FD005046322D434F4D4D46332D535953204652
:10760D00342D524F4D5346352D5052492046362D6F
:10761D00414C542046372D5343332046382D534388
:10762D00312046392D534332204631302D4D454DB5
:10763D0057414954 4CDEF6C2CC93E04210000DFC9E0
:10764D003ABB70FE312827FE32282CFE33282FFE40
:10765D0034282BFE352827FE362823FE37281FFE1B
:10766D0038281BFE392817FE3A2840C3E0753E0125
:10767D0032013B32E75CC9AF18F6491B28003ABB13
:10768D0070C610328A76CD4176113D763E050111D8
:10769D00 04CD48760104001 10048218776EDB00134
:1076AD000400FD210048CD3A5247C9F3CD1260C701
:0600000144474E53545326
:1076C500E376C976D7325749CD0A63FD210847FDD0
:1076D50036001 1DD2AFA42AF325E49C37177D7CD44
:1076E5000A633E01325749DD2AFA423E0F21313EF7
:1076F500CB6E20023E11FD210847FD7700DD7E029D
:10770500DD9601DDBE04201CDDCB056EC2E778CD1C
:107715003A52B7225A49325C49CD3A52B9325D499B
:107725003E011801AF325E49CDEC782021CDF278CB
:10773500203ACDB16C20323A2753CB672805CDB618
:107745006C20293A363ECBFF32363ECD5C77CD0EE6
:1077550001AF32003A1815DD7E04DD4E039147ED89

```
:10776500435849C8CD3A5289C9CD5C77FD210847B0
:10777500DD7E00E6C0FEC03E0120023E02FD77022E
:10778500DD46043A5E49B72806ED5B5C4918053AC3
:1077950057498057CD3A52BAFD219749ED5BFA42D8
:1077A500FD7301FD7202FD7304FD7205DD7E04FDAE
:1077B50077003CFD77033A5E49B728063A5D49FDF7
:1077C5007703CD3A5288DD219749FD210847DD6EC3
:1077D50008DD6609DD5E06DD5607FD7E02FE022038
:1077E50011BFD7303FD7204F5CDF2782002CBF485
:1077F500F1100002001EBFD7505FD7406FD730711
:10780500FD7208DD2AFA42DD7E03CD3A5285CDF2BE
:10781500782009CBF2D5C13E02CD3C603A5E49B72E
:107825002821DD7E03DDBE042019010500FD7E0251
:10783500FE022003010700FD09FD5E00FD5601CB98
:10784500B2180CDD7E03ED4B574981CD3A5285FDCB
:10785500210847FD750AFD740BFD730CFD720DFDC6
:10786500360901CDF2782804CD3A52F6CD3C60CDEB
:10787500B16C280ECDF2782009ED4B584904CD3A6C
:10788500528A3A5E49B72813AFCD0852AFED5B5A1D
:1078950049ED4B5B49CD3A52BB1819ED4B5749DDC4
:1078A5007E0381DD7703DD7E0481DD77043A35478C
:1078B50081323547CDEC78280C3ACA40FEFF28F4D2
:1078C500FE85CAE776CDCF78CFC9CDF278C0CDB1E8
:1078D5006CC0DD4604040E00CD3A528A21363ECBFB
:1078E500BEC9CD346018DE3A363ECB7FC9FD7E0079
:0378F500FE0FC9BA
:060000015343524C465728
:1076C500C776CD3A52B7225A49325C49CD3A52B9BA
:1076D500325D49FD219749ED5BFA42FD7301FD726B
:1076E500023A5D49FD7700FD7304FD72053A3547A1
:1076F500FD7703CD3A528C3A3547DDBE03281C3D54
:10770500FD77003A5D49FD7703CD3A5288FD6E0657
:10771500FD6607FD5E08FD560918073A5D49CD3A35
:107725005285FD210847FD36000DFD360201FD7528
:107735003FD7404FD7305FD7206DD46043A354705
:10774500B82006ED5B5C4918025015CD3A52C9FDCB
:107755007009FD750AFD740BFD730CFD720D3E0D70
:10776500CD3C60DD7E02DD9601CD0852ED5B5A49C8
:0C7775003A3547ED4B5B49CD3A52BCC998
:06000001494E5350545219
:1076C500C776CD3A52B7225A49325C49CD3A52B9BA
:1076D500325D49FD219749ED5BFA42FD7301FD726B
:1076E50002FD7304FD7205DD7E02DD9601DDBE043B
:1076F5002861DD46045014C5D5CD3A52BAD1C1FD35
:107705007000FD7203CD3A5288FD6E06FD6607FDD9
:107715005E08FD5609FD210847DD7E00E6C0FEC076
:10772500201BFD3602022BFD7503FD7404FD360595
:1077350000FD360600FD7307FD72081810FD3602C0
:1077450001FD7503FD7404FD7305FD7206FD36002C
:107755000D180747ED5B5C49189D3A3547DDBE03BB
:107765002809473D57CD3A52C91829DDBE022005E3
:107775003A5D4918013CCD3A5285FD750AFD740BF9
:10778500FD730CFD720DFD360901FD360011CD3A74
:1077950052F61813FD210847FD7009FD750AFD74A1
:1077A5000BFD730CFD720DFD7E00CD3C603A354737
:1077B500CD0852ED5B5A493A3547ED4B5B49CD3A19
:0377C50052BBC9EB
:0600000144454C5054522E
```

:1076C500CF76537784786F779C783E01324349CDE6
:1076D5000A63CD8B68383BCDDD78CD3E00CD58773C
:1076E5003A4449FE022833FD6E0AFD660BFD46123B
:1076F5001110480E003A0579CD3C603A4349FE0227
:107705002813FDCB024E200DFD3404FD360500C3C4
:10771500DF76CD3460AF324349C9FD4E12CD2777B0
:1077250018D9FD5E05FD5604D5FD7E02F5FDE5FD86
:107735002110 48CDB16C2805CD5F611803CD756169
:10774500FDE1F1FD7702D1FD7305FD7204C93E022D
:10775500C3D1763EDE326D7718053E9E326D77FDDC
:107765006E10FD66112323CBDEC93E013244492A42
:107775003647E5CD3A5258ED4B3647E1223647DAE2
:107785001777DD2AFA42DD7E02DD960167DD6E0B95
:10779500220679B7ED42DA17772A3647ED423813D4
:1077A5002811C5ED4B06792A3647CDC37721000050
:1077B500C118032A3647CDC377AF324449C9ED43D3
:1077C5004149ED5B3447D5223447CD2F632A4149E2
:1077D500FD5E05FD5604B7ED52DA7F783A4449FE61
:1077E50002280AFD7E03E603FE03CA79782A414989
:1077F500FD5E09FD5608B7ED52306CFD4E05FD46A0
:10780500042A4149B7ED423871FD6E1226002B0955
:10781500ED5B4149EBB7ED523034C5CDDD78C13A6A
:107825004449FE02281B3A4149FD96053C470E0096
:10783500FD6E0AFD660B1110483A0579CD3C6018BE
:10784500392A4149B7ED422C4DCD2777182CFD46F5
:1078550004FD4E05ED433447CD5377FD3404FD3625
:107865000500CD3E001894FD4604FD4E05ED43345C
:1078750047CDCF76CD4100D2D277E1223447C9DD5D
:107885002AFA42DD4604DD4E0B2A34473E013244D6
:1078950049CDC377C3BE773E02324449FD7E0032EF
:1078A5000479FD232A3447E52A3647E5DD2AFA42DD
:1078B500DD4603C5CD7477DD2AFA42F1DD9603284E
:1078C5000E3806CD3A52F81806ED44CD3A52F9E194
:1078D500223647E1223447C93E05DDCB056E280235
:1078E5003E043205793A4449FE023AFF4220033A02
:0F78F500047921104877E5D113018400EDB0C963
:06000001455241534552 37
:1076C500CB76637871783E60323A3E3E4032393E41
:1076D500AF321847321947321A47322C43325F49C5
:1076E5003A3B3EF5CB8F323B3ECD74603E40323F58
:1076F5003E3A2B3ECB473E092801AF324049CD3BB0
:107705006D0A3E5021403ECB6E28033A343E4F323F
:10771500F5422A114023060003031EFFB7ED423848
:10772500031C18F97B3D32F14332F2433D32F043FD
:10773500FE1830013D321F47FE18301421313ECB73
:10774500AE3AF542FE502008325F493E18321F47D7
:10775500AF322047CD3A52CCCD126932F642D378BA
:107765000060D212147CD9E6321053EAFCB4E280254
:107775003E2032FF42210000ED5B1140CD1F52211A
:107785003043119043066 0AF12773C132310F92A5A
:10779500D049AF772377237723 22CE49210048119B
:1077A5003B47B7ED52E5C121FFFF193600EDB0FDAE
:1077B5002171493AF542FD7701C602FD7702AFFD19
:1077C5007704FD7705CBFFFD7703FD226F49117720
:1077D5004921874901 1000EDB0DD217749DD3600EB
:1077E500C03A1F473DDD7702FE173006DD7704DD21
:1077F5007706DD22FA423AF542473DDD770B3A320C
:107805003EDD770D3A333EDD770ECD3A5284DD7E8F

:1078150002FE173016FD219749FD77003CFD7703E1
:10782500CD3A528CFD3400CD3A528C2A6F49CD3A6F
:1078350052832AFA42CD3A52CA2A3447223647CDD4
:107845004B6121313ECB5E28083AF942EE0132F810
:1078550042F1323B3ECD74603E4C325549C93E50F3
:1078650021403ECBAE32F542CDCB76C93E84214098
:057875003ECBEE18F00F
:0600000145525341 4C4C36
:1076C500E376C976D7325749CD0A63FD210847FDD0
:1076D500360012DD2AFA42AF325E49C36277D721FE
:1076E500000022694 9CD0A633E01325749DD2AFA75
:1076F500423E1021313ECB6E20023E12FD2108474D
:10770500FD7700DD7E03B7200BDDCB056EC2CA78A1
:107715003E011801AF325E49CDC4782021CDCF7826
:10772500203BCDB16C20333A2753CB672805CDB626
:107735006C202A3A363ECBFF32363ECD4C77CD0E05
:1077450001AF32003A1816DD7E04DD4E030DF25707
:10775500770C9147C8CD3A5289C9CD4C77DDE5D133
:10776500FD219749FD7301FD7202FD7304FD72054C
:10777500DD7E03FD77033DF28D77CD3A52B7225A70
:10778500493 25C49CD3A52B9325D49FD7700CD3A6F
:10779500528CFD6E06FD6607FD4E08FD4609FD216E
:1077A500084 7CDCF782007CBF03E02CD3C603A5E4E
:1077B50049B73A5D492008DD7E03ED4B574991CD28
:1077C5003A528522694 9ED536B49FD210847FD75FC
:1077D50003FD7404CDCF782002CBF2FD7305FD7255
:1077E50006FD360201DD7E00E6C0FEC03E01200238
:1077F5003E02FD7709DD4E0B0CDD4604ED43D578E1
:10780500DDE5D1CD53003E08CD3C60CBB0FD710C1C
:10781500FD700DED4BD5783A5749ED4480F2287847
:107825003A5D4947CD5300FD750AFD740BED4BD507
:10783500780CCD53003E08CD3C60CBB0FD710EFDFC
:10784500700FFD7E00CD3C603A5E49B72818DD7E9D
:1078550002DD9601CD0852AFED5B5A49ED4B5B4910
:10786500CD3A52BC1819ED4B5749DD7E0391DD77B2
:1078750003DD7E0491DD77043A354791323547CDF6
:10788500C478280C3ACA40FEFF28F4FE86CAED7675
:10789500CD9A78CFC9CDCF78C0CDB16CC021363E59
:1078A500CBBE2A69497CB5C8ED4B6B493E02CD3C40
:1078B50060DD7E04DD4E03914704CD3A528AC93A14
:1078C500363ECB7FC9CD346018C6FD7E00FE10C99B
:06000001534352 4C42572C
:1076C500CB76D576CF76AF3D1807AF32464918133E
:1076D500AF324649014949CDC577E5FDE1014D493F
:1076E500CDC577CD08780478324F493E01324849F7
:1076F500324749ED4B364778324B4979324C49CDC3
:107705002F63FD7E08325449FDE5FD214849FD4EB4
:107715004ED5B4F49D5CDF677FD2BFD4E04ED5BB2
:107725005449CDF677FD23FD4E06D1CDF677FD2BD9
:10773500FD4E06ED5B5449CDF677ED5BFA423A4BCB
:1077450049ED4B4D49B93003CDD3773A4C49ED4B13
:107755004E49B93005FD23CDD377FDE1FD7300FD1D
:107765007201ED4B3647FD7004FD7105CD3E00DD20
:1077750021524 93A4949DD77003A4B49473A4C4944
:107785004FCD5300225049E53A4D49473A4E494FAE
:10779500CD5300E5D1E13A4A4947C506153A464970
:1077A50080473A484980C1CD3C60DD3500C8FDE5DC
:1077B500FD214749CDDF77FDE1ED5BFA42C37E77D9

:1077C500CD3A52A7FD7E000203FD7E0102C9FD6E82
:1077D50002CDE6773EFFFD7700C9FD6E00CDE77768
:1077E500C92DFD7E0485FD7704FD7E0685FD7706A2
:1077F500C91CFD7E02813804477BB8D01D7B91FDF5
:0B7805007702C9F53AF5423D47F1C992
:0600000014D4350424F5830
:1076C500DF76000040001177267726772777907B9
:1076D500F876FD76027707770C77AFF332FD4CFB32
:1076E500320847FD7E00E63FFE0AF021CB76CDCA83
:1076F50000EBE9CD3A52EAC9CD3A52EBC9CD3A523F
:10770500ECC9CD3A52EDC9CD3A52EEC9CD3A52E85F
:10771500F3CD3A52C5CD3A52C6FBDD21F54CCD83AA
:1077250060C9CD86783E35320B473E40210C477700
:107735003A0700F523773A2F002377D1A2FEFFCC35
:107745007377FD210000FDE5E11100103E1BDF7D93
:10775500B4C481772 10C47160306 00CD807828250F
:10776500CD2E6CCD8E78DD21F54CCD8360C9210CF5
:10777500477ECBC7773E2023772377C93A0C47CB83
:10778500CF320C47C9CD3A52AA18D8CD8678AF3238
:107795000B473E40FD210C47FD7700CDD0771607FE
:1077A500210C47CD80783A0B47472819CD2E6C3AE6
:1077B5000B473C320B47FE0820D8CD8E78DD21F5EE
:1077C5004CCD8360C9CD3A52AA18E43A0B47473EDF
:1077D50012FD211940FD360000FD7001DFFE002875
:1077E50017FD210C47FDCB00C6FDCB00CE0606FDDF
:1077F500360120FD2310F8C9DD210000FD21000020
:10780500680C5FDE501800021004 83A0B4757FD7C
:107815002226403E1FDFDDE5E1FD2100481180 0005
:107825003E1BDFE5DDE1FDE1018000FD09C110D270
:10783500DE5E17CA520021805210C47CBCE210210
:107845000002226403A0B475701060021 0C47233EEC
:107855001FDFFD210C47FD7E06F5FD7E05F50604BF
:10786500FD210C47FD7E04FD7706FD2B10F6F1FD8D
:10787500210C47FD7701F1FD7702C93A2753CB6704
:10788500C9CD8078C43A52A6C9CD8078C48F6CC959
:060000014558455453541C
:1076C500D376E27611774077527700004 0000E02BC
:1076D5003E30320B47210C473EFF77182D3E3132A5
:1076E5000B47CDF6783A313ECB7FCAEC78F5AF3211
:1076F500847F10E00210C473E0277233E01772310
:107705003E007723AF77233EFF77182D3E32320BAD
:107715 0047CDF6783A2B3ECB4FC2EC78F5AF320821
:1077250047F10E04210C473E0277233E1077233E96
:107735 00047723AF77233EFF771824CD03793E33B3
:10774500320B470E01210C473EFF771812CD037906
:107755003E34320B470E05210C473EFF771800C516
:10776500CDDD78C1CD8C77160306 00210C47CDD72A
:1077750078280ECD2E6CCDE578DD21F54CCD8360D6
:10778500C9CD3A52AA18EF2100002269490 60E1602
:1077950000 1E08210048CD6D7810F61E082100480E
:1077A500E5CD6D78FDE1FDE5FD2B0608D5CD8578A8
:1077B500D1226B49C57C45A0FEFF200E3AD176CB80
:1077C500C732D176212020226B49C11E08E1E5CDC3
:1077D5003A52A9FDE1FDE5FD2B0608D5CD8578D109
:1077E500FDE1E5FDE5D5C5FD2B06080E1F111000D1
:1077F500FD19FD7E00A1FD770010F5C1D1FDE11158
:107805008 0002A6949CDC578D13A0B47FE31283722
:10781500FE322833AFED523AD17647283E183AD595

:10782500E5210C477EFEFF282E4F237E3208472395
:107835007E2B2B772323237E2B2B772323237E2B32
:107845002B77E1D1C38C773A0847A720D2E52122CF
:107855007877237 7E118BDE1D1CBC8210C47702398
:10786500ED5B6B49722373C9C5E5CD3A52A9FDE1BC
:10787500D51180002A6949CDC578226949D1C1C988
:10788500DDE5210000DD21D276DD3600071110008F
:10789500FD19FD7E00E660CB27571E00C5DD4600BD
:1078A50078A72811CB3ACB1BCB3ACB1B10F6DD467C
:1078B5000005DD700019C110D4E5D1656ADDE1C9A7
:1078C500FD4E00CBB9D53E19DFD11B7AB3C8FD23D8
:1078D50018EE3A2753CB67C9CDD778C43A52A6C913
:1078E500CDD778C48F6CC9C5D5CDDD78D1C1C36C72
:1078F500772 10C473E43773E2023772377C93A2BE0
:0B7905003ECB47C8CDF678DDE118DC72
:0600000143475445535 42F
:1076C500D876EF761377177 73F777977020004013D
:1076D500050110FD7E0047E638CB3FCB3FCB3FFE93
:1076E50005F021C776CDCA00EBE9AF327B4BCDB3B0
:1076F50077E5064048CD9E63E10602FD7E01FE1B4F
:10770500C8E60FED6FFD2310F2230D20ECC9CDB3B4
:1077150077E9CDB377E50E0221B149CDDC773AB1F2
:107725004977FDE11140003E1ADFED4BB249AFED5F
:1077350042C8213C3ECB65C034C9CDEE77D7CD3A99
:1077450052A6CFF578E607060521D176CDD1772863
:107755001FD11E0121A149E5CD3A52A9E106101616
:1077650017E0F0F0F0FCDC3777ECDC3772310F1A9
:10777500CD8F6DC950FDE5CDEE77FDE1F5FD23FD1F
:10778500230E1021A149E5CDDC777AE6073D0602F7
:1077950021D676CDD177E12002F1C9220947C5CDA1
:1077A5003A52EFC1D179320847CD3A52A8C978E6A5
:1077B50007060626006F2910FD01347A09C9E5E69A
:1077C5000FC64021B14977CD2E6CE1C9B720034ED4
:1077D5003CC93D2310F6C90602FD7E01E60FED6F9B
:1077E500FD2310F5230D20EFC9FDE5DDE1DD7E016B
:1077F500FD212E47FD7702DD7E02FD77033E23DF67
:01780500C9B9
:060000014 4574E4C4F4431
:1076C500C7760E0047FE21CA2878FE722866FE2E70
:1076D500CA9577FE30385DFE49DAB178FE50DAB4E6
:1076E50077FE6EDA6678FE71CA2878FE73CAC077AF
:1076F500FE742826FE7C283CFE7DCAD577FE7ECA10
:10770500DE77F2E477D675FE0220160E4021404959
:107715003E0FCB7620013DC31978CD3A5280C31771
:107725007821F27816005F197EC5CD3252C118490D
:107735003EE918F5212B3ECB66CAD278FE2728F004
:10774500FE2C281FFE72280630CDFE2220112 1278F
:1077550053CB66200A32F742CDAC6F0E00181ACB18
:10776500F918B4210F3ECB86CB8ECB56200ECBD647
:10777500CD3A52C83E13CDE66CC31978CB96CB668D
:10778500200ACBC6CD3A52C73E1218EACBCE18F422
:10779500C53A313ECB5F280CCB9F32313ECD3A52B4
:1077A500B1C1186ECBDF32313ECD3A52B218F2FE7E
:1077B5004C3816D64F38083E2C18123E3B180EC6CC
:1077C5002EFE2C20083E2E1804D63CCBF1CBE1C969
:1077D5003E2A183C3255491839CD2952AF1833FE87
:1077E5007F20EA212753CB662004CB76200B210F7F
:1077F5003ECB46200ECBF91819CBD9C9210F3ECB6C

:1078050046200F212753CB662808CBD11806CBF984
:1078150OCBE1CBC9CB69C8CB51C821033ECB46C010
:10782500CB81C9CBE9212753CB662004CB7620C970
:10783500210F3EFE212817CB5621033E200ACB5EA1
:1078450028D2CBD1CBC118CACB5E28C618F40E00FE
:107855003A443ED62028053A453E18AECD4F6C1821
:10786500B321313ECB46280D47E60FFE0A380218F4
:1078750066CD3A52D521033ECB662030FE603802F4
:10788500D610D620FE3A304D47212753CB66200A25
:10789500CB76C2FE77CBD9C31778210F3ECB46C234
:1078A5000878CBD9CB56C21978C30178212753CB99
:1078B50066200BCB762807CBE9CBD9C30878210303
:1078C5003ECB5E28D2212753CB66CA1378CBC1CBDA
:1078D500D1CBE918C2E60FFE0D20053E73C315781E
:1078E500D60BFAEE78C62C189F3E2E189B98990059
:0478F5008E8D978F4E
:0600000143AD504149444B
:1076C500D376FA7635781278E57809788A78D73AD4
:1076D5008A4A57CD3578DD2AFA42DDCB007E20096E
:1076E50078DD460C0590471817DDCB00762011DDB7
:1076F5007E0B47180BD73A894A570600DD2AFA420E
:10770500DDCB056E20313A34474FCD3D78382278B0
:10771500B720030D18010C7921693EDD2AFA42DDF7
:10772500CB007E2007D5DD5E0C1D83D1CD8163287E
:10773500D979323447CFC97832B449CDE578DAE022
:107745007730B449B7203B2A3447FD4606FD4E0734
:10775500AFED422807C5CD9D6CC1203ACD44003818
:107765000CCD9D6CC20278CB6028F11823CDCF7863
:107775002806CD3A52631863CD9D6C285EAF474FFE
:107785OC1814CD41003856CD9D6C2071CB6028F280
:10779500FD4606FD4E077932344758DD2AFA42ED9B
:1077A5004B34473AB449B72817DD7E0457933802SE
:1077B5001825ED44F57A323547F1CD3A52F8181BC4
:1077C5007BDD5603923802180EED44F57A323547C3
:1077D500F1CD3A52F918047B323547CFC9CDCF7870
:1077E50028O6CD3A526418F3CD9D6C28EEDD2AFAB1
:1077F50042DD7E02DD960147DD4E0B1899CB50C464
:107805008A78188CD73E0132B449C38C773A043E46
:10781500CB4F2818DD2AFA42DDCB056E2004CB5765
:107825002806CD3A523D1804CD3A5249CDD376C9F2
:10783500F53AF5423D47F1C979B8280D3ABD49FEFB
:1078450001280478B92802AFC937C9C52A3447E5E2
:10785500CB58282BCD3A529B2825FD660FFD6E0E81
:10786500CDB478201ACDC478FDE5FD21FF42216015
:1078750049CBC6E5CD3A5250E1CB86FDE118DBE1B7
:10788500223447C1C9C5CB582823CD3A529B281D60
:10789500FD660DFD6E0CCDB4782012CDC478216047
:1078A50049CBCEE5CD3A5251E1CB8E18E3C1C9CDD6
:1078B500D878C0CDC96CAFC93A344721693EC9FDF6
:1078C5004606FD4E07ED433447C9DD2AFA42DDCBB6
:1078D5000F46C93E08C5CD3C6078B7C1C8FE20C972
:1078E500CD2F63FD460378E603FE032821CB7828D8
:1078F50006CD3A52A02819CB702806CD3A52A128B8
:107905000OFCB50C45078CB682804CD3A52F7B7C98D
:0279150037C970
:06000001544142532A2A7B
:1076C500C776D7CD0A633E1832CB783AF542FD2A04

```
:1076D5006F49FD960132C378FD7E0132C4783A05C3
:1076E5003EE638CA6177CB5F280A21AF780605CD1B
:1076F500A578180B3A8B4AB720FACBC7328B4A2AA2
:10770500F542260022C578CD8C7723CD9C773AC2E9
:1077150078B7204DCB6828183ACB783D32CB783AEC
:107725000B3ECB57280AE521BC780602CDA578E1AA
:107735003AF542CDC077CDA777FA437720C6DD214C
:107745003A533A053ECB5F2807CD8F6CDD212F5389
:107755000602CD6B52218B4ACB86CFC9CD3460183A
:10776500F93AC478CDC07722C7782AC578CD9C77F9
:107775003AC378CDC07722C578CDA77728C0CD8C00
:10778500772AC778C310773E08CD3C60AFCB682811
:10779500023E0132C278C93E08CD3C6078E61F67DB
:1077A50069C93E0DCD8D783A053ECB5728053E0A71
:1077B500CD8D783ACB783D32CB78C932CD78E5F5A9
:1077C500CDE1773ACD783002233D233D32CD78287F
:1077D50004FEFF20EBF14F0600E109C93E08CD3C50
:1077E5006078B7200206203A0B3ECB572834CB6988
:1077F500281A3ACC78FE012829E5C521B87806046F
:10780500CDA578C1E13E0132CC7818163ACC78B7CF
:107815002810AF32CC78E5C521B4780604CDA5781B
:1078250C1E1178CB5928023E20CB41280AF5CD5F2E
:10783500783E08CD8D78F1CB512814CD5F783E0880
:10784500CD8D783E5FC5010000CD5F78C11803CDB1
:107855005F78CB6928023 7C9B7C9F53E31CB78289F
:1078650013CCB712802C602ED5BC078BB281432FF
:10787500C078E5C521BE7806043A0B3ECB57C4A5B2
:1078850078C1E1F1CD8D78C9C54F0600DD213A53A8
:1078A500C57ECD8D7823C110F7C9011B571B281B39
:1078B500504E5C1B504D5C1B4B1B5B0070000000069
:0978C5000000000000000000FF00BB
:060000015052494E54501C
:1076C500C776FD7E00C6E02AB47BBDC2E8783A2DB8
:1076D5003EE61FBDDAE878DD7500FD6E02FD660148
:1076E500CD9B7B7D32B57BDDCB05F6FD7E03CB5F88
:1076F500280CDDCB05EEDD360DFFDD360EFFCB5755
:107705002804DDCB05FECB672804DDCB0FC6E603D9
:10771500FE032049DDCB00FEDDCB00F63AF5423D08
:10772500DD770BDDCB056E200C3A323EDD770D3A69
:10773500333EDD770E3ABA7BED5BBB7BBB30017B1D
:10774500DD7701853 2BA7B32BB7B3DDD7702ED5BB0
:107755002047 93ED5BB27BBB3856C3E878DD360D29
:10776500FFDD360EFFFDCB034E281FDDCB00FEFDF2
:10777500E5FD2AB07BFD7E013DDD770BFDE13ABAE3
:107785007BDD7701853 2BA7B18C0DDCB00F6FDE5E0
:10779500FD2AB07BFD460104DD700C3AF54290DD13
:1077A500770BFDE13ABB7BDD7701853 2BB7B189A10
:1077B5002ACB7BDD7507DD7408DD7509DD740AEDFF
:1077C5004BD249B7ED42CAF078090603CD9E632234
:1077D500CB7BFD6E042620CD9B7BDDCB007E280771
:1077E5003ABC7BBDC2EC78DDCB007628073ABD7B81
:1077F500BDC2EC787DDDB605DD77052620FD6E057D
:10780500CD9B7BDD7E05E61FBD2803D2EC783A1FB4
:1078150047FE1838023E1832CD7B677DBCD2EC7826
:10782500DD7706FE1720123A5F49B7280ADD7E008C
:10783500E6C0FEC0C2EC783E173CDDCB007E2803D7
:1078450032BC7BDDCB0076280332BD7B010600CD43
:10785500577BFE013871CAE178DD7E00E6C0FEC0C7
```

:10786500C2E878DDCB05B67C953878DD7E02DD96FD
:1078750001BC386F7C953C477D21BE7BF5CD3A52E6
:10788500B8CD7463F13C10F4CD3A7B3C47DD4E0333
:10789500079CD3A52B8CD8163280305284A0C10F0FA
:1078A500793DDD7704DD8601DDBE022802303B0131
:1078B50004003A053ECB472803010600CD577BFE61
:1078C500013809281C1892CD457B381B21B47B341F
:1078D50001100DD09DD22B67BC3C776CD457B38B7
:0F78E50006B7C93E0418063E0818023E2037C9F0
:06000001444546524 74E43
:1076C500C976F676260011D676EB19195E2356EBA8
:1076D500E90878087808785F77A777B677CF77F8DD
:1076E50077F676F07632774177507 7CD8E70C3F89E
:1076F500773E0132BA70CD9E70CDEF6C2ACD906D7C
:107705000E21023EE5CB562804CD906D02E1E5CB76
:107715005E2006CD906D031804CD906D04E1CB4E2F
:107725002806CD906D051804CD906D06C921023E41
:10773500CB562804CB9618C1CBD618BD21023ECB1B
:107745005E2804CB9E18B2CBDE18AE21023ECB4E8E
:107755002804CB8E18A3CBCE189FCD9E70CDEF6C91
:107765002B21043EE5CB462806CD906D081804CDA7
:107775000906D07E12BE5CB4E2807CD906D0AE118FA
:10778500FE1CB562806CD906D091804CD906D0BF1
:107795003A313ECB572806CD906D0C1804CD906D2F
:1077A5000DC921043ECB462804CB8618B0CBC6189C
:1077B500AC21033ECB562806CB96CBCE189FCB4E9D
:1077C5002804CB8E1897CBD6189321313ECB56285B
:1077D50007CB96CDE5771885CBD6CDE577C3627710
:1077E5003A313EE606F67021403ECB46C8CBC7CDC2
:1077F500FE5FC9CD9E70CDEF6C2DCD0978C8CDEF5C
:0C7805006C2EC9C9473A033ECB6F78C90E
:060000014F4341522A2A80
:1076C500C9762C78260011D676EB19195E2356EB70
:1076D500E94E77E677EB77F0776B77F577FA77FF13
:1076E500770478097 80E7813781878 1D78227827 2A
:1076F50078 3AB47047C62032443E11453E78B7C843
:107705002107003E0ADFC93AB47047C62032483E19
:1077150011493E18E8F5CDEF6C2CF1C92020202049
:1077250020 5B0606210000F53E04DFF1C9473A0358
:107735003ECB6F78C9CD3A52DFCD32777E217F3E81
:107745002803218B3ED62019C93E01CD1A77F5C6EF
:10775500304 70E20ED4324773E50322277F118351D
:107765003E0332BA70C93E05CD327728F3CD1A777C
:10777500F5D604FE0A38090631CDDF77D60A180A90
:10778500C63047CDDF773E201802C630322577 3E1A
:10779500463222 77F1F53C32B870F1112177CD27C9
:1077A50077CD3A77EB32B47047210600B7C42C7712
:1077B5007D32B270065D3E03DF3E0632B17032B3F4
:1077C500703A7A3E32B570CD3A52DD3E4632B670E9
:1077D5003EFF32B770CD3A52E1C9F578322477F1E0
:1077E500C93E02C350773E03C350773E04C350776A
:1077F5003E06C36D773E07C36D773E08C36D773E82
:107805009C36D773E0AC36D773E0BC36D773E0C9A
:10781500C36D773E0DC36D773E0EC36D773E0FC3C7
:107825006D773E10C36D773AB870B7CAF676FE012C
:10783500CA0C773D1822CD327728043E1018023E37
:107845004CD3A77856F2BC9856FE5CD3B7823D17C
:10785500D5AFED52E5C1E1C9217B3EF53D5F16008F

```
:1078650019F1E5CD3A77E5F5CD4D78F15778B128A1
:107875001C3AB470922816C5F5F43B78F1F5E5D1BC
:10788500835FF1C1F29078EDB01802EDB83AB470AB
:1078950047C620D1E177210600FE2028033E0ADFF6
:0778A5003AB570327A3EC9CA
:060000014341522A2A2AA5
:1076C5000077267746312D50474D20434F4E46498A
:1076D500472046322D44474E53542046332D4C54B3
:1076E50041204634 2D41424D2046352D52455345C6
:1076F50054463 62D434F554E545259260011 0D7799
:10770500EB19195E2356EBE92577257729 77487715
:10771500D47732784F78BB78C278D178D17826770C
:10772500C9CD9E7011C976062DCDB0783E0132BA0D
:10773500703A313ECB7FC811F676060A212E00CD70
:10774500B378C93E503200303E00D378CD6077CD56
:107755008F77CD9A773E1F320030C9CD3A52E3215B
:10776500D0751100000E007EFEFF280E46CD7877FD
:107775002318F4EB3E02DFEB13C923BEC846C5014F
:10778500000CD7877C110F618E621A00006500E4E
:10779500213E07DFC9CD3A52E406167832B970C5E5
:1077A500CD7C78CD8F78FD4E06FD7105CD9978237A
:1077B50046FD7E04FD6E02FD66032FA6B828060D64
:1077C50020E7C3B978CD0B78C110D0CD7878C9CD75
:1077D5003A52E4CD7C78CD8F78CD1D78FD7E05FDC0
:1077E500BE062006FD3605011803FD3405CD0B78D0
:1077F500CDF977C9CD99782346FD7E04FD6E02FD4E
:10780500 6603CDAA78C9CD9978462323E5D1FD6EC7
:107815000 0FD66013E04DFC9CD997846FD6E00FD89
:1078250066 01C506003E03DFC12310F6C9CD3A52F5
:10783500E4CD61783AB9703CFE17CC497832B9701D
:10784500CD7878C93E01C93E16C9CD3A52E4CD611D
:1078550078 3AB9703DFE00CC4C7818E10E08C5CDDC
:107865007C78CD8F78C1061FFD6E00FD66012B3E2D
:107875002DFC90E1218E7DD21377A1E0216003A1B
:10788500B9703DC847DD1910FCC9DD6E00DD660124
:10789500E5FDE1C9FDE5E1FD7E053D160782160022
:1078A5005F195E19C9A6BC77C90606210000F53E25
:1078B50004DFF1C9C1C1CD3A52E8C348773A313E38
:1078C500CB7FCA2677CD3A52D6C32677CD8E70C3E5
:0278D500267714
:0600000150 4341522A2A7F
:1076C500C976DE7621E37622BC7032BB70FD21BA25
:1076D50070CDE1777CCD3252C9217377 18E9FB76FD
:1076E5000400DA010B770401DA021B771102DA03D1
:1076F5005F770504E00431010ADA32010BDA330160
:10770500 0CDA880203DA310204DA320205DA3302CE
:10771500 06DA880307DAA20400DBA40401DBA60469
:10772500 02DBA80403DB310404DB320405DB33048C
:1077350006DB340407DB350408DB360409DB3704D4
:1077450 00ADB38040BDB39040CDB3A040DDB3B04A4
:10775500 0EDB3C040FDB880108DA9E0400E08E0492
:107765000 1E0810403E0830402E0880309DA9177EC
:10777500 0600E201A9770301E202B5770101E703FB
:10778500B9770504E004CD770505E005310203E28C
:10779500320300E7330400DE340501DE350207E27B
:1077A500360108E28D0206E28C0205E2880204E257
:1077B5008 8010BE29E0400E08E0401E0810403E0F1
:1077C500830402E0880109E29E0500E08E0501E0E0
```

:1077D50081050 3E0830502E088010AE2FD6E02FDF2
:1077E50066031 10600FD7E003D280447191 0FDE5DE
:1077F500DDE1DD6E00DD6601110400DD460278B7CE
:107805002809FD7E01BE28111910FADD6E05FD75EA
:1078150000DD6E03DD6604180FE5DDE1DD6E01FDBB
:097825007500DD6E02DD6603C989
:0600000153545052 4F431E
:1076C500C9762F78DD21975C11B95C21063E01034F
:1076D50000EDB0CDB2773A363EDDCB079ECB7728AD
:1076E50004DDCB07DE3A9A5CDD4E01ED79219D5C28
:1076F5000608EDB3DD4E02DD7E0EED79DD7E0FED84
:10770500793A2B3ECB6F200A3A073ECB6F2803AF61
:10771500180A3A073ECBAF32073E3E0132803ADDCA
:10772500CB12D6DD7E23CB4F200ACB5F2814CB6747
:10773500280C180EDD7E22E60FFE04FA47773E0080
:10774500180 23EFF32033BCD535721C95536002B56
:107755003EFF0608772B10FCFD21C955DD7E23CBA6
:1077650047 2815CB5F202E3A2B3ECB572827FD36D1
:10777500FE13FD36FD11181D3A443ED62028164F3E
:1077850006002145 3E11C355EDB03A483ED62028A6
:107795000 4FD36F905DDCB244E2804FD36F804DD5D
:1077A500CB2456C8FD36F804FD36FF10C9AF3207A5
:1077B5003BDD7E22E60FFE0B200F3E0132073BDD4F
:1077C5007E07E63FDD7707181FDD7E22E60FFE0503
:1077D500FADE77DD360E5F1804DD360E1F16005F04
:1077E500212478197EDD770FDD7E22CB672818DD11
:1077F500CB07C6DDCB0BB6DDCB09BECB6FDDCB072B
:10780500CEC8DDCB078EC9DDCB0786DDCB0BF6DD1C
:10781500CB09FECB6FDD362100C8DD362180C95787
:10782500302010082015100A0804DD21405E2109CA
:107835003E11625EEDA0EDA0CDCE773A363EDDCBB2
:1078450007 9ECB672804DDCB07DE21435E060BDDF3
:107855004E01EDB3DD4E02DD7E0EED79DD7E0FEDE1
:1078650079CD53573EFF32053BDD362000DDCB1287
:10787500D63A0B3EE6032017DD360940CDEB59DD40
:10788500360B20CD245ADD361000DD361100C9DD5A
:08789500CB11E6DDCB11D6C9D1
:06000001434D494E495435
:1076C500D576FA760E7719773577 51778F77E47710
:1076D500D779FE04200BE6042A2B3ECB95B5322B39
:1076E5003E21063ECDB977C4C477CDA677F3CD3A12
:1076F50052C5FBCFC9D721093ECDB977C4D077CDC7
:10770500A677F3CD3A52C618E9D7061A21113ECD10
:10771500A977CFC9D7FD7E00D620FA1777FE04FAE1
:107725001777 3C4F3E00060421443ECDAA7718BD8D
:10773500D7FD7E00D620FA1777FE21FA17773C4F42
:107745003E00062121483ECDAA77CFC9D706842120
:107755007B3ECDA8773E0521033ECB6E28023E1128
:10776500CD3A52DF3A033ECB6F2805210C0019EBC9
:1077750021800 0B7ED5238067D327A3ECFC90684A6
:107785000E00217B3ECDA877CFC9D7FD7E00320FF5
:107795003ECB572006CD3A52C71804CD3A52C8CF32
:1077A500C906033E40770DDAB577FD560072FD2315
:1077B5002310F2C97EE60F47FD7E00E60FB8C9E546
:1077C50021363EFE023010CBF6E1C9E521363EFEFC
:1077D500023008CBE618F2CBB618EECBA618EAD7DE
:1077E500AF32003ACD0A7828FBCD1078FEFF28137A
:1077F500AF32003A2126781628CD4A6CCD0A782872

:10780500F318E6CFC93ACA40FEFFC9473AC940CD89
:107815000E01FEFFC87821267806280E00CDAA772E
:01782500C999
:06000001575254434F4D1D
:107917001B79AC79FDE5F5DD7E00E6C02156497798
:1079270001F0FFDDE5FDE1FD7E00E61F284CFE1FAF
:107937002848FD09FD7E0057A628EC7EFEC02006DC
:10794700FDCB007E28E1FDE5D1FD7E04FD219749B1
:10795700FD7700FD7301FD7202DDE5D1F1FD7703CF
:10796700FD7304FD7205CD3A5288FD6E06FD66076C
:10797700FD5E08FD5609FDE1B7C9DDE5D1FD21979B
:1079870049FD7304FD7205F1FD7703CD3A5288FD79
:107997005E08FD56092AF5422600DDCB007E280148
:1079A7002CFDE137C9FDE5E12323E51197490107DF
:1079B70000EDB0D1010700EDB0219749010700EDB7
:0279C700B0C945
:0600000150524753544128
:1079170019792A3447ED4B3847AFED422803F22F48
:1079270079CD686CCD8F6CC9FD21A149ED5BFA4219
:10793700FD7300FD7201FD7004FD7105CD3E00C5AC
:10794700CD53003E08CD3C60CB69C128040CFD3502
:1079570012FD7E123D2005040E0018010C2A344743
:10796700AFED4228BCED433647ED4B3447AFB92066
:107977000805210B00194E18010DC5CD686CC1CD46
:087987003A52A4CD3A5245C961
:0600000152444D41524B38
:107917001B795A791140493AF543B7213F3E7E28F2
:107927001AE6C7771ACBBF123A023ECB47C87EE6A4
:10793700F8771ACBB712CD3B6D0AC9E6F8771ACBA1
:10794700B7123A023ECB4728ED7EE6C7771ACBBF80
:107957001218E33AF543B7213F3E1140497E282EDE
:10796700E6C7F51AE63847F1B0771ACBFF123A02A5
:107977003ECB47C87EE6F8CB38CB38CB38B0771A42
:10798700CBF7123E0A80329379CD3B6D00C9E6F8FA
:10799700F51AE60747F1B0771ACBF7123A023ECB52
:1079A70047280F7EE6C7CB20CB20CB20B0771ACB5A
:0979B700FF127EE607C60A18CD96
:060000015349534F2A2A67
:107917001979FD7E08324D493D323747AF324E491E
:107927003236473E01324949FD7E093C324A49CD4C
:107937003A5287CD2F63FD7E043237473C324D499B
:10794700AF323647324E49FD7E08FD96043D281476
:10795700324949DD2AFA42DD7E0B3C324A49CD3AAB
:107967005287180EFD7E09FDBE053006CD3A523D01
:10797700183ACD2F63DD2AFA42FD7E05B72819EDA7
:107987005BFA42FD4604040E00CD53001600FD5E6F
:107997005EB19EB1BCD1F52CD2F63FD5E0AFD567C
:0D79A7000BFD6E12260019EB1BCD1F52C9FF
:06000001494E5331504747
:1079170019792A34477D324E497C324D4924223623
:10792700473E01324949FD7E12324A49CD3A5287D4
:10793700CD2F63FD7E04C6023237473D324D49AF36
:10794700323647324E49FD7E08FD96043D281432F3
:107957004949DD2AFA42DD7E0B3C324A49CD3A528B
:1079670087180EFD7E09FDBE053006CD3A523D183B
:107977003FCD2F63DD2AFA42DD7E0BFD9609281ADB
:10798700F5ED5BFA42FD460805FD4E09CD5300F1C2
:1079970016005FEB19EB23CD1F52CD2F63FD6E0E43

```
:1079A700FD660FE5FD5E091600B7ED52D1CD1F52FA
:0179B700C906
:0600000144454C3150475C
:107917001979FDE5FD5600CD0A63CD8B68DAB57997
:10792700CD51633E08CD3C6042ED43BF792AFE420C
:107937006922BD79ED4BBF79CB692810CD5879CD38
:107947002F632AFE423ABF796F22BD79CD58791845
:1079570055CD3E00FD4E120600FD6E0AFD660BE595
:1079670092B3E08CD3C60ED43BB79E1E5D113FD22
:10797700461205280S3E0BCD3C60ED4BBD793E0216
:10798700CD3C603A6049CB4720063A043ECB57C806
:10799700FDCB024EC0FD3404FD360500ED4BBB792F
:1079A700ED43BD7918ABFDE10E01CD7561C9FDE170
:0479B700CD3460C9A2
:0600000149 4E5343485232
:107917001979D721AB793AF742FE01280B3ABA70A9
:10792700FE022004361918023601210000 3E50CD10
:107937006179CD4879FA417920F30602CD6B52CFB0
:10794700C93E0DCD9E793A053ECB5728053E0ACD57
:107957009E793AAB793D32AB79C932AC79E5F5CD51
:107967008 2793AAC793002233D233D32AC79280441
:10797700FEFF20EBF14FQ600E109C93E08CD3C6050
:1079870078B72002062078CD9E79CB6928073E205C
:10799700CD9E7937C9B7C9C54F0600DD213A53CD0A
:0679A7006B52C1C9000093
:06000001434E465052542C
:1079C900CD79D479ED43327AAF181DED43327A2A55
:1079D900F542260016023E08CD3C60CBB03E02CDF2
:1079E9003C60231520F03E0132317A3A337AB7C828
:1079F900DDE5D1ED4B317ADD4E0B0CDD7E00E6C0C5
:107A0900FEC020010CC5CD53003E08CD3C603A3183
:107A19007AB72004CBF01802CBB03E02CD3C60C14E
:087A29000421337A3520DEC987
:06000001534342544E4639
:1079C900CD79E179FDCB035EC0FD4606FD4E07ED9D
:1079D900433447CD3460AFC9FD660DFD6E0CCDC98A
:1079E9006CCD3E00FD5E12CD197A281C1D28062398
:1079F900FD340518F2FDCB024EC0FD3404FD3605F9
:107A090000CD3E0030DE1803CDA66CCD3460AFC981
:0D7A19003E08C5CD3C6078C1B7C8FE20C94D
:060000014D414E454E5436
:1079C900D179DF79EF79E77906102169 3ECD9E6398
:1079D9003E0FA6771816CDFB79CD7463180ECDFB33
:1079E90079CD816328F0CDFB79CD7A633E01322EC2
:1079F90043C93A3447DDE5DD2AFA42DDCB007E2072
:0E7A090007C5DD460C0580C1DDE121693EC9DF
:0600000154414253455436
:1079C900CB79FD7E00FE31D8FE34D0D630474F1139
:1079D9004049 3AF543B7281CCB20CB20CB201AE6E7
:1079E900C7B0123A023ECB4728051AE6F8B112CDC4
:1079F9003A520EC91AE6F8B0123A023ECB4728EFBE
:0D7A09001ACD20CB20CB20E6C7B01218E22C
:0600000153454C43485337
:1079C900D079444F4E453AE5D53A0B47D607381199
:1079D900C5210000 11CB7906050E033E05CD3C609B
:1079E900C178A7210000280 9C506082310FDC11088
:1079F900F71105001923D142D10E013E05CD3C6096
:017A0900C9B3
```

:0600000144495350 4C4439
:1079C900CB793A3847FEFF281EED4B3847ED5BFA75
:1079D90042CD53003E08CD3C603E1FB82009ED4B17
:1079E900FE423E03CD3C60ED4B3447ED433847ED55
:1079F9005BFA42CD5300ED4B1847061F3E02CD3CC2
:057A090060CDFE63C921
:06000001534E444D524B2A
:1079C900CB79FD7E00E63FFE14F2EF79DD21F279F5
:1079D90032DE79DD7E0032ED79110300FD190B0BE2
:1079E9000BCD3A5200C9CD3460C9869182929394E5
:0D79F900000009596B3B2C0C100C4D6C2C351
:060000014558545752540B
:1079C900CB79CD2F63FD7E03E603FE0328362A34E7
:1079D90047E5FD6606FD6E07223447CD3A523DCD97
:1079E9005F772A3447E3DD2AFA42DD7E03FD9606F6
:1079F90038092807223447CD3A52F9E1223447AFF2
:087A0900325549C9CD3460C9B2
:06000001455253494E5028
:107A3400367ACD3A529FDA2F7BCD3A52B4DA2F7B85
:107A4400ED4BCC7B3ABC7BB8C22D7B3ABD7BB8C234
:107A54002D7BDD2AB07BDDCB00EE213A3E34CBAE6C
:107A640021214711BE7B060D1AB677132310F93A6C
:107A7400B27BED5B204783322047CD3A52CC3E4067
:107A840032393E2ACB7B22CE493AAF7BB7200E3A1D
:107A94003B3E32CE7BCB8F323B3ECD7460DD2AB889
:107AA4007BED4BB37BAFF6C5CD3A5284DD4604DDA7
:107AB4004E0B0CDDE5D1CD5300E5D1010000DD7E98
:107AC40000E6C0FEC02001133E00CD3C6001100062
:107AD400DD09C1F13C05F2AA7ADD2AB67BDD7E031D
:107AE400CD3A5285301AFD2AB07BDDCB007E2808C2
:107AF400FD7302FD7203180FFD7304FD7205180770
:107B0400D5C13E02CD3C6001F0FFDD0921B47B35D7
:107B1400F2E17A3AAF7BB7C02AB07BCD3A528B3AC6
:107B2400CE7B323B3ECD7460C93E08CBC7F64032B3
:107B3400393ECD3460C9DD7E05E61FED44DD8606A1
:107B4400C9CD3A7BDD8603DD7704DD8601DDBE0227
:107B5400C83FC9FD093AB37B9132B37B2836FD7E19
:107B640000FE1B202D3A053ECB472817FD6E05FD70
:107B74006604CD9B7BE5FD6E03FD6602CD9B7BC158
:107B840079180BFD7E02C6E06FFD7E03C6E0673EFA
:107B940002C9AFC93E01C93EE0856F3EE08467CBB0
:0B7BA4003C3002CBF5CB3CD0CBFDC940
:06000001444546454425F
:107A34003A7A827AC67A0600CD7A6777CB492006ED
:107A4400CB4128101838CB59C4B67BCB51C45E68DF
:107A5400CD3252C9DD7E04473A2753CB67782007DD
:107A6400E5FDE1CDA27BC9473A0F3ECB4F28065036
:107A7400CD2E6C18EBCB4728E750CD2E6CC9DD7E9C
:107A840004CDDE7B7ECB49C23460CB41280CDD467D
:107A94007F53E0132026CF1189CCB71C2787BDD94
:107AA4007E04CB59C4D47BCB61C4AD7BCB51C87E9F
:107AB400E5FDE1FD23F53A026C3D06004FF1CD32C0
:107AC40052C97ECB7F20B7E5CD3A52B5E177CB7171
:107AD40020C6CB79C23460CB41C41260CB492803A1
:107AE40032554 9CB5128140CB692805CD1E6C180B8F
:107AF400E521D37B160177CD2E6CE1CB59281BCB26
:107B040069280DFDE5FD21036C0602CDA27BFDE194
:107B1400E5FDE1C50E01CDB76BC1CB492838FE4A5E

```
:107B24002829CB692830FE71202C473A2753CB678C
:107B340078282 3E5210F3ECB56E1281AE521033EA0
:107B4400CB5EE12011CD3A5238180B3A2753CB675C
:107B54002804CD3A5280CB612806DD7E04C3827AA4
:107B64003A033ECB6FC8CB49C83A5549D631F8FEE3
:107B74000CD0C6043CCD8E7BB7C8573A2753CB678D
:107B8400C42E6CC93A033ECB6FC9CD3A52DFCD88BF
:107B94007B7E217F3E2803218B3ED62019C9C5FD5B
:107BA400E548CDB76BFDE1C1C9CB69C4C77BCD56F0
:107BB40068C9E5CB71C4C77B21D37B771601CD2E71
:107BC4006CE1C9E521D27B1601CD2E6CE1C91B0005
:107BD400CB69C4C77B57CD2E6CC90E00E5F57EFE7C
:107BE400813005CDEC73185AFEA23859FEAA382C00
:107BF4002822FEF320163A103EE60FC660CDFE5F43
:107C04003A313EE606C670CDFE5F1836D66B77CDA8
:107C1400EC73182E3E1B77CDEC731826D6A2CB47F7
:107C2400281BCB3F3CFE042819473E7977233E307E
:107C340080772BCDEC73F1DD360402E1C9CB3F77BD
:107C4400CBF1F1E1C9D6815F1600E521767C197E7E
:107C5400FE50CC607CE177CDEC7318E621726D5F49
:107C64003A403ECB5F2801653A0F3ECB5728015C72
:107C74007BC9444143426162 0A0D0873740932515D
:107C840000666564636867484 83D4A493C004F5054
:037C94004E5777D1
:060000014B4250524F4338
:107A3400867AEC7A717B00000000000000000000F0
:107A4400000000241249241212492412094924 1264
:107A540049040402000503010 6FFFF0907FF0A08A1
:107A6400FFFF020005030106 04FF1107FF1210FFC8
:107A7400FFFF0005030106 0402FF07FF1210FFFFCA
:107A840011FFF57932407AF12209473A407A4F3EA4
:107A94002CDF3E20D37C061078ED44C610D37D0E37
:107AA4007AF3ED513E02D3793E0DDFDB7AE67FBAFD
:107AB40020F0FBDB7BCB3F772310DDE5FDE5D5CD67
:107AC400717B3A0847A7C4EC7AFD2A0947111000D4
:107AD400FD19FD220947D1FDE1E1141D20ADAFD30D
:107AE4007C32013BCD7460C93A0847060FA02807D1
:107AF4000E003E2CDF18050E043E2CDF7A32467A47
:107B04003E20D37CAFD37D0610C50602FD2A09476B
:107B1400FD7E00F5CB27CB10CB2078D378F1FD2A5E
:107B24001347FDE5D1CB3BCB1ACB17D37BD5FDE176
:107B3400FD2213473A467ACB27FD2A1547FDE5D1A6
:107B4400CB3BCB1ACB1FD37AD5FDE1FD2215473EA3
:107B54000FD3793E0DDFFD21147BFD7E023CFD77C2
:107B64002C110A5AFFD21147BFD7702C9FD214799
:107B74007AFD223A7AFD2A0947FD223E7AFD2156F2
:107B84007AFD223C7AAF32457A32417A32437A32F4
:107B9400447A3E0B32427ACD0D7CFD214C7AFD2293
:107BA4003A7AFD211547FD223E7AFD21667AFD22AF
:107BB4003C7A3E0132457AFD210000FD221547AF93
:107BC40032417A32437A32447A3E0B32427ACD0DD4
:107BD4007CFD21517AFD223A7AFD211347FD223E94
:107BE4007AFD21767AFD223C7A3E0132457AFD21E6
:107BF40000FD221347AF32417A32437A32447A8D
:107C04003E0B32427ACD0D7CC91E020603C52142C9
:107C14007A4E06002A0947097E21437A4E2A3A7A87
:107C2400094EA14F3A417A8132417A3A427A3C3242
:107C3400427A3A437A3C32437AC110D1CD4D7CAF7B
```

:107C4400032417A06021D20C5C9D50608C53A417AD3
:107C5400CB3F32417A304E21447A4E06002A3C7A98
:107C640097E06FFB8283EF53A457AA72843F1F580
:107C740006F0A0C4C77CF1060FA0CB27CB27CB27E7
:107C8400C6C6FD21977CFD7703AFFD7702FD2A3E32
:107C94007AFD23FDCB00C6FD21957C3EFDFD7700DA
:107CA4003E23FD77013A447A3C32447AC1109DD197
:107CB400C9F1FD21977CFD77023EFEFD7703CDC718
:0F7CC4007C18CAAFFD21957CFD7700FD7701C9C3
:06000001434744494147 5A
:107A3400607A0E7C0A7C5B7A547B547B547B3B7B60
:107A4400427BC57B547B427B0D0A0F1B79001D884A
:107A54007C8F7C977C937CD73E011802D7AF32464B
:107A6400492A3647E52A3447E5CD0A633AF543B750
:107A74003EA328023EA632807ACD3A5200DD21414F
:107A84003E3A4649B72806CD2F63C3217B3A38478F
:107A94003C2830ED4B3847ED5BFA42CD53003E08AD
:107AA400CD3C6078FE1F2014CD3A52E6E1C3047C3D
:107AB400CD6C68C3FD7BAF32644918F401FFFFED60
:107AC400433847DD7E01D620326149DD7E00E60C75
:107AD400281BFE043A61492818CD3A52D0DABA7A02
:107AE400226249DD7E02D620326449 1812AF326127
:107AF40049CD3A52D0DABA7A226249AF326449CDDA
:107B04003A52D8DAB47ACD6C68FD21A149FD7500EA
:107B1400FD7401AFFD7704FD7705CD3E00DD7E00E9
:107B2400E60347FD7E0357E6033CE6FC80D5213C93
:107B34007ACDCA00EBD1E9CB5A2015C3C57BFDE54C
:107B4400FD2AFA42FDCB057EFDE12075CB5A20715A
:107B5400FDCB037E2810CD3A52A0200A16012152F3
:107B64007ACD2E6C180CFDCB03762806CD3A52A1A3
:107B740028EAFD4606FD4E07FD7004FD7105FDE58E
:107B8400FD212E47FD7000FD7101CD6B63CD636354
:107B9400D521C149FD7E027723FD231520F6D13E70
:107BA4002825721BF49CD2E6CFDE1DDCB00662852
:107BB40007CD3A529BCAC57BCDC96CCD3E00CD0ED4
:107BC4007C3A4649B72032CD4100D2217BDD7E008C
:107BD400E60C4FFE0C28222A62493A64493C32647E
:107BE40049CD3A52D8D20A7B3E04B9280C216149C6
:107BF400347ECD3A52D0D2FC7ACD8F6CE122344718
:107C0400E1223647CFC93E011801AFDD21413E32A2
:107C1400C649CD157D3E08CD3C60E53AC649B72836
:107C24000FFD7E05573A8A4AFEFF2804BADAE47C3F
:107C3400ED5B6D4979E67F326D4921043ECB6E28B8
:107C440019BB281667ABFE407C280FF64032CB499F
:107C540021C949D51603CD2E6CD178E680326E4900
:107C6400BA200C79E640F57BE6405FF1BB28317819
:107C7400E680F579E64057F1B2070721537ACDCA79
:107C840000D5E1E9214E7A160118123E3118063E5C
:107C94003218023E33160321517A772B2BCD2E6CEA
:107CA40021C549701601CD2E6CE13AC649B72006AC
:107CB400DDCB00662813ED5B6549E5FD6604FD6ECA
:107CC40005AFED52E120023CC9CB692807FD34051C
:107CD400FD351223FD35122808FD340523C3197C14
:107CE400E1FDCB024E2802AFC9FD34043A894AFEB5
:107CF400FF2001AFFD770521043ECB66280D160158
:107D0400CB46280114214C7ACD2E6CCD3E00C316EF
:087D14007CFD660BFD6E0AC93F
:06000001524541444246 55

:107A3400367AC9637ABC7A057B2D7B557B8F7BD4E0
:107A44007BE37BB47BF27B047C1A7C2C7C3E7C55F0
:107A54007C677C8C7C9E7CB07CC27CDA7CF17CACC8
:107A64000106 3EF0010C0C101418 1C21262B303595
:107A74003A40030031313003013230300302 3330F5
:107A84003003033630300404313230300405 3234EC
:107A940030300406333630300407343830300408CC
:107AA4003732303004093936303005 0A3139323052
:107AB40030050B4558434C4BBE01093EF0010A0A00
:107AC4000E12161A1F24292E3303003131300301FC
:107AD4003230300302333030030336303004 0431A3
:107AE40032303004053234303004063333630300 45A
:107AF4000734383030040837323030040939363 02E
:107B040030FC01063ECF0104040C141907004E4F4B
:107B14004E4528302907204E4F4E4528312904 1060
:107B24004556454E03304F44440E02093ECF0104EE
:107B3400040C141907004E4F4E45283029072 04ED7
:107B44004F4E4528312904104556454E03304F44C5
:107B5400444C02073EE0010606090C121C270200F1
:107B6400484402014644050448442D524309194639
:107B7400442D5243284F4E290A0946442D52432886
:107B84004F46462905034 6442D41535E020A3EE012
:107B94000103030610020146440919 46442D5243C9
:107BA400284F4E290A0946442D5243284F46462958
:107BB400FE020B3EC00103030A0F06014F54484561
:107BC40052530408 4E4F4E45060554492D3834305F
:107BD4009C02363EBF01020204010031014032AE74
:107BE40002363EEF0102020401003101103 28C031F
:107BF4002B3EFB0102020603004F464602044F4E91
:107C0400DC030F3EEF010202070400454 3484F0521
:107C1400104C4F43414C2C04073EDF010202060383
:107C2400004F464602204F4E7C040F3EF7010202ED
:107C3400050200 4E4F030859455 3CC04083EF90190
:107C440003030 80A04004E4F4E45010204020410C7
:107C5400041C05083EF70102020502004E4F03080A
:107C640059455 36C05083ECF010404080C11030068
:107C74004F464603104F52470420414E535208309A
:107C84004F52472D414E5352BC05083EFE0102029D
:107C94000603004F464602014F4E0C060F3EDF011D
:107CA40002020603204F464602004F4EAC06403EF9
:107CB400DF01020205020038300320313332FC06B2
:107CC400053EFD010202090602535041434553 0596
:107CD40004E554C4C534C07043EFD0102020A076A
:107CE40002454F462D5441442030054414 29C07042F
:107CF4003EFB010202060304454F460700454F4C74
:047D04002D454F4674
:0600000141435444415448
:107A3400367AF3313A4E21A84E11034DED52E5C189
:107A4400D5E12B3600EDB021604B118D4AED52E5A6
:107A5400C1D5E12B3600EDB03E40ED47ED5E217F10
:107A64007B110940010600EDB011D040011000ED7A
:107A7400B03EC332CD4021816322CE402A957B2281
:107A8400EE402A977B22FE40AF32803A3A013BCB4C
:107A94003FCB47C4AF7ACCB27ACB4FC4B57ACCB81B
:107AA4007ACBF7CB6F2010CBEF180ECBC7C9CB879F
:107AB400C9CBCFC9CB8FC9CBAFE6F36F3A2B3EE628
:107AC4000CB5322B3E21363ECBBE213B3ECBC6CB42
:107AD400CEED4B403E3E40213C3E0606772310FC53

```
:107AE4003E207723773E44323D3E21403ECB6928F9
:107AF40002CBEECD937CCDC976CD2F78CDBE7BCD98
:107B0400507CCDB17B0606DD21AF7BDD6E00DD66EA
:107B14000178CD2A51DD2BDD2B10F0215144065084
:107B2400CD9E632101440650CD9E6321997B060CB2
:107B34007ECDE66C2310F93A0F3ECB572806CD3B99
:107B44006D131804CD3B6D123A313ECB7F2808CD1E
:107B54003A52CDCD3A52CEFB21B004110100060OB9
:107B64003AFA43FE05280D10F7B7ED5220F0CD3B4D
:107B74006D0418E4AF32FA43C33450C3A144C34A7A
:107B840000E15EEA5C945F945FEA55D356D854935F
:107B940054AD4FF07B090A110F101617193203416
:107BA400264B530D54685EC96D3D52426A3EB7D3AD
:107BB400DF3EEAD3DF3EE8D3DCC9AFCBE73227535D
:107BC400CD3B6D16210E00CD81693E04CD2A5101B5
:107BD40004001C94021DF7BEDB0C900FF0000049F
:107BE4007C0D7C167C237C2F7CE85F00D73A003A1E
:107BF4002AFA432600 11E37B29194E2346C5E1E9FD
:107C0400CD3B6D033E28C3457C3E0132FA433E40E2
:107C1400182FFEF620F33A313EE606C67018223AD3
:107C2400103EE60F32EF7BC6601816E60707473AA8
:107C3400EF7BB820D4CD3B6D093E2021E85F22FEC6
:107C44004021FA433432003ACFFBED4DCD3A524C49
:107C54002A0F40110300B7ED52ED5222D249ED4BE9
:107C6400D049ED4201 0000ED5238030318F9CB204E
:107C7400CB213002CBC0CB20CB213002CBC0CB29CF
:107C8400CB2979C620322F3E78C620322E3EC9D762
:107C940011018OCDB97C110280CDB97C110380CD56
:107CA400B97C3A0F3ECB572006CD3A52C71804CDC3
:107CB4003A52C8CFC9FD2119403E0AD5F57AE607E4
:107CC400FD7701FD360200FD360300FD73003E150D
:0F7CD400DFB72808F1D13D20E23E27DFF1D1C90B
:060000014F53494E495423
:037D1C0000000064
:06000001415452544 24C30
```

APPENDIX B CMOS RAM

```
:103E00002424414261564443404241454241444199
:103E10004E4B202855262630392E2E242420204195
:103E20005A617A20202020202020205320 2B232874
:103E300105EFFFF8400014040404043404440404A
:103E40004040202020000000284F505449203934A1
:013E5000 3041
:103E690000000000000000000000000000000000049
:063E790008020202020 43
:06000001434D4F532A2A73
:1000000F3ED5E6DC3A5012ADDE1F1C1D1E1181365
:10001000DDE3FDE5E5D51813E5D5215104C35F0007
:10002000C30040FDE1DDE3C9C30340C5F5DDE9419F
:10003000C3064053 4D205443C30940C3840EC377C5
:10004000 0BC3E20CC3F80CC3700DC32B0AC35E0DC7
:10005000C3D30CC30E0D000000000000000000CD53
:10006000CA00EBD1E3C9F53A003BCB5F2804F1C3EA
:10007000C40F1D3EED3EF210340E5ED4500000045
:100080002AF643E5DDE1DD7E09C9D5FDE1FD36084F
:10090000 1FD6605FD6E04F9FD6607FD6E06FD2295
:1000A000F643E5FDE1D1C1E1F1DDE1FDE3C9CDD3E9
```

APPENDIX C
System ROM

```
:1000B000002810CDE5002009D5545D232373237259
:1000C000D1F601C9CDCA00CB27C95F160019195E48
:1000D0002356C95E23562B7AB3C92AF843CDC400F0
:1000E000D5DDE1B7C9EBD5CDD300E37323722BD1B6
:1000F000C9C54E732346722BEB36002336002BEB1B
:100100006069732372C1C9F5AF32003AF1C9F5AF26
:1001100032C9403EFF32CA40F1C93AF543FE0028D9
:10012000103ACC40B7C83ACA40FEFFC0AF32CC400C
:10013000C93ACC40B720F532003AC921363E3AFAE6
:1001400043FE063A003A302CFEFF2820FEF0282815
:1001500032CA40FE852806FE862802CBBE3ACB4036
:10016000B72810F53E3032CC40F1181432C940AFF8
:1001700032003AC9AF32FA43CBBE3ACB40B7280877
:10018000F5AF32CB40F118E83ACC4018E30603C58E
:10019000CDDB05C1B7C810F7F3AF32003E113C0408
:1001A0000609C3F2033E40ED473EEB06FF10FE3D5D
:1001B00020F9C3150B2100203E54BE200223E92163
:1001C0000030366F3E01D3782100400E4059DD21CA
:1001D000D501C3DC084B1E00210040DD21E601FDF6
:1001E000211202C3F40821008000E8059DD21F301A1
:1001F000C3DC084B1E00210080DD212402FD210408
:1002000002C3F408F9FD211D02DD2127021E01C3EE
:100210000A09111B04060631FF3EC3EF0311210436
:10022000060718F33100003BFD217B03C33903FDB2
:10023000218303C33903081BED730F40ED4B0F40BF
:1002400078BA20D979BB20D508FEAAC26403ED7321
:100250000F40FD210000110010CD33097DB42808A6
:100260001128040606C3EF0321FF1F221140DD21E0
:10027000A0032100000620C50600C5015555CD93F9
:100280000301AAAACD9303010000CDD20423C1101B
:10029000E9C110E3CDCE032100203E50BE2028FD51
:1002A00021D007110010 3A0120FE022803110008 96
:1002B000CD33097DB42810112E040607C3F20311B3
:1002C00035040607C3F2032A003EE5AF32003E21A3
:1002D000003E110041010001EDB0FD218B03C33947
:1002E0000311003E210041010001EDB0E122003E7A
:1002F000CD5D073E242A003EBC2003BD2815FD210C
:1003000019402100002219 40CD8D011145040606 37
:10031000C3F203FD2119403A353E6F3A363EE60FEF
:1003200067221940AFFD7704CD8D0121002057 3E93
:100330004DBECA01202A1D40E93E55FD6601FD6EF5
:1003400000FD4603FD4E020B77545D13EDB0FD66D4
:1003500001FD6E00FD4603FD4E02BE36002010ED8D
:10036000A1EA5A03FE55280FFD6605FD6E04E9EB70
:10037000FD6607FD6E06E93EAA18C0004000402F4A
:1003800002120200800080 4E023602003E0001E1AF
:1003900002BF02C5CDB204CD1A05D1CDC203DDE91D
:1003A000D02B22114023DD21AB03C9D87CC6F8F243
:1003B000BA031133000605C3EF03114B040606C34D
:1003C000EF0378BA200679BB2002AFC937C9D7AF8F
:1003D000D378210030362F114F00210000E5C1CD28
:1003E000AD04210000110904 0609CDF204CFC9CDE6
:1003F000CE03D5C5210900111204011209CDFE0456
:10040000C1D10E12CDFE0418FE53454C4620544572
:1004100053542D4641494C45443A2052414D2054B5
:100420004352414D2041464D524F4D20544350526E
:100430004F4D205443434D4F53205443524F4D533F
:10044000204C4F4144425459205443534D20444D75
```

```
:10045000045AD04CB04D204E904F204FE04E5040A29
:100460000051A052D0531053D056805CA0546095CD7
:1004700009820998 09D1050906FF05DB055D0753C7
:10048000088508190933093609DA08F208CD09EC9C
:1004900007530973098F09B109F8090C0A8D0198EE
:1004A0000177057305 7F057B05670B0000CDCB0445
:1004B00078D37A79D37BD5EBB7ED52233E0FD3793E
:1004C000CDCA052B7CB520F4E123C97CD37C7DD338
:1004D0007DC93E03F5CDCB0478D37A79D37BF1D3B4
:1004E00079CDCA05C93E0F18EBC5CD1A0579C14FA4
:1004F00018E0C51A47CDE9041323C110F5C9C51A80
:1005000047CDD2041323C110F5C9D5C5D1CD1A05E5
:100510004BCDD204231520F5D1C93E02F5CDCB0435
:10052000F1D379CDCA05DB7A47DB7B4FC93E0E1884
:10053000EBC5CD1A0578121323C110F5C9C54806BD
:1005400000B09EB09C1C5CD50051B2BC110F7C924
:10055000CD1A053EBFA14FC5EBCD1A05E33E40A124
:10056000B54FE1EBCDD204C9EBC5CD50051323C186
:1005700010F7C90E02180A0E0318060E0018020E14
:10058000017CD37C7DD37D3E02D379CDCA057AD35D
:100590007C7BD37D3E03D379CDCA05CB41281E7C1D
:1005A000D37C7DD37DAFD37B3A053ECB4F28043E31
:1005B000201801AFD37A3E03D379CDCA05CB4920A9
:1005C0000413231802 1B2B10B8C9DB78CB6720FA61
:1005D000C9FD4601FD4E00CDFB07C9CDD105CB7F3E
:1005E000C03A2540CB67200CFD360200FD360300E3
:1005F000CD0906C92A13407CBD20033E82C9E9CD3E
:10060000DB05FD6605FD6E04E9CDD105CB7FC0CDD0
:10061000B706CDD306E5CD3307DDE13808CDF506C5
:10062000FE81C818323A2540CB6F2810D5E5CDB7EA
:1006300006DDE5E1CDD906CDF5061811CDD105CD04
:10064000F206FE81C8CD3307D5E5CDF206E1C1FE45
:1006500081C8CD380738F1CD7206FD5E041600FD65
:100660006E02FD6603191 95E2356FD7304FD7205C3
:10067000AFC92100203E50BEC0110800194623FD1D
:100680007E00BE200E23FD7E01BE23CC97062310E4
:10069000EDAFC9232318F7E5C55E2356EB4E7E2345
:1006A000B6281146235E235623E52A234019EBE1A1
:1006B000EDB018E9C1E1C9502125407EE660B728B8
:1006C000082A264023232226400104002 11F40CD72
:1006D000EC07C9FD6E02FD6603E5ED5B21407DB4CC
:1006E0002805AFED521806FD7203FD730222234068
:1006F000E1C9CDB706CD0F07010400211F40CD99F8
:1007000082A1F407CBD2805CD0F0718EBAFC9EDA7
:100710004B1F402A2140ED5B2340191600CD99085C
:10072000D5010100211F401600CD9908F182C8E1D2
:100730003E81C92138404604 1002AFC9237EFDBE68
:10074000023200A7EFDBE012328062318EA231871
:10075000FAC54E2346E5CDFB07E1D137C9AF32805C
:100760003B3E2032803BAFDD21284032803B3E10B3
:100770002138403280 3BAF061310FE32803B06101A
:100780000EFF3600230CC5E579210000CD2E08218F
:1007900025400101 00CD85083A2540FEFF2007DDF8
:1007A000360000E11809DD7700E1C1C5CDB607DDEF
:1007B00023C110D1AFC9410E00E5C5CDFB07CB7FEA
:1007C00020272125407EE660B7281AC150213840F5
:1007D00034E1E5C5010200CDEC07C1E1232371231B
:1007E00070230C18D4C1E118F9C1E1C97AE5C52A12
```

```
:1007F0002640CD2E08C1E1CD8508C9212840016002C
:1008000058197EA720063E80C9C118FAC50CB9FA4E
:100810000908782108001103000D28031918FACDE2
:100820002E082125400103000CD8508C1AFC9221F34
:1008300040CD3808CD5308C9211F402346CB3FCBBC
:100840001ECB3FCB1E23772B3E3FA0473EC0A6B01A
:10085000772BC9AF32803B0E033E20ED6732803BE1
:10086000E60FDD23DD2B0D32803B2814F620DD233F
:10087000ED6732803BED6723AFDD2B32803B18D92B
:10088000ED67ED67C93E1032803BAF571E031D2058
:10089000FD32803B3E0A3D20FD3E1032803B781EFB
:1008A000021D20FDB1C83E0032803B1E011D20FD0F
:1008B0003A803BED671E011D20FD3E1032803B1E3D
:1008C000031D20FD3E0032803B1E011D20FD0B3A22
:1008D000803BED677A86572318BFDDE13E6906004D
:1008E0005778A97AEAE808371777231OF30D20F034
:1008F000DDE9DDE13E6906005778A97AEA000937AB
:1009000017BE08AFBB200D08200823 10EB0D20E810
:10091000DDE9FDE90828FB18F11101A0060879AD11
:10092000CB3CCB1DE60128067CAA677DAB6FCB399B
:1009300010ECC921 0000FD4E00D5CD1909D11B7A5C
:10094000B3C8FD2318F0F5CD5309FD23CD5309FDA0
:100950002BF1C9FD7E00C620FD7702C9F5FD7E00A2
:10096000CD7309FD7E01FD23FD23CD7309FD2BFD14
:100970002BF1C9F5CDC109FD7702F1CDC809FD778D
:1009800003C9F5CD8F09FD23CD8F09FD2BF1C9FDDD
:100990007E02D620FD7700C9F5C5CDB109FD7700EF
:1009A000FD23FD23CDB109FD2BFD2BFD7701C1F109
:1009B000C9FD7E02D6200F0FF5FD7E03D620C1B003
:1009C000C9E6C00707C620C9E63FC620C93ACB40E2
:1009D000B720FAF321CC407EB720173E30773AF5A6
:1009E00043FE0020067832003AFBC93ACA40FEFFB7
:1009F00020F37832CB40FBC93A033EE606280ACB07
:100A00005728043E1818023E104718C13A303E21BC
:100A1000023ECB662802CBFFCB5E2802CBEF213B08
:100A20003ECB4E2002CBF7320030C9ED730043318C
:100A30002C43D7DB78F53E88D379F1FD2A0243CBEE
:100A400057C2E70AFD7E00FE0E2861FD6E03FD66BB
:100A50004FD4E05FD46063E02CDD204FD7E02FE9B
:100A600002200C23FD4E07FD46083E02CDD204FDB8
:100A70007E00FE0D285DFE113805CDEC0A1826FD1E
:100A80007E00FE0F20043E4018023E414FEE01D38F
:100A9000793E88D37979D379CFED7B0043F53E94C5
:100AA000D379F1ED45CFED7B0043ED45FD6E022698
:100AB0000FD4E06FD46073E02CDD20423FD4E0446
:100AC000FD46053E02CDD204FD7E03D37EFD3601F8
:100AD00018D2FD6E0AFD660BFD5E0CFD560DFD85
:100AE0004609CD7B0518E6CDEC0A18B9FD6E0AFD66
:100AF000660BFD4E0CFD460D3E02CDD204FD7E0977
:100B0000FE02200C23FD4E0EFD460F3E02CDD20408
:100B1000FD360100C9210050F93A313ECB7F28440F
:100B200016002100083E20D37C06100E02CD670B74
:100B3000783DD37DCD5B0B3E02D379CDCA050E0047
:100B4000CD670B3E08D3783E03D379CDCA0510DBC1
:100B500142B7CB520D3AFD37C18097AD37ADB7AF7
:100B6000BA20F8C9C3B5017932003B0F32013B0FFF
:100B70000FCBF7320030C9D7FD360200FD6E00FD05
```

```
5E
:100B8000660122F345DDE1FD7E05FEFF2009DD80
:100B9000860BFD7705FD3504FD7E05DD960B3809D6
:100BA00028073DFD7705FD3404FD7E04B7FACC0C23
:100BB000DD7E02DD9601FDBE04DACC0CDD5E09DDD2
:100BC000560ADD6E07DD66080103 00E5DDE1FD7E06
:100BD00004DDBE00381C200CFD7E05DDBE01381290
:100BE00020021811D5EBB7ED52EBD12002180609FF
:100BF00018D9B7ED42E5DDE1FD7510FD7411DD7E1C
:100C000002FD7703DD4600DD4E01FD7006FD710734
:100C1000ED5BF343CD0E0DFD750CFD740DFD46042B
:100C2000FD4E05CD0E0DFD750AFD740BFD7E04FD18
:100C3000BE062004FDCB02C6DD2AF343FD5E10FD97
:100C40005611DD6E09DD660AB7ED52280BEBE5DDC6
:100C5000E1110300DD191824DD7E02DD9601FD7728
:100C60008DD7E0BFD77093CFD9605FD7712FD7EC4
:100C7000008FDBE042040FDCB02CE183AFD7E04DD07
:100C8000BE00200CFD7708DD7E013DFD770918D7F9
:100C9000DD7E01B728133DFD7709DD7E00FD770875
:100CA000DD2AF343DD7E0B18BEDD460005FD70082E
:100CB000DD2AF34318ABFD4608FD4E09ED5BF34317
:100CC000CD0E0DFD750EFD740FCFB7C9FDCB02D64D
:100CD000CF37C9CDE20CD8FD7E03E603FE0320EA40
:100CE00018F1CD770BD8F5FD7E093CFD7705FD7E2B
:100CF0008FD7704F1C3770BCD770BD8F5FD7E07A0
:100D00003DFD7705FD7E06FD7704F1C3770BDDE53C
:100D1000D5D5DDE1DD7E0180213043DDCB007E20B5
:100D20000032190435F1600195E3AF5423C3C2E00C9
:100D300067FE52CC460DC4520D5F19060009DD4E08
:100D40000C09D1DDE1C929291929291929292919CC
:100D5000029C9291929292929291929192 9C9DD4622
:100D600000FD4E00CDD20423DD23FD231D20EFC95D
:100D7000DD2AFA42DD7E00E6C0FEC02820CB7F28B7
:100D800029DD6E0B2C2600ED5BF5421D1600CD7D96
:100D90000EAF32FC42DD7E0B32FD421822AF32FC38
:100DA000423AF5423D32FD421815210000DD5E0C4D
:100DB0001D1D16003E00CD7D0EDD7E0C3D18DF2A88
:100DC000FC4226001E0016080E003AF542FE842062
:100DD00002160D062ECD610E063ACD6C0E062ECDF6
:100DE000610E1C7BFE0A20021E007BC630470E04EB
:100DF000CD6C0E0E001520DB3AF542FE842008066D
:100E00002ECD6C0ECD6C0EDDCB056EC03AFD42EDE5
:100E10005BFB42923C5F7A21693ECDCD40200614B7
:100E20001D20F3180A6A26000654CD760E18F0DD50
:100E30007E0DCD3C0EDD7E0ECD3C0EC9FEFFC8DD25
:100E4000CB007E2004DD860C3D6F2600064DCD765E
:100E50000EC93AFD42BDD83A2C43B7C87DFE323F99
:100E6000C93E04F5CD6C0EF13D20F8C9CD520E3EC1
:100E7000023801DF23C9CD520E3E0318F4ED4BFEBC
:100E800042C3AD04220443E1F57E23320643F1E57B
:100E90002A0443D7FD21194021004 13A0643BE38B8
:100EA0000F5E231600935F19195E23567BB2200252
:100EB000CFC9CB7A200EFD7301FD7202FD3600C34F
:100EC000CFC31940CDAD0F3423CB2109732372CD8D
:100ED000F90EFD3600C3FD7101FD7002CFCD194042
:100EE000D7CDAD0F3528C97E2BCB274F095E2356B2
:100EF000FD211940CDF90ECFC9CD610FD8CD040F1A
:100F0000D03E27DFFD2119403E03D5F57AE607FDE7
```

```
:100F10007701FD73003E15DFB72813F1D13D20EABC
:100F2000ED4B2E432A0A43360023100FB37C9F1D17B
:100F3000ED4B2E432A08437EFDBE022320067EFD94
:100F4000BE03280823100F0CD980FB7C92A0A433AE8
:100F50002F43900600CB274F0973237AE687771833
:100F6000E62A0A43ED4B2E437EBB202623CB7E2868
:100F7000227AE687BE201C2A08433A2F4390CB27CB
:100F80004F060097EFD7702237EFD7703CD980F83
:100F900037C9232310D2B7C97AE678CB3FCB3F06B7
:100FA000004FFD6603FD6E02094E2346C92A0C431D
:040FB0004E0600C920
:06000001505752555502A31
```

What is claimed is:

1. In a display control system having character memory means, visual attribute generator means, a display device and a display memory, a display controller device comprising:

means for loading character and visual attribute data into selected display memory locations from a data bus, wherein said character data is stored in said character memory means and said attribute data is generated by said visual attribute generator means, and wherein a plurality of character and attribute data bytes form a block of data in the display memory corresponding to a row of characters as seen on the display device;

means for assigning two or more memory location identifier bytes to each displayed row of characters corresponding to and stored adjacent said data blocks in the display memory, wherein when vertical split regions are next to be displayed each of said identifier bytes includes the display memory address of the first character in the next row of characters in a corresponding one of said vertical split regions to be displayed on the display device;

means for storing a data byte corresponding to a preselected column on said display device wherein a vertical split region will begin;

second means for storing a data byte corresponding to the starting address of a character row;

third means for storing a data byte corresponding to the starting row address of a vertical split region; and means for determining which scan line of a character a particular display memory address corresponds to, whereby a plurality of rows of characters appearing on the display device are scrolled one scan line at a time.

2. The display controller of claim 1 wherein said character memory means comprises a read-only memory, further including:

random access character memory means for storing additional, alterable character data, wherein character data from said random access character means flows through said generator means.

3. In a display control system, a method for displaying data on a display device in a plurality of independently controllable vertically and horizontally segmented regions comprising the steps of:

generating and assigning two or more unique row identifier bytes to each row of data in each of said regions, wherein each of said row identifier bytes indicates the location in a display memory of the first character in the next row of characters in a corresponding one of said vertically or horizontally segmented regions;

interpreting said region row identifier bytes;

accessing the display memory location identified by a particular byte;

displaying the next row of data on said display device; and repeating said steps of interpreting, accessing and displaying for each frame of data to be displayed on said display device.

* * * * *